US012476864B2

(12) United States Patent
Crafts et al.

(10) Patent No.: US 12,476,864 B2
(45) Date of Patent: Nov. 18, 2025

(54) HANDLING LOSS OR REMOVAL OF DEVICES IN A MESH NETWORK

(71) Applicant: Lutron Technology Company LLC, Coopersburg, PA (US)

(72) Inventors: Jordan H. Crafts, Bethlehem, PA (US); Jason A. King, Bethlehem, PA (US); Galen Edgar Knode, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 331 days.

(21) Appl. No.: 17/127,085

(22) Filed: Dec. 18, 2020

(65) Prior Publication Data
US 2021/0194766 A1    Jun. 24, 2021

Related U.S. Application Data

(60) Provisional application No. 63/002,925, filed on Mar. 31, 2020, provisional application No. 62/951,433, filed on Dec. 20, 2019.

(51) Int. Cl.
*H04L 41/0816*    (2022.01)
*H04L 12/28*    (2006.01)
(Continued)

(52) U.S. Cl.
CPC ...... *H04L 41/0816* (2013.01); *H04L 12/2803* (2013.01); *H04W 84/20* (2013.01); *H04L 41/0668* (2013.01); *H05B 47/19* (2020.01)

(58) Field of Classification Search
CPC .................................................. H04L 41/0816
See application file for complete search history.

(56) References Cited

U.S. PATENT DOCUMENTS 948,000 A    2/1910    Talbot
5,086,228 A    2/1992    Kojima
(Continued)

FOREIGN PATENT DOCUMENTS

CN    106658405 A    5/2017
CN    107113689 A    8/2017
(Continued)

OTHER PUBLICATIONS

Moon, et al., "Energy Efficient Data Collection in Sink-Centric Wireless Sensor Networks: A Cluster-Ring Approach", Computer Communications, Elsevier Science Publishers BV, Amsterdam, NL, vol. 101, Jul. 4, 2016, pp. 12-25.
(Continued)

*Primary Examiner* — Guang W Li
(74) *Attorney, Agent, or Firm* — Flaster Greenberg P.C.

(57) ABSTRACT

A load control system may include control devices configured to communicate via a network. The network may include router devices for enabling communication of messages throughout the network. A control device may operate as a router device in the network. The control device may receive advertisement messages from a leader device in the network. When the leader device fails to communicate advertisement messages within a predefined period of time to other control devices that are operating as router devices in the network, one or more router devices may be identified as backup-leader devices to take over operation as the leader device in the network. When a control device that has the role of a leader device or router device is intentionally deactivated, the control device may perform a deactivation process that is specific to the role of the control device on the network.

34 Claims, 20 Drawing Sheets

(51) Int. Cl.
*H04W 84/20* (2009.01)
*H04L 41/0668* (2022.01)
*H05B 47/19* (2020.01)

(56) References Cited

U.S. PATENT DOCUMENTS

| | | | |
|---|---|---|---|
| 5,086,428 A | 2/1992 | Perlman et al. | |
| 5,564,090 A | 10/1996 | Beauchamp et al. | |
| 5,634,010 A | 5/1997 | Ciscon et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 6,209,039 B1 | 3/2001 | Albright et al. | |
| 6,262,976 B1 | 7/2001 | Mcnamara | |
| 6,879,806 B2 | 4/2005 | Shorty | |
| 7,184,421 B1 | 2/2007 | Liu et al. | |
| 7,277,931 B1 | 10/2007 | Booth et al. | |
| 7,391,297 B2 | 6/2008 | Cash et al. | |
| 7,447,800 B2 * | 11/2008 | Kobayashi | H04L 45/586 709/242 |
| 7,606,187 B2 * | 10/2009 | Zeng | H04L 45/16 455/503 |
| 7,787,424 B2 | 8/2010 | Kang et al. | |
| 7,839,791 B2 | 11/2010 | Holmer et al. | |
| 7,990,852 B1 * | 8/2011 | Cirkovic | H04L 45/00 370/242 |
| 8,009,042 B2 | 8/2011 | Steiner et al. | |
| 8,149,690 B1 | 4/2012 | Kakkar | |
| 8,170,033 B1 | 5/2012 | Kothari et al. | |
| 8,199,010 B2 | 6/2012 | Sloan et al. | |
| 8,228,184 B2 | 7/2012 | Blakeley et al. | |
| 8,306,062 B1 | 11/2012 | Cohen | |
| 8,330,638 B2 | 12/2012 | Altonen et al. | |
| 8,386,613 B2 | 2/2013 | Hopkins | |
| 8,410,706 B2 | 4/2013 | Steiner et al. | |
| 8,451,116 B2 | 5/2013 | Steiner et al. | |
| 8,950,461 B2 | 2/2015 | Adams et al. | |
| 9,125,215 B2 | 9/2015 | Bahr | |
| 9,178,798 B2 * | 11/2015 | Esale | H04L 45/50 |
| 9,488,000 B2 | 11/2016 | Kirby et al. | |
| 9,655,214 B1 | 5/2017 | Sooch et al. | |
| 9,655,215 B1 | 5/2017 | Frank et al. | |
| 9,755,958 B2 * | 9/2017 | Mirsky | H04L 69/40 |
| 10,027,127 B2 | 7/2018 | Crafts et al. | |
| 10,098,074 B2 | 10/2018 | Baker et al. | |
| 10,116,367 B1 | 10/2018 | Sakoda | |
| 10,231,227 B2 * | 3/2019 | Lee | H04N 21/4622 |
| 10,264,651 B2 | 4/2019 | Steiner | |
| 10,285,112 B2 | 5/2019 | Zhang et al. | |
| 10,299,356 B1 | 5/2019 | Quilling et al. | |
| 10,379,505 B2 | 8/2019 | Barco et al. | |
| 10,382,323 B1 | 8/2019 | Dave et al. | |
| 10,461,827 B2 | 10/2019 | Sakoda | |
| 10,680,899 B1 | 6/2020 | Ibarra | |
| 10,715,599 B2 | 7/2020 | Hao et al. | |
| 10,813,058 B2 | 10/2020 | Qiu | |
| 10,939,353 B2 | 3/2021 | Kamp et al. | |
| 11,405,283 B2 | 8/2022 | Chen | |
| 11,722,377 B2 | 8/2023 | Hayes et al. | |
| 11,848,823 B2 * | 12/2023 | Chen | H04L 45/32 |
| 2003/0031155 A1 | 2/2003 | Idehara | |
| 2004/0196858 A1 | 10/2004 | Tsai et al. | |
| 2004/0202158 A1 | 10/2004 | Takeno et al. | |
| 2005/0249113 A1 * | 11/2005 | Kobayashi | H04L 12/4641 370/461 |
| 2006/0067282 A1 | 3/2006 | Sherman et al. | |
| 2006/0149851 A1 * | 7/2006 | Matsumoto | H04L 47/24 709/238 |
| 2006/0291485 A1 | 12/2006 | Thubert et al. | |
| 2006/0291659 A1 | 12/2006 | Watanabe | |
| 2007/0025274 A1 | 2/2007 | Rahman et al. | |
| 2007/0105501 A1 | 5/2007 | Shen et al. | |
| 2007/0201392 A1 | 8/2007 | Ramachandran | |
| 2007/0265790 A1 | 11/2007 | Sealing et al. | |
| 2008/0031129 A1 | 2/2008 | Arseneault et al. | |
| 2008/0036589 A1 | 2/2008 | Werb et al. | |
| 2008/0092075 A1 | 4/2008 | Jacob et al. | |
| 2008/0117907 A1 | 5/2008 | Hein | |
| 2008/0170518 A1 | 7/2008 | Duggi et al. | |
| 2008/0205385 A1 | 8/2008 | Zeng et al. | |
| 2008/0240078 A1 | 10/2008 | Thubert et al. | |
| 2009/0034413 A1 * | 2/2009 | Sajassi | H04L 12/1863 370/228 |
| 2009/0135824 A1 | 5/2009 | Liu | |
| 2009/0185617 A1 | 7/2009 | Houghton et al. | |
| 2009/0206983 A1 | 8/2009 | Knode et al. | |
| 2009/0245252 A1 | 10/2009 | Konishi et al. | |
| 2010/0027437 A1 | 2/2010 | Ratiu | |
| 2010/0046430 A1 | 2/2010 | Naito et al. | |
| 2010/0165885 A1 | 7/2010 | Chang et al. | |
| 2010/0177660 A1 | 7/2010 | Essinger et al. | |
| 2010/0265836 A1 | 10/2010 | Lau et al. | |
| 2010/0278187 A1 | 11/2010 | Hart et al. | |
| 2011/0080854 A1 * | 4/2011 | Farkas | H04L 41/0856 370/256 |
| 2011/0159874 A1 | 6/2011 | Ninagawa | |
| 2011/0242968 A1 * | 10/2011 | Cirkovic | H04L 45/28 370/221 |
| 2012/0182865 A1 | 7/2012 | Andersen et al. | |
| 2012/0286940 A1 | 11/2012 | Carmen et al. | |
| 2013/0030589 A1 | 1/2013 | Pessina et al. | |
| 2013/0107909 A1 | 5/2013 | Jones et al. | |
| 2013/0114595 A1 * | 5/2013 | Mack-Crane | H04L 12/185 370/390 |
| 2013/0188475 A1 | 7/2013 | Lim et al. | |
| 2013/0197955 A1 | 8/2013 | Dillon | |
| 2013/0258872 A1 | 10/2013 | Drake et al. | |
| 2013/0336170 A1 | 12/2013 | Broadworth et al. | |
| 2014/0012961 A1 | 1/2014 | Pope | |
| 2014/0173056 A1 * | 6/2014 | Lear | H04L 65/1096 709/219 |
| 2014/0175875 A1 | 6/2014 | Newman et al. | |
| 2014/0177469 A1 | 6/2014 | Neyhart et al. | |
| 2014/0180487 A1 | 6/2014 | Bull et al. | |
| 2014/0210616 A1 | 7/2014 | Ramachandran | |
| 2014/0244834 A1 | 8/2014 | Guedalia et al. | |
| 2014/0265568 A1 | 9/2014 | Crafts et al. | |
| 2014/0281670 A1 * | 9/2014 | Vasseur | H04W 40/24 714/4.11 |
| 2014/0347981 A1 | 11/2014 | Rangne et al. | |
| 2015/0043562 A1 | 2/2015 | Shu | |
| 2015/0085830 A1 | 3/2015 | Nozaki et al. | |
| 2015/0131435 A1 | 5/2015 | Kasslin et al. | |
| 2015/0179058 A1 | 6/2015 | Crafts et al. | |
| 2016/0021525 A1 | 1/2016 | Mani et al. | |
| 2016/0073342 A1 | 3/2016 | Szewczyk et al. | |
| 2016/0119415 A1 | 4/2016 | Han et al. | |
| 2016/0192439 A1 | 6/2016 | Phuyal et al. | |
| 2016/0219358 A1 | 7/2016 | Shaffer et al. | |
| 2016/0227481 A1 | 8/2016 | Au et al. | |
| 2016/0330107 A1 | 11/2016 | Thubert et al. | |
| 2017/0013614 A1 | 1/2017 | Chandrashekar et al. | |
| 2017/0041954 A1 | 2/2017 | Tsai et al. | |
| 2017/0068720 A1 | 3/2017 | Ko et al. | |
| 2017/0111847 A1 * | 4/2017 | Speight | H04W 64/003 |
| 2017/0123390 A1 | 5/2017 | Barco et al. | |
| 2017/0127427 A1 | 5/2017 | Ltd | |
| 2017/0127468 A1 | 5/2017 | Saikusa | |
| 2017/0155703 A1 | 6/2017 | Hao et al. | |
| 2017/0223809 A1 | 8/2017 | Oliver et al. | |
| 2017/0230231 A1 * | 8/2017 | Hsu | H04L 45/28 |
| 2017/0245132 A1 | 8/2017 | Tsuchie | |
| 2017/0311334 A1 | 10/2017 | Sandberg et al. | |
| 2018/0014387 A1 | 1/2018 | Bard et al. | |
| 2018/0035374 A1 | 2/2018 | Borden et al. | |
| 2018/0167547 A1 | 6/2018 | Casey | |
| 2018/0220476 A1 | 8/2018 | Jung et al. | |
| 2018/0227145 A1 | 8/2018 | Brochi et al. | |
| 2018/0331940 A1 | 11/2018 | Jadhav et al. | |
| 2018/0332547 A1 | 11/2018 | Liu et al. | |
| 2018/0343602 A1 | 11/2018 | Baroudi et al. | |
| 2018/0347271 A1 | 12/2018 | Cooney et al. | |
| 2018/0368048 A1 | 12/2018 | Tsuchie | |
| 2019/0104463 A1 | 4/2019 | Khoury | |

(56) References Cited

U.S. PATENT DOCUMENTS

| | | | |
|---|---|---|---|
| 2019/0268797 A1 | 8/2019 | Pang et al. | |
| 2019/0312770 A1* | 10/2019 | Bidgoli | H04L 45/507 |
| 2019/0394667 A1 | 12/2019 | Shariati | |
| 2020/0044707 A1 | 2/2020 | Sakoda | |
| 2020/0052997 A1 | 2/2020 | Ramanathan et al. | |
| 2020/0100138 A1 | 3/2020 | Wu et al. | |
| 2020/0169355 A1 | 5/2020 | Mcilroy | |
| 2020/0403866 A1 | 12/2020 | Hayes et al. | |
| 2020/0403877 A1 | 12/2020 | Hayes et al. | |
| 2020/0404513 A1 | 12/2020 | Hayes et al. | |
| 2021/0014148 A1 | 1/2021 | Heitz et al. | |
| 2021/0014770 A1 | 1/2021 | Qi et al. | |
| 2021/0194766 A1* | 6/2021 | Crafts | H04L 41/0816 |
| 2021/0243173 A1 | 8/2021 | D'Alessandro et al. | |
| 2021/0352002 A1 | 11/2021 | Knode | |
| 2022/0015172 A1 | 1/2022 | Xu et al. | |
| 2022/0053407 A1 | 2/2022 | Zhou | |
| 2022/0191309 A1 | 6/2022 | Zhi et al. | |
| 2022/0210715 A1* | 6/2022 | Deixler | H04L 41/0853 |
| 2022/0351628 A1* | 11/2022 | Ali | G08G 5/0069 |
| 2023/0284363 A1 | 9/2023 | Baker et al. | |

FOREIGN PATENT DOCUMENTS

| | | | |
|---|---|---|---|
| CN | 107926103 A | | 4/2018 |
| CN | 109417508 A | | 3/2019 |
| CN | 109691183 A | | 4/2019 |
| CN | 109788500 A | * | 5/2019 |
| EP | 1443722 A2 | | 8/2004 |
| EP | 1594266 A1 | | 11/2005 |
| EP | 3048762 A1 | | 7/2016 |
| KR | 20120060576 A | | 6/2012 |
| KR | 2019-0058352 A | | 5/2019 |
| WO | 2012/048585 A1 | | 4/2012 |
| WO | 2018044524 A1 | | 3/2018 |

OTHER PUBLICATIONS

KR 20120060576 A, Cited in related PCT Application No. PCT/US20/62959 in the Invitation to Pay Additional Fee dated Mar. 9, 2021. *Machine translation from Espacement provided of the description, abstract, and claims.

CN 109788500 A, Cited in related PCT Application No. PCT/US20/66043 in the Invitation to Pay Additional Fee dated Mar. 25, 2021. *Machine translation from Espacement provided of the description, abstract, and claims.

Lin, Deyu, et al., "An Energy-Efficient Clustering Algorithm Combined Game Theory and Dual-Custer-Head Mechanism for WSNs", IEE Access, vol. 7 DOI: 10.1109/ACCESS.2019.2911190 [retrieved on Apr. 22, 2019), Apr. 15, 20019, pp. 49894-49905.

Thread Group, Inc., "Thread Specification", Revision 1.1.1, Feb. 13, 2017, 348 pages.

Parsa, et al., "SIDLE: Semantically Intelligent Distributed Leader Election Algorithm for Wireless Sensor Networks", Aug. 23, 2019, 8 pages.

Saedi, et al., "Generation of realistic signal strength measurements for a 5G Rogue Base Station attack scenario", Jul. 2020, 8 pages.

Kim, et al., "Scalable Network Joining Mechanism in Wireless Sensor Networks", IEEE, Research Gate, Jan. 2012, 5 pages.

Lee, et al., "Monitoring of Large-area IoT Sensors Using a LoRa Wireless Mesh Network System: Design and Evaluation", IEEE, ResearchGate, Mar. 2018, 12 pages.

Yoo, et al., "A2S: Automated Agriculture System Based on WSN", IEEE, Research Gate, Jul. 2007, 6 pages.

WO 2012/048585 A1 Office Action dated Jan. 2, 2024 in related Chinese Patent Application No. 202080095240.8.

By Espacenet.com. Cited in First Examination Report, dated Jan. 15, 2024, in related Indian Patent Application No. 202117061236.

Cree et al., "Management of Large-Scale Wireless Sensor Networks Utilizing Multi-Parent Recursive Area Hierarchies", IEEE, 2013, 6 pages.

* cited by examiner

LINK QUALITY AND LINK COST

| Link Quality | Link Cost |
|---|---|
| 0 | Unknown/Indefinite |
| 1 | 4 |
| 2 | 2 |
| 3 | 1 |

HANDLING LOSS OR REMOVAL OF DEVICES IN A MESH NETWORK

CROSS-REFERENCE TO RELATED APPLICATIONS

This application claims the benefit of U.S. Provisional Patent Application No. 62/951,433, filed Dec. 20, 2019, and U.S. Provisional Patent Application No. 63/002,925, filed Mar. 31, 2020, the entire disclosure of each being hereby incorporated by reference herein.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. A heating, ventilation, and air conditioning (HVAC) system may be used to control the temperature in the user environment.

Each load control system may include various control devices, including input devices and load control devices. The control devices may receive messages, which may include load control instructions, for controlling an electrical load from one or more of the input devices. The control devices may be capable of directly controlling an electrical load. The input devices may be capable of indirectly controlling the electrical load via the load control device. Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. The devices may communicate in a network using radio frequency (RF) communications, such as ZIGBEE® communications, BLUETOOTH® communications, and/or THREAD® communications. In addition, the RF communications may be via a proprietary protocol, such as the CLEAR CONNECT™ protocol.

SUMMARY

A load control system may include control devices configured to communicate via a network. The load control system may include one or more control devices that operate as router devices in the network for enabling communication of messages throughout the network. While the network is forming, the network may comprise one or more network partitions. A single router device in each network partition in the load control system may operate as a leader device capable of coordinating certain network functionality. The leader device may support and be attached to multiple router devices that receive and route messages to other devices on the network.

Control devices that are assigned the role of a router device in the network may receive advertisement messages from the leader device. Based on the receipt of the advertisement messages from the leader device, the control devices may determine the health of the network. When the leader device fails to communicate advertisement messages to other control devices that are operating as router devices in the network within a predefined period of time, the router devices may detach from the network partition and begin network reformation.

To prevent the delay that may be associated with network reformation, one or more router devices may be identified as backup-leader devices to take over operation as the leader device on a network partition in the event the present leader device is lost. The one or more router devices may be identified as backup-leader devices based on backup-leader criteria. For example, a router device may identify itself as a backup-leader device based on the link quality of a network link between the router device and the present leader device and/or its router identifier or other unique identifier.

A router device that is identified as being a backup-leader device on the network may determine to begin operating as the leader device on the network when the router device fails to receive an advertisement message from the leader device after a first threshold period of time. The first threshold period of time may be a time period within which the router device is supposed to receive one or more advertisement messages. The first threshold period of time may be shorter than a second threshold period of time after which other control devices in the network may begin to detach from the network. The ability of the backup-leader device to detect that the leader device failed to transmit advertisement messages and begin operating as the leader device on the network prior to the other devices detaching from the network may preserve the network.

Control devices may be claimed for joining the network using a claiming procedure. The claiming procedure may be used to discover and claim control devices for being added to the network. Control devices in the load control system may be claimed using a user's mobile device, such as a smart phone, laptop or other mobile computing device. The claimed devices may be joined to the network during a joining procedure. When joining the network, the control devices that have been claimed for joining the network may attach to another device on the network, such as the leader device or a router device on the network, for enabling communications on the network through the attached to device.

The control devices may be associated with one or more other devices during an association procedure. For example, the control devices may be associated with a unique identifier of another device and the association may be stored in memory for enabling the receiving devices to identify messages communicated from the sending device with which they are associated (e.g., to enable load control based on messages from associated devices). The control devices may be associated with a group identifier that indicates a group of devices (e.g., a zone, or location) for being collectively controlled.

To join the network, the control devices may be activated in the load control system for performing functions in the load control system. For example, the control devices may be activated for performing load control in the load control system. As the control devices may communicate on the network to send or receive messages for enabling load control in the load control system, an activation procedure for activating the control devices in the load control system may include the discovery of the control device, the claiming of the control devices for joining the network, the joining of the control device to the network, and/or the associating of the control devices with other activated control devices in the load control system.

The user may want to intentionally deactivate a previously activated control device for detaching the control device from the network or network partition. For example, the user may select a control device on the user's mobile device that has been claimed and/or joined to the network for being deactivated. After the control device is selected, the control device may enter a deactivation procedure for being deactivated for leaving network. As the user may intentionally deactivate a previously activated control device on the network, proactive steps may be taken in response to the indication from the user or the user's mobile device to prevent delay that may be caused by the loss of the leader device or a router device in the network. For example, the deactivation procedure may take into consideration the role of the control device being deactivated on the network. The control device may deactivate differently based on the role of the control device. When deactivating an activated control device on the network, the control device may perform the proper procedure to effectively undo the joining procedure. When deactivating from the network, the control device may delete the credentials for the network which it had stored during the joining procedure.

A control device that is assigned the role of the leader device may be seamlessly transferred to another control device that may take over the responsibilities of the leader device in response to an indication to deactivate the current leader device from the network. Similarly, a router device may be removed from a router table maintained at the leader device in response to an indication to deactivate the router device, which may allow other devices to update communication paths in the network to avoid communicating through the removed router device and/or attach to another router device on the network. After the deactivation procedure, the deactivated control device may need to be rediscovered, reclaimed, re-associated, and/or rejoined to the network for enabling communication on the network, or discovered, claimed, associated, and joined to another network or network partition for enabling communication thereon.

DETAILED DESCRIPTION

Figure 1:
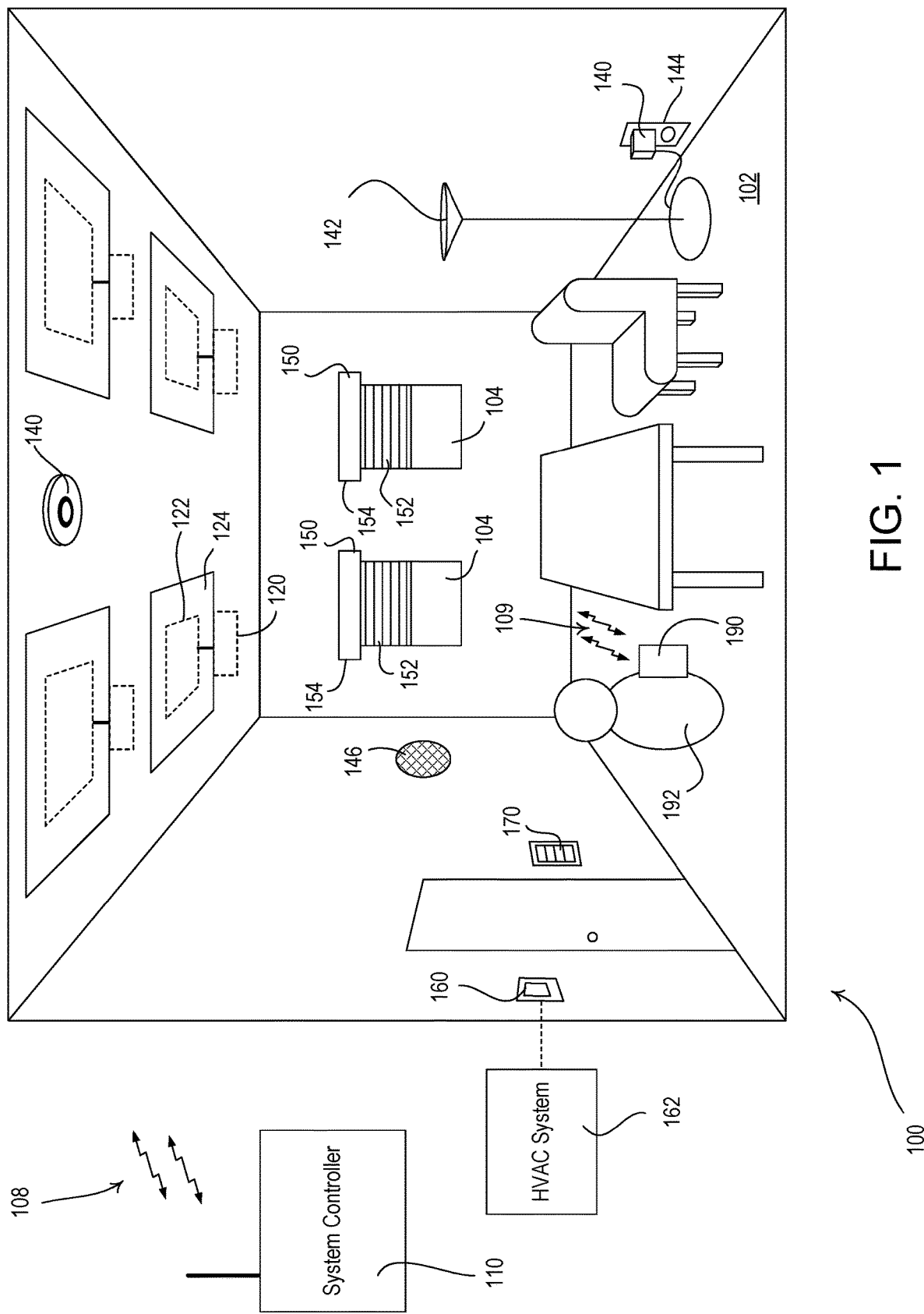
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit messages in response to user inputs, occupancy/vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) operable to communicate messages to and from the control devices (e.g., the control-source devices and/or the control-target devices). For example, the system controller 110 may be configured to receive messages from the control-source devices and transmit messages to the control-target devices in response to the messages received from the control-source devices. The control-source devices, control-target devices, and the system controller 110 may be configured to transmit and receive the RF signals 108 using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, BLUETOOTH, BLUETOOTH LOW ENERGY (BLE), ZIGBEE, Z-WAVE, THREAD, KNX-RF, ENOCEAN RADIO protocols, or a different proprietary protocol.

The load control system 100 may comprise one or more load control devices, e.g., a lighting control device 120, for controlling a lighting load, e.g., lighting loads 122 in a lighting fixture 124. For example, the lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device.

The load control system 100 may comprise one or more load control devices or appliances that are able to directly receive the RF signals 108 (e.g., wireless signals) from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatment 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive messages via the RF signals 108 (e.g., from the system controller 110) and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 (e.g., from the system controller 110) and to turn on and off or adjust the intensity of the floor lamp 142 in response to the received messages.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive messages via the RF signals 108 (e.g., from the system controller 110) and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170 and/or the sensor device 141. The input devices may be fixed or movable input devices. The system controller 110 may be configured to transmit one or more messages to the load control devices (e.g., the lighting control device 120, the plug-in load control device 140, the motorized window treatments 150, and/or the thermostat 160) in response to the messages received from the remote control device 170. The remote control device 170 may be configured to transmit messages directly to the lighting control device 120, the plug-in load control device 140, the motorized window treatments 150, and/or the temperature control device 160.

The remote control device 170 may be configured to transmit messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more computing devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals according to another signal type and/or protocol. The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the lighting control device 120, the plug-in load control device 140, the motorized window treatments 150, and/or the thermostat 160). The load control database may comprise association information that identifies associations between the load control devices and the input devices (e.g., the remote control device 170, etc.). The associations may comprise device identifiers that are stored together, such that devices may recognize the identifiers of associated devices to enable communication between the devices in the load control system. Devices may recognize the stored identifiers of associated devices and communicate messages to and/or identify messages received from the associated devices. The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The control devices of the load control system 100 may communicate with each other via a network by joining the network and attaching to another device on the network (e.g., to form a mesh network). During a commissioning procedure, the control devices may be discovered and claimed using a claiming procedure for being selected and configured to join the network. For example, during the claiming procedure the user 192 may use the mobile device 190 to discover and claim the control devices in the load control system 100. Each control device in the load control system 100 may transmit a control device beacon message via a short-range wireless communication link (e.g., using Bluetooth Low Energy (BLE) technology, nearfield communication (NFC) technology, or other short-range wireless technology). The mobile device 190 may discover (e.g., receive) control device beacon messages transmitted by the control devices in the load control system 100. The mobile device 190 may identify one or more of the control device beacon messages (e.g., having the strongest received signal strength indicator (RSSI) value) and transmit a connection message to the control device(s). The control device that is being claimed may receive the connection message from the mobile device and may establish a connection (e.g., a two-way communication connection) with the mobile device 190. After performing the claiming procedure, the control device may perform a joining procedure to be joined to the network (e.g., by exchanging credentials with a network commissioning device). The claimed control devices may each then attach to another device (e.g., a router device using the exchanged credentials) on the network to form the mesh network (e.g., formation of the network).

To join the network, the control devices may be activated in the load control system for performing functions in the load control system. For example, the control devices may be activated for performing load control in the load control system. The control devices may perform an activation procedure for being activated in the load control system. As the control devices may communicate on the network to send or receive messages with other devices in the load control system, the activation procedure may include the discovery of the control devices, the claiming of the control device for joining the network, and/or the joining of the control device to the network, as described herein.

The activation procedure may include an association procedure for associating control devices within the load control system. The control devices may be associated with one or more other devices during an association procedure. For example, the control devices may be associated with a unique identifier of another device and the association may be stored in memory at the devices themselves and/or other devices in the load control system (e.g., the system controller) for enabling the control devices that receive messages from other device in the load control system to identify messages communicated from the sending device with which they are associated (e.g., to enable load control based on messages from associated devices). The control devices may have a unique identifier assigned in the load control system (e.g., by the system controller or another computing device) during the activation procedure that is different than a router identifier or other unique identifier assigned to the device in the network for performing communications on network links. The control devices may also, or alternatively, be associated with a group identifier that indicates a group of devices (e.g., a zone, or location) for being collectively controlled. The activated control devices may otherwise be configured and/or controlled in the load control system. For example, the activated control devices may be selected by the user 192 via the mobile device 190 for being configured and/or controlled and the configuration and/or control instructions may be After activating a control device in the load control system, the user 192 may want to deactivate a previously activated control device for being deactivated in the load control system and/or detached from the network. For example, the user 192 may select a control device identified on the mobile device 190 that has been activated as a control device in the load control system and may choose to deactivate the control device. The user 192 may wish to deactivate a control device that has been improperly joined to the network or improperly configured in the load control system 100. The deactivation of the control device may allow the user 192 to restart the activation procedure (e.g., including the claiming procedure and/or the joining procedure) for adding the control device to the load control system 100 and/or the network (e.g., using an application or other software via the user's mobile device 192). For example, the user 192 may be able to restart a commissioning procedure using the mobile device 190 for joining the control device to a network or network partition; and associating the control device with a zone and/or other control devices in the load control system 100 that communicate on the network or network partition.

Figure 2A:
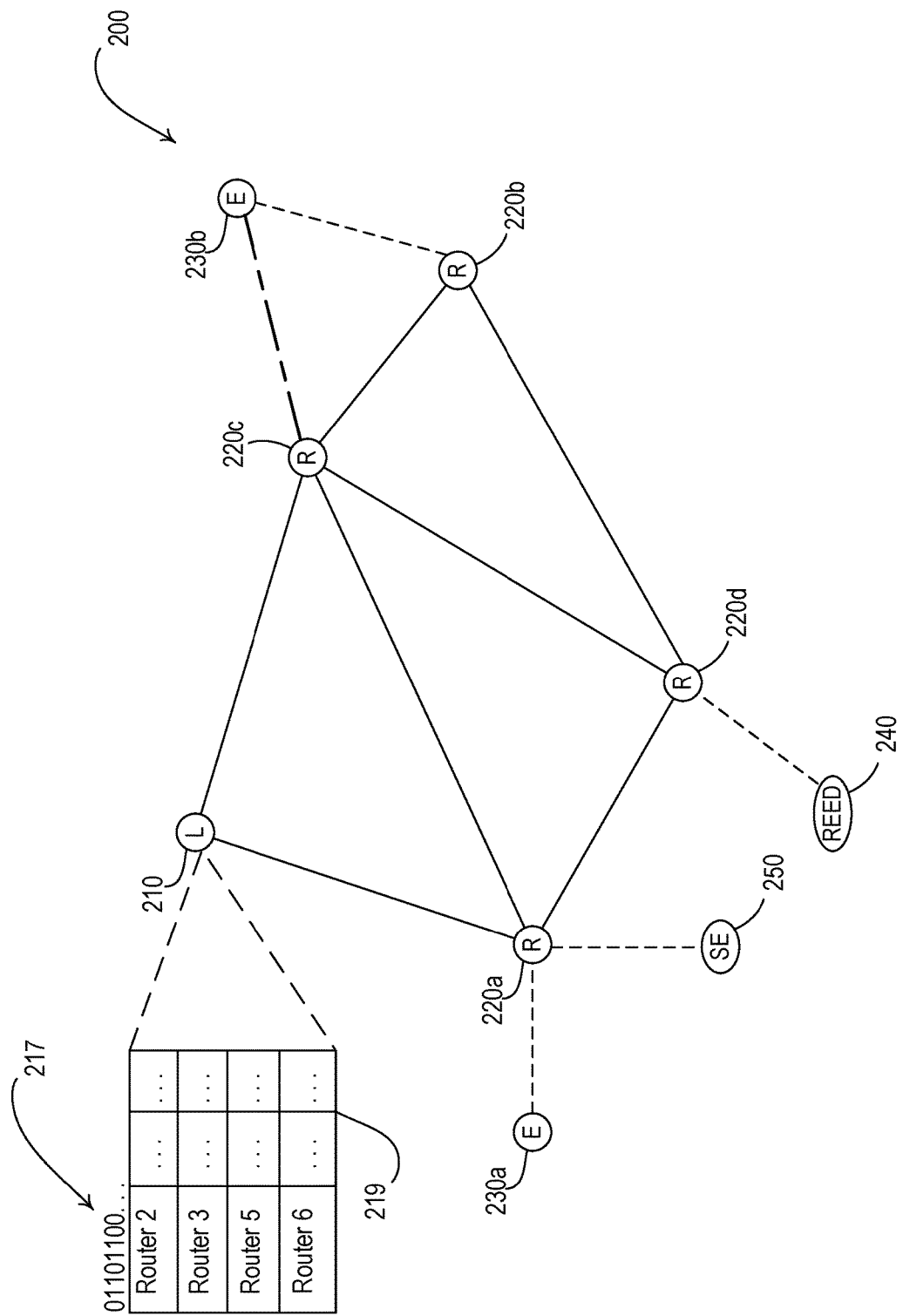
FIG. 2A is a diagram of an example network that may allow for communication between devices in the load control system of FIG. 1.

FIG. 2A is an illustration of an example network 200 that may allow for communication between control devices in a load control system (e.g., the load control system 100). The network 200 may include any suitable network to facilitate communications in a load control system. For example, the network 200 may be a mesh network on which control devices communicate using a mesh network wireless communication protocol (e.g., the THREAD protocol or other suitable protocol). The various control devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more control devices or fewer control devices than the network 200.

The circled nodes of FIG. 2A may represent devices that are attached to other devices on the network 200 (e.g. the various control devices of the load control system 100). A control device that is attached to at least one other control device on the network 200 may communicate with the other control devices (e.g., that are attached to another control device on the network 200). Communication within the network 200 may be facilitated by the network links (e.g., attachments) established within the network 200. Referring to FIG. 2A, the network links between the devices may be indicated by lines (e.g., solid and dashed lines) that connect the respective control devices.

The control devices that are attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device and/or a sleepy end device (e.g., sleepy end device 250). The role of a control device may indicate the functions and/or capabilities of the control device with respect to the network 200. As described herein, end devices may include end devices (e.g., end devices 230a and 230b), router eligible end devices (e.g., router eligible end device 240), and/or sleepy end devices (e.g., sleepy end device 250).

As illustrated in FIG. 2A, the network 200 may include a leader device 210 and one or more router devices 220a-220d. The leader device 210 may manage other control devices on the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200. For example, the leader device may be a control device that facilitates communication (e.g., routes and receives messages to and from) between the network 200 and other networks or network partitions. Referring to FIG. 1, a system controller (e.g., the system controller 110 shown in FIG. 1) may be an example of a leader device 210. In addition, a control device within a load control system that is capable of being assigned to the role of a router device may be assigned to the role of the leader device.

The leader device 210 may support and be attached to multiple router devices (e.g., 64 router devices, 32 router devices, or another number of router devices may be defined for the network 200). The leader device 210 may operate as a router device. The router devices 220a-220d on the network 200 (e.g., attached to the leader device 210 on the network 200) may be in communication with each other, for example, to form a mesh network. The router devices 220a-220d may be in communication with one another via network links (e.g., as indicated by the solid lines connecting the router devices 220a-220d). The router devices 220a-220d may be in communication with the leader device 210, either directly or through one or more other router devices (e.g., as indicated by the solid lines connecting the leader device 210 to the router devices 220a and 220c). The router devices 220a-220d may receive and route messages to other devices on the network 200 (e.g., the end devices 230a, 230b, the router eligible end device 240, and/or the sleepy end device 250). For example, the router devices 220a-220d may receive and/or transmit messages between devices, or between each other for communicating messages received from an attached device to another device attached to another router device. Referring now to the load control system 100, a device that is, for example, externally powered (e.g., a device that is not battery powered) may be assigned to the role of a router device, such as, the system controller 110, the dimmer switch 120, the LED driver 130, the plug-in load control device 140, the motorized window treatments 150, and/or the thermostat 160.

The network 200 may include one or more end devices 230a, 230b (e.g., full or minimal end devices). The end devices 230a, 230b may be attached to another device (e.g., a parent device, such as the leader device 210 and/or the router devices 220a, 220b, 220c, 220d) on the network 200 and may transmit and/or receive messages via its attached parent device (e.g., leader device and/or router device). Though two end devices 230a, 210b are shown in FIG. 2A, and each is attached to different router devices, each router device 220a-220d may support multiple end devices (e.g., more than 500 end devices). The system controller 110, input devices (e.g., the remote control device 170), and/or load control devices (e.g., the dimmer switch 120, the LED driver 130, the plug-in load control device 140, the motorized window treatments 150, and/or the thermostat 160) may be examples of the end devices 230a, 230b.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via the attached router device 220d. As shown in FIG. 2A, the router eligible end device 240 may be one of the end devices that is attached to the router device 220d. The system controller 110, the dimmer switch 120, the LED driver 130, the plug-in load control device 140, the motorized window treatments 150, and/or the thermostat 160 may be examples of the router eligible end device 240. Referring now to the load control system 100, a control device that is, for example, externally powered (e.g., a control device that is not battery powered) may be assigned to the role of a router eligible end device, such as, the system controller 110, the dimmer switch 120, the LED driver 130, the plug-in load control device 140, the motorized window treatments 150, and/or the thermostat 160.

The network 200 may include the sleepy end device 250. The sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable its communication circuit(s) in between message transmissions. The sleepy end device 250 may transmit and/or receive messages via an attached router device 220a. As shown in FIG. 2A, the sleepy end device 250 may be one of the end devices that is attached to the router device 220a. Input devices (e.g., the remote control device 170) and/or load control devices (e.g., the motorized window treatments 150 when battery powered) may be examples of the sleepy end device 250. In addition, sensors and/or battery powered devices may be examples of the sleepy end device 250.

The leader device 210 may update the roles (e.g., or confirm role updates) of the devices communicating within the network 200, for example, based on changes to the network 200. In an example, a control device may be assigned to a certain role when the device attaches to the network 200, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200 and/or the router identifiers in use in the network 200. For example, the leader device 210 may store and/or maintain a bitmap 217 that may be used to indicate the number of router devices and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200 and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200 based on the network information being stored and maintained in the locally stored router table. For example, a router device, such as the router devices 220a-220d and/or the leader device 210, may transmit messages differently within the network 200 based on the quality of the communications with corresponding router devices identified in the router table stored locally thereon.

The control devices attached to the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the relationship (e.g., attachment) between a child device and a respective parent device may be indicated by dashed lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., the auxiliary parent device of the router device 230b).

Child devices may be configured to transmit unicast messages to their respective parent device. A control device may transmit unicast messages to another control device in the network directly or via hops through other devices in the network. Each unicast message may be individually addressed to another control device by including a unique identifier of the control device to which the unicast message being transmitted. Control devices may generate separate unicast messages for each control device with which they are communicating and address the unicast messages to each control device independently. The unicast messages may also include the unique identifier of the control device that is transmitting the unicast message. A control device may determine that it is the intended recipient of a unicast message by identifying its own unique identifier in the unicast message.

Messages may be sent in the network using multicast messages and/or broadcast messages. Multicast messages may be sent to a group of control devices in the network. A multicast message may include a group identifier. The control devices that are members of the group may recognize the group identifier and process the message accordingly. Broadcast messages may be sent to each control device in the network capable of receiving the message. The broadcast messages may include an indication that the message is a broadcast message (e.g., a broadcast address). Each device that receives a broadcast message may process the message accordingly. A network may use either multicast messages or broadcast messages, and the two terms may be used unteachably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device that the end device 230b is attached via a lookup table. As illustrated in FIG. 2A, multiple paths may exist to route messages over the network 200, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit message to and receive messages from) a parent device (e.g., a primary parent device), such as the router device 220b. The end device 230b may also be configured to communicate with (e.g., receive messages from) an auxiliary parent device, such as the router device 220c (e.g., as illustrated by the long and short dashed lines in FIG. 2A). A child device may receive unicast messages from its parent device (e.g., primary parent device). A child device may also receive multicast messages (e.g. and/or broadcast messages) from its parent device (e.g., primary parent device) and one or more auxiliary parent devices, which may increase the efficiency and reliability of child device receiving the messages. For example, the child device may receive network advertisement messages via an auxiliary parent device. The number of auxiliary parents that a child device is synchronized with may be limited to a threshold number of auxiliary parents (e.g., 3, 5, 10, etc.).

A child device may be attached to a single parent device and synchronized with one or more auxiliary parent devices. For example, the child device may send and/or receive unicast messages via the parent devices. Similarly, the child device may receive multicast messages via the one or more synchronized auxiliary parent devices. The number of auxiliary parent devices that a respective child device is synchronized with may be limited to a threshold number of synchronized auxiliary parents, which may be pre-defined and/or configured. A child device may attempt to synchronize with an auxiliary parent device by transmitting a message (referred to herein as a link request message) to the auxiliary parent device. For example, referring to FIG. 2A, the end device 230b may have transmitted a link request message to router 220c. The link request message may be used to request a network link between two devices. As descried herein, messages may be communicated between devices that share a network link. In response to receiving the link request message, the router device 220c may transmit a message (referred to herein as a link accept message) to the end device 230b. The link accept message may include information that allows the respective child device to decrypt messages from the auxiliary parent device (e.g., a frame counter). As described herein, when a child device is synchronized with an auxiliary parent device, the child device may receive multicast messages via the synchronized auxiliary parent device. For example, referring to FIG. 2A, the end device 230b may receive multicast messages via the parent device (e.g., router device 220b) and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other control devices to determine that a network has been formed and that the device hearing the advertisement message may attempt to attach to the router device (e.g., to communicate via the network). Devices may receive and track the advertisement messages transmitted by router devices to determine whether the device is able to communicate via the network. Also, or alternatively, the advertisement messages transmitted by a respective router device may provide other router devices with the ability to measure a communication quality metric of the communication signal (e.g., via the received signal strength indicator value) between the respective routers attached to the network (e.g., which the router devices may use to update their respective routing tables or routing information). As described herein, the child device may measure the received signal strength indicator (RSSI) or another communication quality metric of the received advertisement messages.

Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the received signal strength (e.g., an RSSI) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the router devices that a respective child device has received messages from (e.g., advertisement messages). In addition, the router table may include an indication of the RSSI or other communication quality metric of messages received from each of the router devices in the router table. Also, or alternatively, child devices may maintain a generic router table. The router table may include each of the routers that a respective child device has received messages from and a received signal strength indicator for each of the respective router devices. The router table may also include an indication of whether a respective router device is a parent of the child device or an auxiliary parent of the child device. As used herein, the term auxiliary parent table may refer to a separate table from the router table or a subset of the router table that includes the router devices that are synchronized auxiliary parents of the child device.

As described herein, the network 200 may allow for communication between devices in a load control system (e.g., the load control system 100 shown in FIG. 1). The end devices 230a, 230b may include load control devices (e.g., control-target devices) and/or input devices (e.g., control-source devices) that communicate with other devices in the load control system. For example, the end device 230a may communicate with another end device and/or a router device in the load control system via RF communications.

Referring to FIG. 1, the remote control device 170 may operate as an end device or a sleepy end device for communicating messages comprising indications of user input and/or control instructions for controlling another end device (e.g., the dimmer switch 120, the LED driver 130, the plug-in load control device 140, the motorized window treatment 150, and/or the thermostat 160). The remote control device 170 may communicate via one or more intermediary parent devices, such as a leader device and/or a router device, for example. The leader device and/or the router device may communicate with one or more other leader devices and/or router devices in the network to route the messages to the other end device (e.g., the dimmer switch 120, the LED driver 130, the plug-in load control device 140, the motorized window treatment 150, and/or the thermostat 160) for performing load control.

A control device may attach to another control device on a network or network partition (e.g., the network 200 shown in FIG. 2A) to enable the device to communicate (e.g., transmit and/or receive messages) via the network. A control device may initiate attachment to another control device on a network by transmitting a parent request message (e.g., a multicast parent request message) to discover potential parent devices. A parent request message may be transmitted by a control device to discover and/or attach to a parent device (e.g., router devices and/or leader devices). A control device may transmit the parent request message as a multicast message, for example, to identify devices that are attached to a network that can act as a parent device of the control device.

Potential parent devices (e.g., the leader device 210 and/or the router devices 220 of the network 200) that receive a parent request message (e.g., a multicast parent request message) may respond by transmitting a parent response message. For example, potential parent devices that receive a multicast parent request message may each transmit a parent response message (e.g., as a unicast message) to the control device that transmitted the parent request message. A parent response message may indicate that the control device that transmits the parent response message is available to act as a parent device. Accordingly, a control device that transmits a parent request message may receive a plurality of responses to the parent request message and determine a parent to synchronize with based on the received parent response messages. The control device transmitting the parent request message may identify the received signal strength indicator (RSSI) associated with the response messages and attempt attachment to the parent device having the largest received signal strength indicator for the response message.

As multiple control devices transmit parent request messages as multicast messages within the same period of time, the parent devices may each receive multiple parent request messages at the same time or within a short time period. The number of parent request messages being received at a parent device may prevent the parent devices from being able to fully process previously received attachment request messages. In addition, the parent response messages transmitted by each of the parent devices that receive the parent request message may be transmitted at the same or substantially the same time. The number of parent request messages and parent response messages that are transmitted within the same period of time may congest the network due to the number of devices in the network (e.g., each leader device may support more than 30 router devices and each router device may support more than 500 end devices) and/or cause messages to collide with one another, which may cause one or more of the parent request messages or parent response messages to fail to be properly received. When a control device attempting to attach to another control device on the network fails to receive a parent response message, the control device may fail to attach to the other control device on the network, which may increase the amount of time for formation of the network to complete. When each of the devices in the load control system are provided with power, many control devices may attempt to attach to other control devices on the network by transmitting the parent request messages at the same time or within the same time period.

A control device attempting to attach to another control device on a network may be configured to delay network attachment to allow for other control devices to attach to control devices on the network. As described herein, when control devices attempt to attach to another control device on a network, a plurality of messages may be transmitted at the same or substantially the same time, which may increase the likelihood of message collisions on the network. Accordingly, a control device attempting to attach to another control device on the network may delay attachment to the network when the control device determines that another control device is attempting to attach to a control device on the network. For example, the control device may delay network attachment by adding time to a back-off timer after the expiration of which the control device may attempt to attach to a control device on the network.

A control device may decrease the frequency at which the control device attempts to synchronize with an auxiliary parent device and/or decrease the number of synchronized auxiliary parent devices to improve the likelihood of attachment and/or synchronization when requests are sent. Similar to network attachment, when a control device attempts to synchronize with an auxiliary parent device, a plurality of messages may be transmitted at the same or substantially the same time, which may increase the likelihood of message collisions on the network. Accordingly, the control device may decrease the frequency at which the control device attempts to synchronize with an auxiliary parent device (e.g., decrease the execution rate of a procedure to synchronize with an auxiliary parent device), which may decrease the likelihood of message collisions. In addition, the control device may decrease the number of synchronized auxiliary parent devices, which may also decrease the likelihood of message collisions.

Figure 2B:
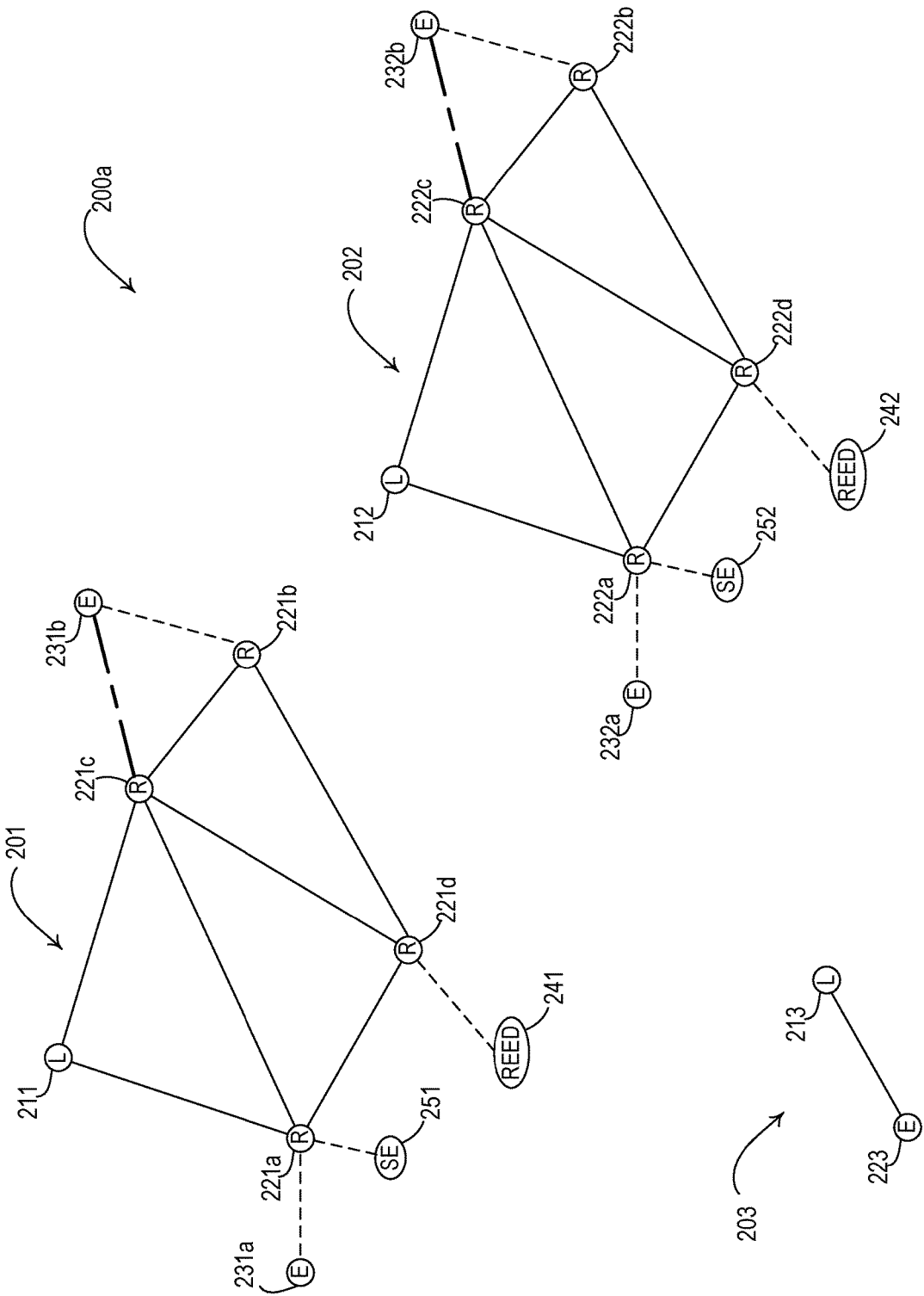
FIG. 2B is a diagram of example networks or network partitions (e.g., networks or subnetworks) that allow for communication between devices in the load control system of FIG. 1.

FIG. 2B is an example illustration of a network 200*a* having a plurality of network partitions 201, 202, 203 (e.g., separate network partitions). As illustrated in FIG. 2B, the network partition 201 may include the following parent devices: a leader device 211 and router devices 221*a*, 221*b*, 221*c*, 221*d*. In addition, the network 201 may include child devices, such as: end devices 231*a*, 231*b*; router eligible end device 241; and sleepy end device 251. For example, each of the router devices 221*a*-221*d* in the network partition 201 may be assigned a unique router identifier. The network partition 202 may include the following parent devices: a leader device 212 and router devices 222*a*, 222*b*, 222*c*, 222*d*. In addition, the network 202 may include child devices, such as: end devices 232*a*, 232*b*; router eligible end device 242; and sleepy end device 252. For example, each of the router devices 222*a*-222*d* in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router device within the network partition 203. A leader device that is not connected or synchronized with a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200a may allow for communication between control devices in a load control system (e.g., the load control system 100). In addition, the network partitions 201, 202, 203 may be formed as a result of certain control devices being unable to attach to an already formed network partition. For example, as described herein, a control device may attempt to attach to another control device on a network partition by transmitting a parent request message (e.g., a multicast parent request message). If, however, the control device fails to receive a response to the parent request message (e.g., because the control device is outside of a communication range of the router devices of an already formed network partition), the control device may attempt to form its own network partition (e.g., become a leader device of a new network partition).

A control device that is unable to attach to a network partition may form another network partition. For example, referring to FIG. 2B, the leader device 213 may have been unable to attach to a router device on the network partitions 201, 202 (e.g., because the leader device 213 was outside of communication range of the router devices on the network partitions 201, 202). Accordingly, the leader device 213 may form the network partition 203 and the end device 223 may attach to the network partition 203. Similarly, the leader device 212 may have been unable to attach to the network partitions 201, 203 (e.g., because the leader device 212 is outside of communication range of the router devices of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. The partition identifier may be selected at a leader device and transmitted in advertisement messages to other devices that may attach to the leader device. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, a partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). A higher or lower partition identifier may indicate a higher priority value for the network partition priority (e.g. then network partition 201 may be a higher-priority network partition than the network partitions 202, 203 based on the partition identifier).

A priority may be assigned to a respective network partition based on the control devices (e.g., router devices and/or end devices) in the network partition. For example, a network partition having at least one router device in addition to the leader device may be given a higher priority than a network partition having only a leader device and no other router devices. Referring to FIG. 2B, the network partition 201 may be given a higher priority than the network partition 203 since the network partition 201 has router devices 221a-221d and the network partition 203 has no router devices in addition to the leader device. In addition, a priority may be assigned to a respective network partition based on a number of control devices (e.g., router devices and/or end devices) in the network partition. Referring to FIG. 2B, the network partition 201 may be given higher priority than the network partition 203 since the network partition 201 may have a greater number of control devices in the network partition. Each control device in a network partition may have stored locally thereon the number of control devices in the network partition. Network partitions that have the same number of control devices may be given different priorities using different partition identifiers, as described herein. For example, as shown in FIG. 2B, the network partition 201 and the network partition 202 may have the same number of control devices (e.g., router devices and/or end devices). The network partition 201 may have a higher priority based on network partition 201 having a higher or lower partition identifier.

As control devices attach to each of the network partitions 201, 202, 203, the effective communication range of each of the network partitions may increase. In addition, control devices that were initially unable to attach to one or more of the network partitions 201, 202, 203 (e.g., because the control device was previously outside of the communication ranges of all of the network partitions), may subsequently be able to attach to one of the network partitions 201, 202, 203. Moreover, communication within a load control system may be better facilitated when a single network partition is formed (e.g., the network 200 having a single network partition as illustrated in FIG. 2A) as compared to when multiple network partitions are formed (e.g., the network 200a having multiple network partitions 201, 202, 203 as illustrated in FIG. 2B). For example, communication within a load control system may be better facilitated when a single network partition is formed because a device in a network partition may be unable to transmit messages to control devices attached to another network partition (e.g., a device in a network partition may be unable to communicate with other devices outside the network partition). Accordingly, if a control device attached to a first network partition is also within the communication range of a second network partition, the device may attempt to detach from the first network partition and attach to the second network partition. For example, a control device may detach from the first network partition and attach to a second network partition when the priority of the second network partition is higher than the priority of the first network partition.

The router devices attached to each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the router devices attached the respective network (e.g., a summation of the communication range of each of the router devices attached to the respective network). As a result, the communication range of a respective network or network partition may increase as the number of router devices attached to the respective network increases.

As described herein, the control devices attached to a lower-priority network partition may attempt to attach to a higher-priority network partition. For example, the control devices attached to the network partition 202 may attempt to attach to the network partition 201 (e.g., as the network partition 201 has a priority value of 3 and the network partition 202 has a priority value of 1). The router device 222a may receive an advertisement message from a device attached to the network partition 201 (e.g., from the router device 221d). The advertisement message may include an indication of the partition identifier of the network 201 (e.g., 3), which may be greater than the partition identifier of the network partition 202 and may indicate that the network partition 201 is a higher-priority network partition than the network 202. The router device 222a may determine to attach to the network partition 201 (e.g., as the network partition 201 has a higher priority).

The router device 222a may attempt to attach to the network partition 201 by transmitting a request to the leader device of the network partition 201 (e.g., the leader device 211). The request may include a request to attach to the network partition 201 as a router device, for example, by requesting to attach to the network partition 201 and be assigned a certain router identifier. For example, the router device 222a may request to attach to the network partition 201 and be assigned the router identifier that the router device 222a is assigned in the network partition 202. In response, the leader device 211 may reject the request if another router device 212a-212d attached to the network partition 201 is already assigned the requested router identifier. The leader device 211 may accept the request if none of the router devices 212a-212d attached to the network partition 201 are assigned the requested router identifier. If the router device 222a attaches to the network partition 201 and is assigned the requested router identifier, the child devices of the router device 222a (e.g., the end device 232a and the sleepy end device 252) may automatically attach to the network partition 201. For example, as the child devices communicate with the router device 222a using the router identifier. If the router device 222a is assigned the requested identifier by the leader device 211 of the network partition 201 (e.g., the router identifier as assigned in the network partition 202), the child devices may continue to communicate with router device 222a using the same router identifier.

Figure 2D:
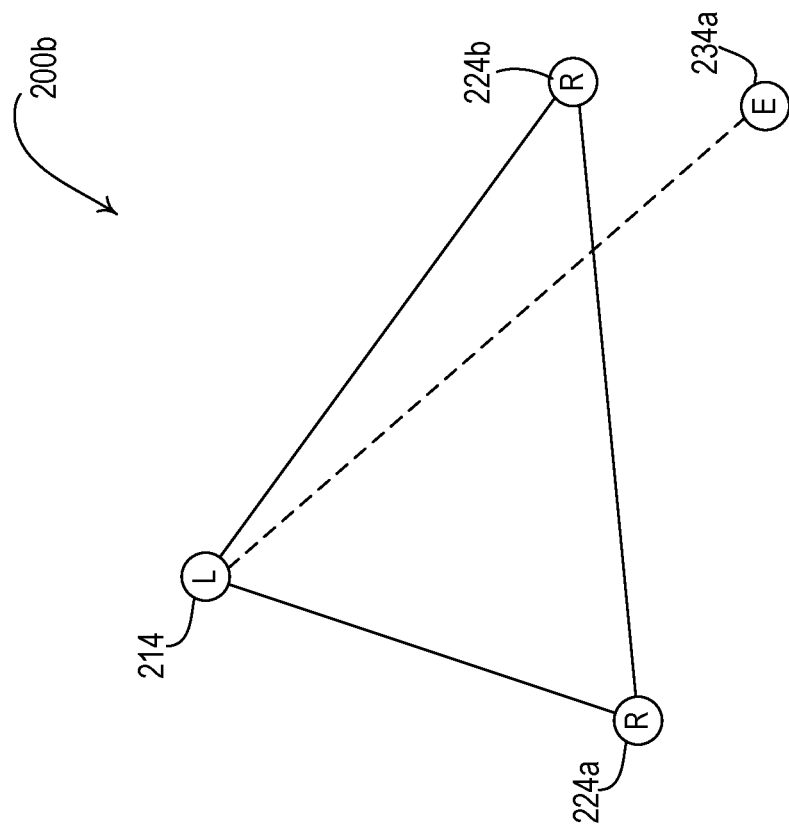
FIGS. 2C and 2D are diagrams of another example network that allows for communication between devices in the load control system of FIG. 1.
Figure 2C:
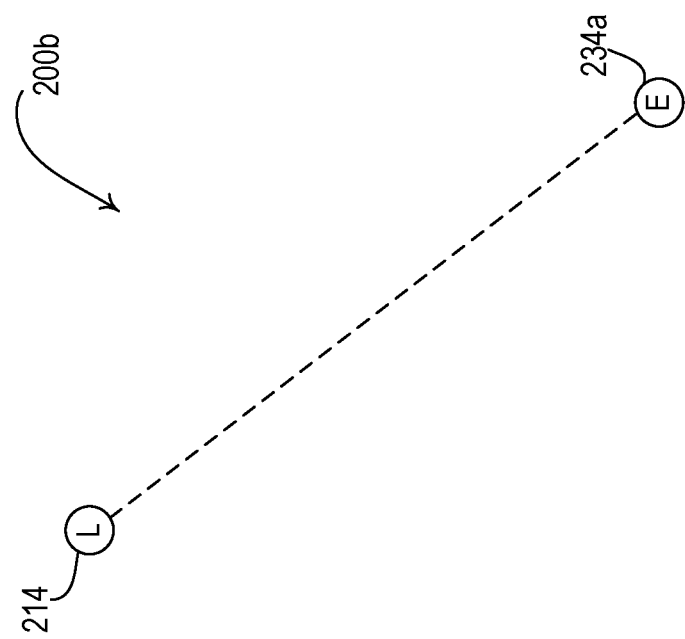

FIGS. 2C and 2D are illustrations of an example network 200b as the network 200b advances or progresses in network formation. As illustrated in FIG. 2C, the network 200b may include a leader device 214 and an end device 234a. As the network 200b is in the initial stages of network formation, the network 200b may not yet include a router device. The end device 234a may, as a result, attach to the leader device 214 (e.g., as other router devices do not yet exist on the network 200b). However, the network link (e.g., the parent/child link) between the leader device 214 and the end device 234a may be weak (e.g., the received signal strength indicator of messages received by the end device 234a may be approximately −60 dB). For example, the network link between the leader device 214 and the end device 234a may be weak because the leader device 214 and the end device 234a are not proximately positioned to each other. If the network link between the leader device 214 and the end device 234a is weak, the likelihood of message transmission and/or reception failures between the leader device 214 and the end device 234a may increase.

FIG. 2D illustrates the network 200b during a later stage of network formation than the stage of network formation illustrated in FIG. 2C. As illustrated in FIG. 2D, the network 200b may grow to include additional control devices as network formation advances (e.g., as time progresses). For example, the network 200b may grow to include router devices 224a, 224b. In addition, the router devices 224a, 224b may be positioned proximate to the end device 234a (e.g., positioned closer to the end device 234a than the leader device 214). In addition, the received signal strength indicators of messages transmitted by the router devices 224a, 224b and received by the end device 234a may be strong (e.g., stronger than the received signal strength indicators transmitted by the leader device 214 and received by the end device 234a, such as −35 dB and −30 dB, respectively). Thus, potential network links (e.g., potential parent/child links) between the router devices 224a, 224b and the end device 234a may be stronger than the network link between the leader device 214 and the end device 234a. Moreover, as illustrated in FIG. 2D, a potential network link between the router device 224b and the end device 234a may be stronger than a potential network link between the router device 224a and the end device 234a (e.g., as the router device 224b is positioned closer to the end device 234a than the router device 224a).

As network formation progresses or advances, additional devices may attach to the network. As a result, the end device 234a may experience better communication over the network 200b if the end device 234a determines to detach from an initial parent device (e.g., the leader device 214) and to attach to an updated parent device (e.g., the router device 224a or the router device 224b). For example, as described herein, the updated parent device may be positioned closer to the end device 234a than the initial parent device (e.g., such that the updated parent device and the end device 234a may have a stronger network link), which may increase the likelihood that message transmission and/or receptions are successful. As a result, as network formation advances, the end device may determine whether to attach to an updated parent device. Although FIGS. 2C and 2D are described using an example where the relative positioning of devices may increase or decrease the network link shared between two devices, other conditions may affect the network link shared between two devices (e.g., line of sight, interference, signal obstructions, etc.). To that extent, the scenarios of FIGS. 2C and 2D are merely examples to illustrate that a network may change over time and that changes to a network may be considered in attempts to improve communications over the network.

Figure 2E:
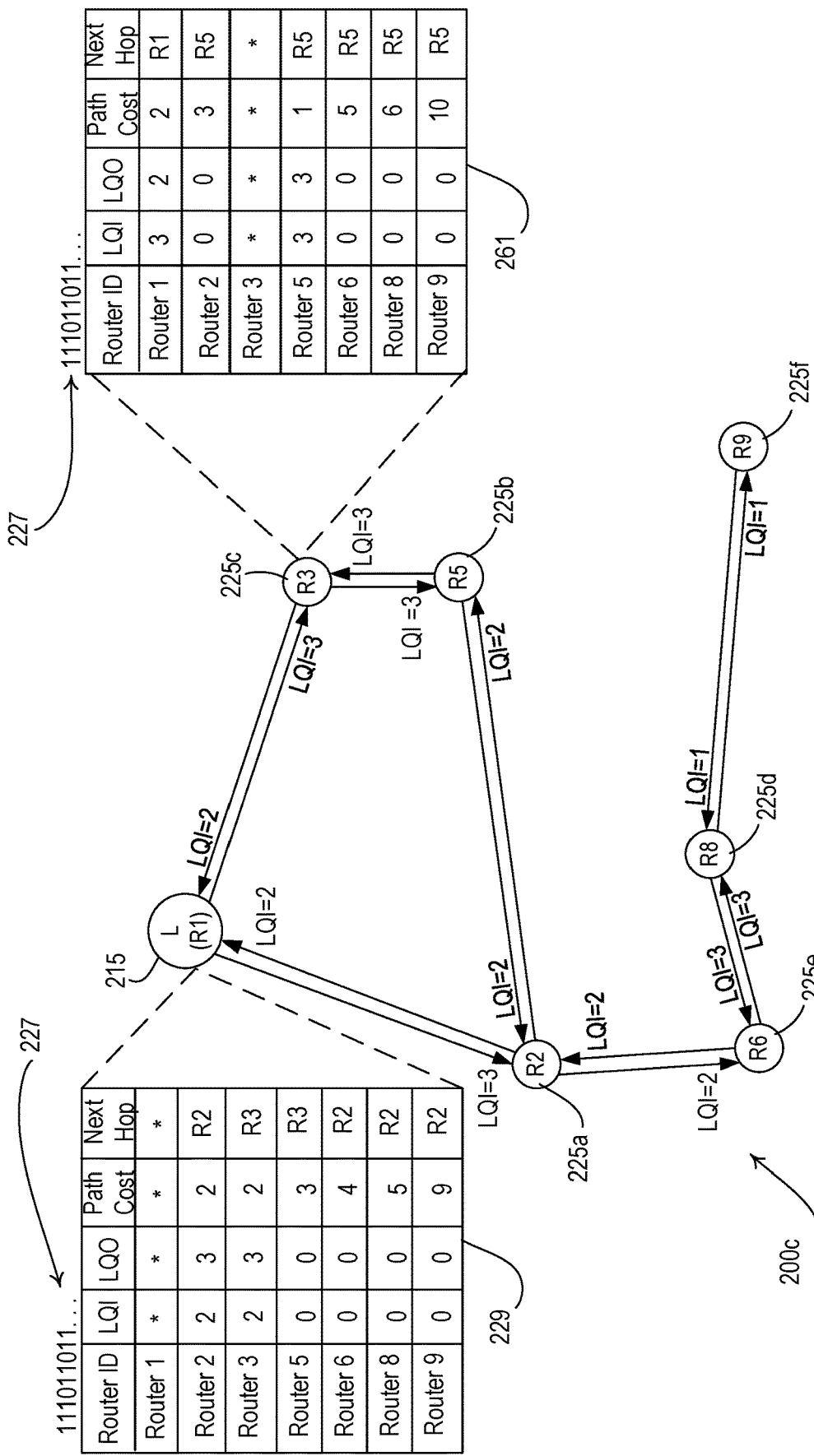
FIG. 2E is a diagram of another example network that illustrates the cost and network overhead associated with communication between the devices in the load control system of FIG. 1.

FIG. 2E is an illustration of an example network 200c. As illustrated in FIG. 2E, the network 200c may include a leader device 215 and router devices 225a, 225b, 225c, 225d, 225e, 225f. In the network 200c, the router devices (e.g., the leader device 215 and router devices 225a, 225b, 225c, 225d, 225e, 225f) may periodically transmit advertisement messages that may be used for calculating cost and/or quality of communications in the network 200c. For example, router device 225c may send an advertisement message that is received by leader device 215 and leader device 215 may send an advertisement message that is received by the router device 225c. Each router device may measure the received signal strength indicator (RSSI) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a multicast message. The advertisement messages transmitted by a router device may be received by neighboring router devices that share a single-hop network link with the router device transmitting the advertisement messages. A single-hop network link may be capable of communicating messages from a router device via a unicast and/or multicast communication directly to another router device. For example, the router devices 225a, 225c may be neighboring devices that share a single-hop network link with the leader device 215, as the router devices 225a, 225c are capable of sending messages directly to and/or receiving messages directly from the leader device 215. The single-hop network link may be a network link on which router devices may be capable of directly receiving the advertisement messages above a given link quality (e.g., LQI greater than 0).

After a router device receives a periodic advertisement message from another router device, the router device may calculate the link quality (e.g., LQI) of the network link via which the advertisement message is received. The LQI may be calculated as a predefined number that is within a range indicating different link qualities for the network link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a network link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a network link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a network link with a neighboring router device when the RSSI value of one or more advertisement messages (e.g., average RSSI value for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for network links between neighboring routing devices.

The LQI of the network links measured locally at each control device (e.g., the leader device 215 and the router device 225c) may be exchanged with the other device on the network link. For example, the LQI may be measured locally at each control device and transmitted to the other device via an advertisement message. The LQI that is measured by another router device (e.g., on the other side of the network link) and received at a router device may be stored as the link quality out (LQO) for the network link. The LQI and/or the LQO may be stored in a local router table at each routing device. For example, the leader device 215 may store the LQI and/or the LQO for the network link with each router device in the network 200c in a router table 229. Similarly, the router device 225c may store the LQI and the LQO for communicating with each router device in the network 200c in a router table 261.

As described herein, the router tables 229, 261 may each identify network information for communicating with each router in the network 200c from the perspective of the devices at which the router tables 229, 261 are stored. The number of router devices in the network 200c and/or the router identifiers in use in the network 200c may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the network link between the router devices identified in the bitmap 227. For example, the router 225c may receive the bitmap 227 from the leader device 215 and update the router table 261 to include router devices in the table 261 that are indicated in the bitmap 277, or remove router devices in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a network link with other router devices. The link quality for the network link between the two router devices may be the lesser of the value of the link quality for messages being transmitted out (e.g., LQO) and the value of the link quality for messages being received (e.g., LQI) on a single-hop network link between two devices. An LQO or an LQI of zero may indicate that the router device fails to have a direct network link with the router device listed in the router table.

Figure 2F:
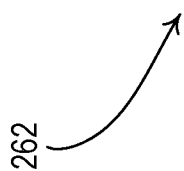
FIG. 2F is a table that illustrates example link costs that may correspond to different link qualities.

A link cost for sending communications between devices on a network link may correspond directly to the link quality of communications on the network link. The link cost may indicate a relative cost or loss of communications on the network link. FIG. 2F is an example table 262 that illustrates example link costs that may correspond to different link qualities. As shown in FIG. 2F, a greater link quality may correspond to a lower link cost for communications on the network link between two neighboring devices.

The link cost for each network link may be used by a router device to calculate a path cost for communications between the router device and another device in the network 200c. The path cost may indicate the relative cost or loss of communications on an entire communication path that may include one or more router devices. The path cost for one communication path may be compared to another to determine a higher quality communication path for sending digital communications that may have a lower relative cost associated with transmission of messages.

The path cost may indicate the overall cost for communicating a message from a starting router device to an ending router device. For example, the path cost may be calculated as the total of the link costs for each hop between the starting router device from which a message may originate and the ending router device at which the message may be received in the network 200c. Each router device may calculate the path cost to a neighboring device on a single-hop network link as being equal to the link cost and store the path cost in the locally-stored router table. For example, the router device 225c may set the path cost for communications with the leader device 215 equal to the link cost (e.g., lower of LQI and LQO) on the network link and store the path cost in the router table 261. Similarly, the router device 225c may set the path cost for communications with the router device 225b equal to the link cost (e.g., lower of LQI and LQO) on network link and store the path cost in the router table.

Each router device (e.g., leader device 215 and router devices 225a, 225b, 225c, 225d, 225e, 225f) may update the path cost for communicating messages to/from each router device in their respective router table based on the path cost information received from another router device. For example, as the router device 225b may be unable to directly communicate with the leader device 215, the router device 225b may receive path cost information for communicating messages through another router in the network 200c. The router 225c may transmit the path cost for communicating messages to/from the leader device 215 (e.g., path cost=2) in a multicast message that is received by other router devices. The multicast message may be an advertisement message, for example. The router device 225b may receive the path cost for communicating messages between the leader device 215 and the router device 225c (e.g., path cost=2). To calculate the total path cost for communicating messages between the router device 225b and the leader device 215 through the router device 225c, the router device 225b may add the link cost for communications between the router device 225b and the router device 225c (e.g., link cost=1) to the path cost received from the router device 225c (e.g., path cost=1) to get a total path cost (e.g., path cost=3). The link cost for communications between the router device 225b and the router device 225c may be determined from the link quality of the network link between the router device 225b and the router device 225c, which may be the smaller of the LQI and LQO of the network link (e.g., link quality=3).

Each router device may send/broadcast an advertisement message that includes the path cost to one or more other router devices in the network 200c. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with messages may be communicated. For example, messages transmitted from the router device 225b to the leader device 215 may be communicated through the router device 225a or the router device 225c. The router device 225b may receive respective advertisement messages from the router device 225a and the router device 225c that indicate the path cost for communication of messages between the router device 225a and the leader device 215 is the same as the path cost for communication of messages between the router device 225c and the leader device 215 (e.g., path cost=2 on each network link). The router device 225b may add the link cost calculated for communicating messages between the router device 225b and the router device 225c (e.g., link cost=1) to the path cost information received in the advertisement message from the router 225c (e.g., path cost=2) to determine the total path cost for communicating with the leader device 215 through the router device 225c (e.g., total path cost=3). The router device 225b may similarly add the link cost calculated for communicating messages between the router 225b and the router 225a (e.g., link cost=2) to the path cost information received in the advertisement message from the router 225a (e.g., path cost=2) to determine the total path cost for communicating with the leader device 215 through the router device 225a (e.g., total path cost=4). The router device 225b may update a locally-stored router table with the lowest calculated path cost for communicating with the leader device 215 and/or the identifier of the router device through which messages are to be transmitted (e.g., router 225c). Each router device may similarly update their respective locally-stored router table with the lowest calculated path cost for communicating with the other router devices in the network 200c. For example, as shown in FIG. 2E, the leader device 215 and the router device 225c may each calculate the lowest path cost for communicating to other router devices in the network 200c and store the path cost in the respective router tables 229, 261. The router tables 229, 261 may also have stored therein the router identifier of the next hop from the respective devices 215, 225c through which messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating messages to other router devices in the network 200c. The router device may use the best communication path (e.g., lowest cost path) for communicating messages to another device. This routing mechanism may allow router devices to detect when other router devices have dropped off the network 200c, or a path cost between routers has changed, and calculate the next lowest cost path to maintain connectivity to other router devices in the network 200c.

In an effort to distinguish relatively older data being transmitted in the periodic advertisement messages from relatively newer data transmitted in the periodic advertisement messages, the advertisement messages may be communicated with a sequence number. The leader device, such as leader device 215, may be responsible for updating the sequence number and distributing the updated sequence number to the other router devices in the network (e.g., router devices 225a, 225b, 225c, 225d, 225e, 225f in network 200c). For example, the leader device 215 may increment the sequence number periodically (e.g., after transmission of one or more advertisement messages) and/or after a router device is added to the network. The sequence number may be updated to allow router devices in the network (e.g., leader device 215 and/or router devices 225a, 225b, 225c, 225d, 225e, 225f in network 200c) to identify updated network information transmitted in advertisement messages. For example, as router devices (e.g., leader device 215 and/or router devices 225a, 225b, 225c, 225d, 225e, 225f in network 200c) may be periodically communicating advertisement messages that include path cost information that indicates the path cost for communicating with other router devices in the network, the sequence number may be updated to identify the updated path cost information.

After the leader device 215 updates the sequence number, the leader device 215 may distribute the sequence number to other router devices in the network. For example, the leader device 215 may use the sequence number in its own advertisement messages. After receiving the updated sequence number, each router device may use the updated sequence number for subsequent advertisement messages transmitted from the router device on the network. Each sequence number transmitted from the leader device 215 to the other router devices may be used in the advertisement messages for the router devices until a subsequent sequence number is distributed by the leader device 215. For example, the router device 225c may receive the sequence number directly from the leader device 215 and use the sequence number in subsequent advertisement messages. The router device 225b may receive the sequence number in the advertisement messages transmitted from the router device 225c and use the sequence number in subsequent advertisement messages transmitted from the router device 225b. The routers may each use the current sequence number until an updated sequence number is received that is originated at and distributed from the leader device 215. Each router device may update the locally-stored network information in the router table when the router device receives an advertisement message from a non-leader router device (e.g., router devices 225a, 225b, 225c, 225d, 225e, 225f) that has an updated sequence number. If a router device receives an advertisement message that has the same sequence number as a previously received advertisement message, and/or previously received from the same non-leader router device, the router device may fail to process the advertisement message. If a router device fails to receive an updated sequence number within a predefined period of time (e.g., minutes, seconds, etc.), the router may assume the leader device 215 is unavailable for communications (e.g., offline, powered off, dropped from the network, changed roles, or is otherwise unable to communicate with the router device) and attempt to form another network or network partition having another leader device 215.

Figure 3A:
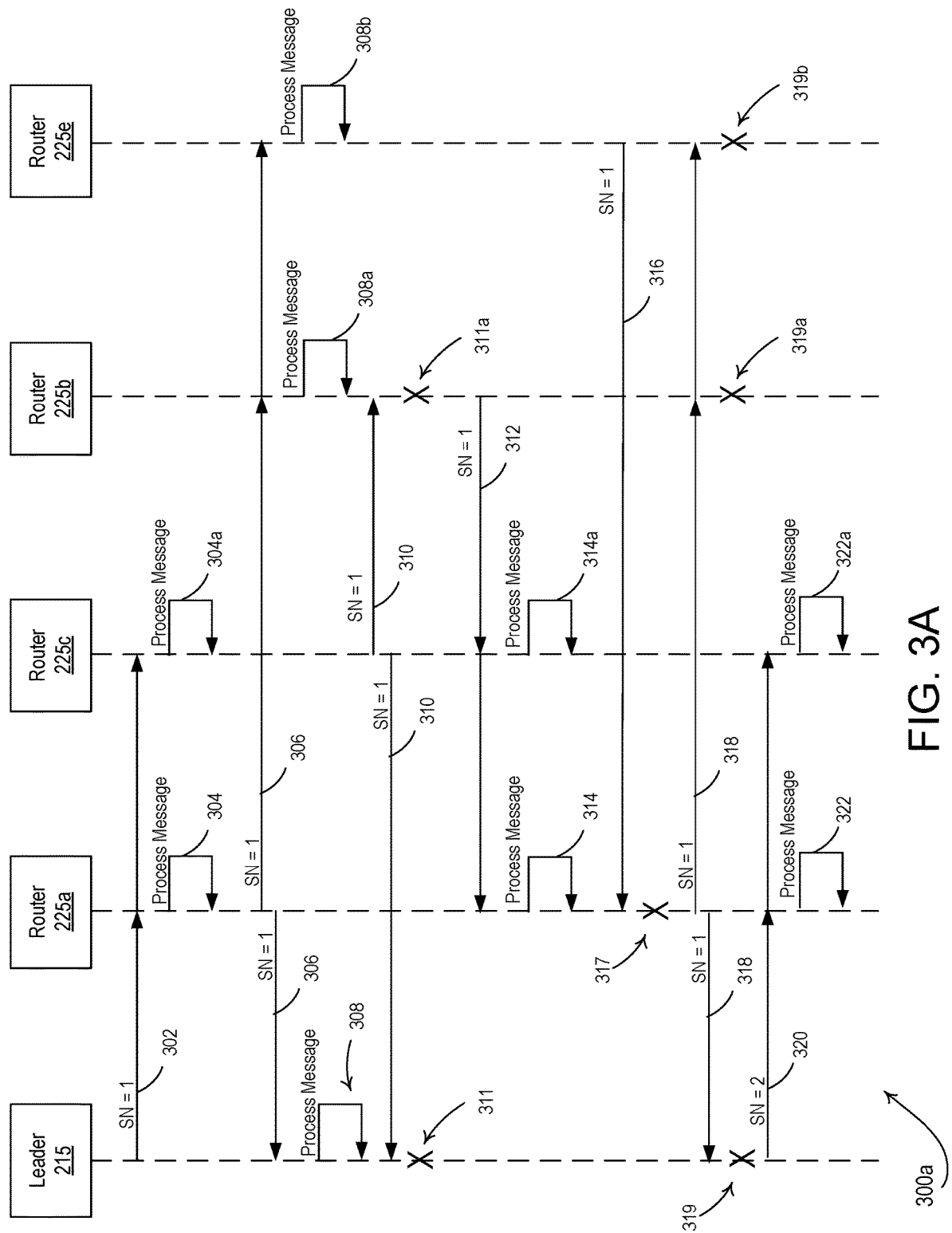
FIGS. 3A and 3B are sequence flow diagrams illustrating example advertisement messages communicated between devices in a network.
Figure 3B:
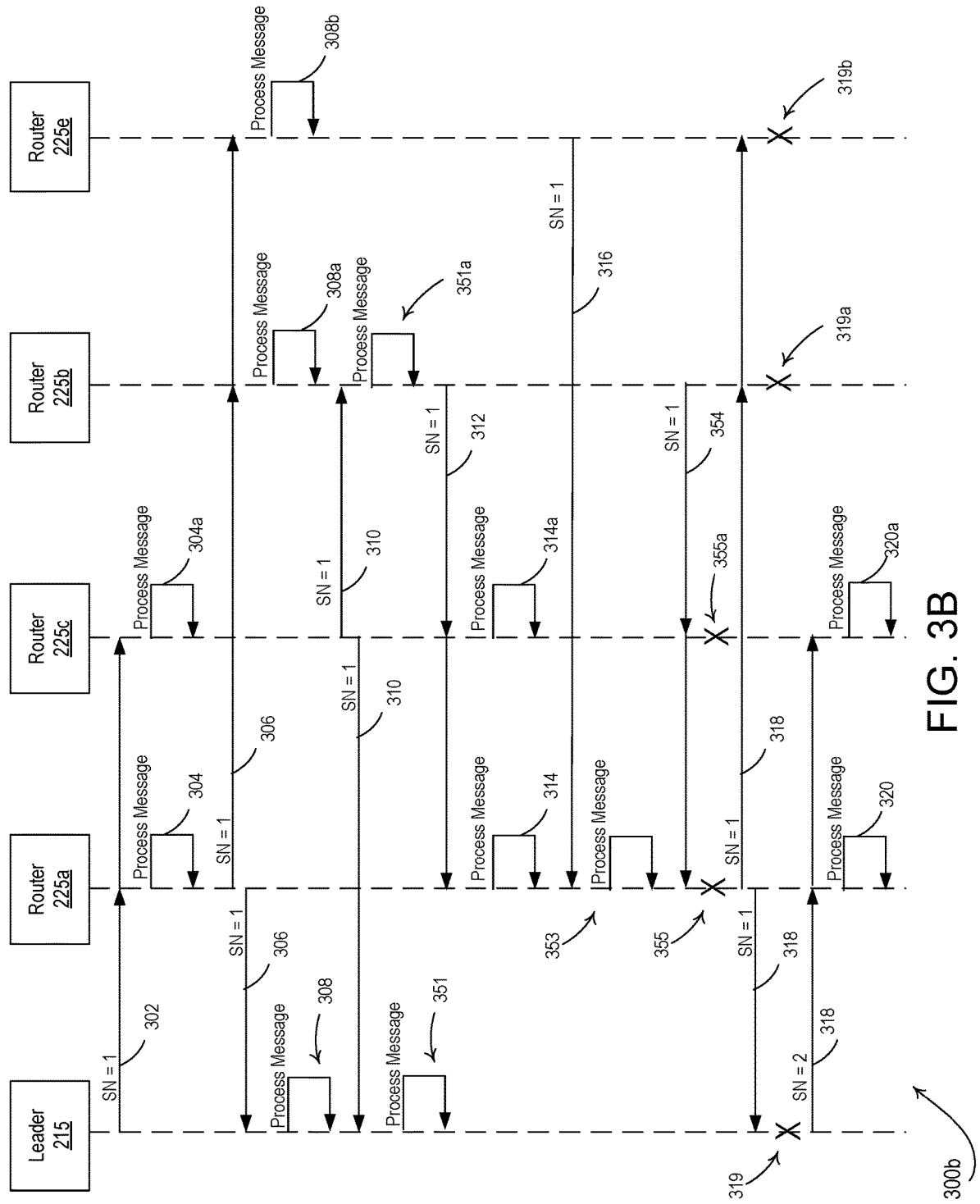

FIGS. 3A and 3B are illustrations of sequence flow diagrams illustrating example advertisement messages communicated between devices in networks 300a, 300b, respectively, using sequence numbers to process the advertisement messages. The example networks 300a, 300b each include a subset of the devices in the network 200c shown in FIG. 2E as an example, though other networks having other configurations may operate similarly. For example, the networks 300a, 300b include the leader device 215 and router devices 225a, 225b, 225c, and 225e. As shown in FIG. 2E, router device 225a and router device 225c may each share a single-hop network link with the leader device 215. Router 225b may share a single-hop network link with each of the router device 225a and the router device 225c. The router device 225e may share a single-hop network link with the router 225a.

In the example network 300a as illustrated in FIG. 3A, the leader device 215 and the other router devices 225a, 225b, 225c, and 225e may process advertisement messages based on a sequence number. As shown in FIG. 3A, the leader device 215 may generate the sequence number that is used in advertisement messages transmitted by other router devices. As described herein, the leader device 215 may generate a sequence number and update the sequence number for being used in advertisement messages in the network 300a to distinguish data being transmitted by router devices in the network. For example, the sequence number may be incremented periodically (e.g., after transmission of one or more advertisement messages) by the leader device 215 and/or after a router device is added to the network to allow router devices in the network (e.g., leader device 215 and/or router devices 225a, 225b, 225c, 225e in network 300a) to identify updated network information transmitted in advertisement messages. The updated network information may include updated link quality information (e.g., LQI and/or LQO) and/or path cost information that indicates the path cost for communicating with other router devices in the network 300a.

The leader device 215 may use the sequence number in an advertisement message 302 transmitted from the leader device 215. The advertisement message 302 may be received by router devices 225a and 225c that each share a single-hop network link with the leader device 215. The router device 225a and router device 225c may each process the advertisement message 302 at 304 and 304a, respectively. The router devices 225a, 225c may each identify the advertisement message 302 as including an updated sequence number (e.g., sequence number, SN, =1) from the leader device 215. The router devices 225a, 225c may update their locally-used sequence number to reflect the sequence number received from the leader device 215.

The router devices 225a, 225c may use the sequence number from the leader device 215 in their own advertisement messages. The router devices 225a, 225c may each also process another advertisement message that is subsequently received from another non-leader router device (e.g., a router device other than the leader 215). The router devices 225a, 225c may identify the sequence number as being received in an advertisement message from the leader device 215 and allow processing of another advertisement message received from another non-leader router device.

Each of the router devices 225a, 225c may periodically transmit their own advertisement messages to "upstream routers" toward the leader device 215 and/or "downstream routers" from the leader device 215 using the sequence number received from the leader device 215. The advertisement messages from each router device may be transmitted randomly within a predefined period of time. As shown in FIG. 3A, router device 225a may transmit an advertisement message 306 as a multicast message. The advertisement message 306 may be received by the leader device 215, the router device 225b, and/or the router device 225e. The leader device 215 and/or the router devices 225b, 225e may each share a single-hop network link with the router device 225a. The leader device 215 may identify the sequence number in the advertisement message 306 (e.g., sequence number=1). As the leader device 215 has yet to process an advertisement message from a non-leader router device that includes the identified sequence number, the leader device 215 may process the advertisement message 306 at 308. As the leader device 215 may be the single leader device in the network, each advertisement message received by the leader device 215 may be received from a non-leader router device. The router devices 225b, 225e may each identify the sequence number in the advertisement message 306 (e.g., sequence number=1). As each of the router devices 225b, 225e has yet to process an advertisement message from a non-leader router device that includes the identified sequence number (e.g., sequence number=1), the router devices 225b, 225e may each process the advertisement message 306 at 308a and 308b, respectively. The processing of the advertisement message 306 may include identifying updated network information. For example, the processing of the advertisement message 306 may include identifying updated link quality information (e.g., LQI and/or LQO) and/or path cost information in the advertisement message 306, which may result in updates to the network information in the locally-stored router table at the router devices 225b, 225e to improve network communications.

After receipt of the advertisement message 306 at the router devices 225b, 225e, the router devices 225b, 225e may identify the updated sequence number being used in the advertisement message 306. The router devices 225b, 225e may each store the updated sequence number for use in their own advertisement messages. Each of the router devices 225b, 225e may periodically transmit their own advertisement messages using the sequence number. The sequence number may be used by the router devices 225b, 225e in advertisement messages sent to "downstream routers" (not shown) and/or "upstream routers" (e.g., leader device 215, router device 225a, router device 225c) in the network 300a.

As shown in FIG. 3A, router device 225c may transmit an advertisement message 310. The advertisement message 310 may be transmitted after a random time period as a multicast message. The advertisement message 310 may be received by the leader device 215 and the router device 225b. The leader device 215 and/or the router devices 225b may each share a single-hop network link with the router device 225c. The leader device 215 may identify the sequence number in the advertisement message 310 (e.g., sequence number=1). As the leader device 215 has already processed an advertisement message from a non-leader router device that includes the identified sequence number (e.g., the advertisement message 306 processed at 308), the leader device 215 may fail to process the advertisement message 310 at 311. For example, the leader device 215 may ignore and/or discard the advertisement message 310 at 311. The router device 225b may similarly identify the sequence number in the advertisement message 310 (e.g., sequence number=1). As the router device 225b has already processed an advertisement message from a non-leader router device that includes the identified sequence number (e.g., the advertisement message 306 processed at 308a), the router device 225b may fail to process the advertisement message 310 at 311a. For example, the router device 225b may ignore and/or discard the advertisement message 310 at 311a. The failure of the leader device 215 and/or the router device 225b to process the advertisement message 310 from the router device 225c may conserve local memory and/or processing resources. However, failure to process the advertisement message 310 may result in the leader device 215 and/or the router device 225b failing to process the network information in the advertisement message 310. For example, the leader device 215 and/or the router device 225b may fail to identify updated link quality information (e.g., LQI and/or LQO) and/or path cost information in the advertisement message 310, which may result in a failure to update the locally-stored router table at the leader device 215 and/or the router device 225b to improve network communications.

The router device 225b may periodically transmit advertisement messages using the sequence number identified in the advertisement message 306. The router device 225b may transmit an advertisement message 312 as a multicast message. The advertisement message 312 may be received by the router device 225a and/or the router device 225c. The router device 225a and the router device 225c may each share a single-hop network link with the router device 225b. The router device 225a and the router device 225c may each identify the sequence number in the advertisement message 312 (e.g., sequence number=1). As the router device 225a has yet to process an advertisement message from a non-leader router device that includes the identified sequence number, the router device 225a may process the advertisement message 312 at 314. Similarly, as the router device 225c has yet to process an advertisement message from a non-leader router device that includes the identified sequence number, the router device 225c may process the advertisement message 312 at 314a. The processing of the advertisement message 312 may include identifying updated network information. For example, the processing of the advertisement message 312 may include identifying updated link quality information (e.g., LQI and/or LQO) and/or path cost information in the advertisement message 312, which may result in updates to the network information in the locally-stored router table at each device (e.g., the router device 225a and the router device 225c).

As shown in FIG. 3A, router device 225e may transmit an advertisement message 316. The advertisement message 316 may be transmitted after a random time period as a multicast message. The advertisement message 316 may be received by the router device 225a. The router device 225a may each share a single-hop network link with the router device 225e. The router device 225a may identify the sequence number in the advertisement message 316 (e.g., sequence number=1). As the router device 225a has already processed an advertisement message from a non-leader router device that includes the identified sequence number (e.g., the advertisement message 312 processed at 314), the router device 225a may fail to process the advertisement message 316 at 317. For example, the router device 225a may ignore and/or discard the advertisement message 316 at 317. The failure of the router device 225a to process the advertisement message 316 from the router device 225e may save on local memory and/or processing resources. However, failure to process the advertisement message 316 may result in the router device 225a failing to process the network information in the advertisement message 316. For example, the router device 225a may fail to identify updated path cost information in the advertisement message 310, which may result in a failure to update the locally-stored router table at the router device 225a to improve network communications.

Additionally, as the router device 225a is the router device in the path that allows the router 225e to communicate with the leader device 215, the leader device also fails to receive the updated network information in the advertisement message 316. For example, the router device 225a may transmit an advertisement message 318 after failing to process the advertisement message 316 at 317. The advertisement message 318 may fail to include the updated network information based on the network information in the advertisement message 316. Additionally, as the advertisement message 318 includes the same sequence number (e.g., sequence number=1) as an advertisement message previously received from a non-leader router device at leader device 215 and router devices 225b, 225e, the leader device 215 and the router devices 225b, 225e may fail to process the advertisement message 318 at 319, 319a, and 319b, respectively. As such, the updated network information fails to be transmitted to and/or received by the leader device 215 for updating the network information stored locally thereon for improving network communication.

The leader device 215 may transmit another advertisement message 320 (e.g., periodically or after a router device is added to the network 300a). The advertisement message 320 may include an updated sequence number (e.g., sequence number=2). The advertisement message 320 may be received by router device 225a and router device 225c that each share a single-hop network link with the leader device 215. The router device 225a and router device 225c may each process the advertisement message 320 at 322 and 322a, respectively. The router devices 225a, 225c may each identify the advertisement message 320 as including an updated sequence number (e.g., sequence number=2) from the leader device 215 and may update their locally-used sequence number to reflect the sequence number received from the leader device 215. The router devices 225a, 225c may use the updated sequence number from the leader device 215 in their own subsequent advertisement messages. The router devices in the network 300a may each continue to process an advertisement message that is received from a non-leader router device (e.g., a router device other than the leader 215), as described herein.

When router devices process advertisement messages from other router devices as illustrated in the network 300a, router devices may be competing with each other for using a given sequence number in an advertisement message to have their advertisement message and the network information therein processed by other router devices. The router devices may be competing for use of a given sequence number in their router messages, because once a router device receives an advertisement message with the sequence number from a non-leader router device it may fail to process the next advertisement message with the same sequence number. A router device may lose to another competing router device when its network information fails to be propagated through the network because their advertisement message with a particular sequence number happens to be transmitted/received after an advertisement message of another router device having the same sequence number. Router devices that each share a single-hop network link with a common router device may be directly competing for an earlier use of a given sequence number. For example, router 225a and 225c may be competing to have advertisement messages processed by the leader device 215; and the router devices 225b and 225e may be competing to have advertisement messages processed by the router device 225a. A router device may also be multiple hops from another router device in the network, which may result in multiple router devices competing to use sequence numbers to communicate advertisement messages to share updated network information (e.g., link quality information and/or path cost information) with upstream router devices. For example, in order for the router device 225e to be able to share updated network information with leader device 215, the router device 225e may compete with router 225b for an earlier use of a sequence number in an advertisement message transmitted to router device 225a, and then router device 225a may compete with router 225c for an earlier use of a sequence number in an advertisement message transmitted to leader device 215.

The router devices that are closer to the leader device 215 (e.g., router devices that are a fewer number of hops from the leader device 215) may have the opportunity to receive and use the updated sequence numbers provided by the leader device 215 before the router devices that are further from the leader device 215 (e.g., router devices that are a greater number of hops from the leader device 215). This may result in the router devices that are closer to the leader device 215 having their advertisement messages processed more frequently by other router devices than router devices that are further from the leader device 215. For example, the router devices 225a, 225c may receive the updated sequence numbers before the router devices 225b, 225e, which may result in the router devices 225a, 225c having a greater chance of using the updated sequence numbers before the router devices 225b, 225e. This means that router devices 225a, 225c may have a greater chance of having their network information propagated to other router devices in the network than router devices 225b, 225e.

Though the network 300a is shown as an example, the competition for use of the sequence number may increase as the network grows. As a router device's single-hop network links to other router devices increases, the competition for the use of the sequence number increases. For example, in a network with a router device having a single-hop network link to 16 other routers, each of the 16 router devices transmitting periodic advertisement messages back to the one router may have 1-in-15 chance of being an advertisement that the one router device processes.

The link quality on a given network link may affect a router device's ability to send/receive advertisement messages having the updated sequence number. For example, the link quality on the network link between the router device 225a and the leader device 215 may be worse than the link quality on the network link between router device 225c and the leader device 215. As a result, the router device 225a may receive an advertisement message with an updated sequence number later than the router device 225c (e.g., due to packet loss) and may begin using the updated sequence number in its own advertisement messages later. Due to similar link quality differences, an advertisement message that is sent from the router device 225a and includes a given sequence number may be received at the leader device 215 later than an advertisement message that is sent from the router device 225c and includes the same sequence number, even though the router device 225a may have begun using the sequence number in advertisement messages earlier.

Router devices being unable to communicate updated network information may delay or prevent improvements in link quality for incoming communications to a router device and/or children of the router device. A router device may be able to update network information stored locally thereon to improve the path cost for communications being sent out on the network, but the router device may be unable to transmit the updated network information out to other router devices which may result in the path cost failing to be improved, or the improvement being delayed, for incoming communications from other router devices. The router devices that have a lower link quality and/or greater path cost for network communications may be the router devices that would benefit greater from other router devices (e.g., "upstream" router devices) updating locally-stored network information to enable an updated path for communications to the router device on the network. A degraded link quality for a network link may be caused by long-term interference, or shorter-term interference (e.g., spikes of increased noise on the network, such as streaming multimedia or other data over the network). Degraded link quality caused by long-term interference may eventually be resolved by an updated path for network communications, but degraded link quality caused by short-term interference may be more difficult to address due to the inability of a router device to identify the shorter-term changes in the link quality.

The router devices failing to be able to communicate updated network information to the leader device 215 may result in the leader device 215 failing to update the bitmap on which each of the router devices bases its locally-stored router table. As described herein, the leader device 215 may be the device responsible for updating the bitmap indicating the number of router devices in the network and/or the router identifier for each of the router devices in the network. The router devices in the network may maintain the link quality information and/or path cost information for each of the router devices indicated in the bitmap. An indication of a link quality or path cost below a given threshold (e.g., a poor link quality of 0 or 1) may be an implicit request to the leader device 215 to downgrade a router device's role, or that the router device has left the network, and allow the leader device 215 to update the bitmap for being distributed to the other router devices. For example, due to a delay in receiving updated link quality information for a network link between router devices, the leader device 215 may delay the downgrading (e.g., to an end device) of a router device (e.g., to allow for children of the router device to attach to another router, to free up a router identifier in the bitmap for another device to be upgraded, etc.) or identification of a router device having left the network (e.g., been unplugged, battery dies, or otherwise powers down). Without an updated bitmap, the router devices may each maintain the network information for each router device, which may unnecessarily occupy resources on the router devices. Without the updated bitmap, other devices in the network may be prevented from being upgraded to a router device role to improve network communications.

In the example network 300b as illustrated in FIG. 3B, the leader device 215 and the other router devices 225a, 225b, 225c, and 225e may process advertisement messages based on a sequence number and a device identifier. For example, the leader device 215 and the other router devices 225a, 225b, 225c, and 225e may each receive an advertisement and identify both the sequence number and the router identifier or another unique identifier of the router device to determine whether a prior advertisement message has been received from the same router device with the same sequence number. Advertisement messages that are received with the same sequence number and router identifier as a previously-received advertisement message may fail to be processed (e.g., ignored and/or discarded).

The sequence flow in FIG. 3B includes the same advertisement messages 302, 306, 310, 316, 318 transmitted to/from the same router devices as illustrated in FIG. 3A. However, in the network 300b additional advertisement messages may be processed. For example, the leader device 215 and the router device 225b may each receive the advertisement message 310 and identify the sequence number and router identifier (e.g., or other unique identifier of the router device 225c) in the advertisement message 310. The leader device 215 and the router device 225b may each compare the sequence number and router identifier in the advertisement message 310 to information stored from previously received advertisement messages. As shown in FIG. 3B, the leader device 215 and the router device 225b may each process the advertisement message 310 at 351 and 351a, respectively. Though the leader device 215 and the router device 225b may have each previously received the advertisement message 306 with the same sequence number as the sequence number in the advertisement message 310 (e.g., sequence number=1), the advertisement message 310 may be processed as the advertisement message 306 was received from another non-leader router device (e.g., router device 225a). Similarly, the router device 225a may receive the advertisement message 316 and compare the sequence number and router identifier in the advertisement message 316 to information stored from previously received advertisement messages. As shown in FIG. 3B, the router device 225a may process the advertisement message 316 at 353. The ability for the router devices (e.g., leader device 215 and router devices 225a, 225b, 225c, 225e) to each have an advertisement message processed that uses the sequence identifier may allow for updated network information (e.g., link quality information and/or path cost information) to be identified by other router devices to improve network communications.

Router devices that identify an advertisement message as having the same sequence number and router identifier (e.g., or other unique identifier of the router device 225c) as a previously-received advertisement message from a non-leader router device may fail to process the advertisement message. As shown in FIG. 3B, router device 225a and router device 225c may each receive advertisement message 354 that is transmitted from router device 225b. The advertisement message 354 may include the same sequence number (e.g., sequence number=1) as the advertisement message 312 that was previously transmitted from the router device 225b. The router device 225a and the router device 225c may each identify the sequence number and the router identifier (e.g., or other unique identifier of router device 225c) as being the same as the sequence number and router identifier received in the advertisement message 312 and fail to process the advertisement message 354 at 355 and 355a, respectively. As the router device 225a and the router device 225c have each already processed an advertisement message from the same non-leader router device that includes the same identified sequence number, the advertisement message 354 may fail to be processed. For example, the router device 225a and the router device 225c may each ignore and/or discard the advertisement message 354 at 355 and 355a, respectively. The failure of the router device 225a and the router device 225c each to process the advertisement message 354 may save on local memory and/or processing resources.

As shown in FIG. 3B, the leader device 215 and/or router devices 225a, 225b, 225c, 225e may perform additional processing of advertisement messages by processing multiple advertisement messages that have the same sequence number. The processing of advertisement messages may be limited by processing an advertisement message having the same sequence number from each non-leader router device in the network 300b. This additional processing may allow for the propagation of updated network information to the leader device 215 and/or router devices 225a, 225b, 225c, 225e in the network 300b. In relatively smaller networks (e.g., residential networks having a relatively smaller number of devices on the network) operating similar to the network illustrated in FIG. 3A, the updated network information may be propagated to other devices in the network relatively quickly (e.g., even seamlessly), as the number of devices competing to use the same sequence number within a period of time may be relatively low. In relatively larger networks (e.g., commercial networks having a relatively larger number of devices on the network) operating similar to the network illustrated in FIG. 3A, the updated network information may be propagated to other devices in the network relatively slowly, as the number of devices competing to use the same sequence number within a period of time may be relatively high and, based on the location of the device in the network, the amount of delay for propagating information to other devices may increase exponentially. This additional processing of advertisement messages shown in the network 300b of FIG. 3B may allow for the propagation of updated network information in larger and smaller networks.

As shown in FIG. 3B, the router device 225a may transmit an advertisement message 318 after processing the advertisement message 316 at 353. The advertisement message 318 may include the updated network information based on the network information in the advertisement message 316 received from router device 225e. As such, the updated network information may be updated at the router device 225a and have a better chance of being transmitted to and/or received by the leader device 215 for updating the network information stored locally thereon for improving network communication. As the advertisement message 318 includes the same sequence number (e.g., sequence number=1) as an advertisement message previously received from a non-leader router device at leader device 215 and router devices 225b, 225e (e.g., sequence number in advertisement message 306), the leader device 215 and the router devices 225b, 225e may fail to process the advertisement message 318 at 319, 319a, and 319b, respectively. However, the updated network information is stored locally at the router device 225a and may be distributed to the leader device 215 in the next successful advertisement message that is processed at the leader device 215 (e.g., when the leader device 215 next updates the sequence number). As a result, the updated network information may be propagated throughout the network more quickly.

Figure 4A:
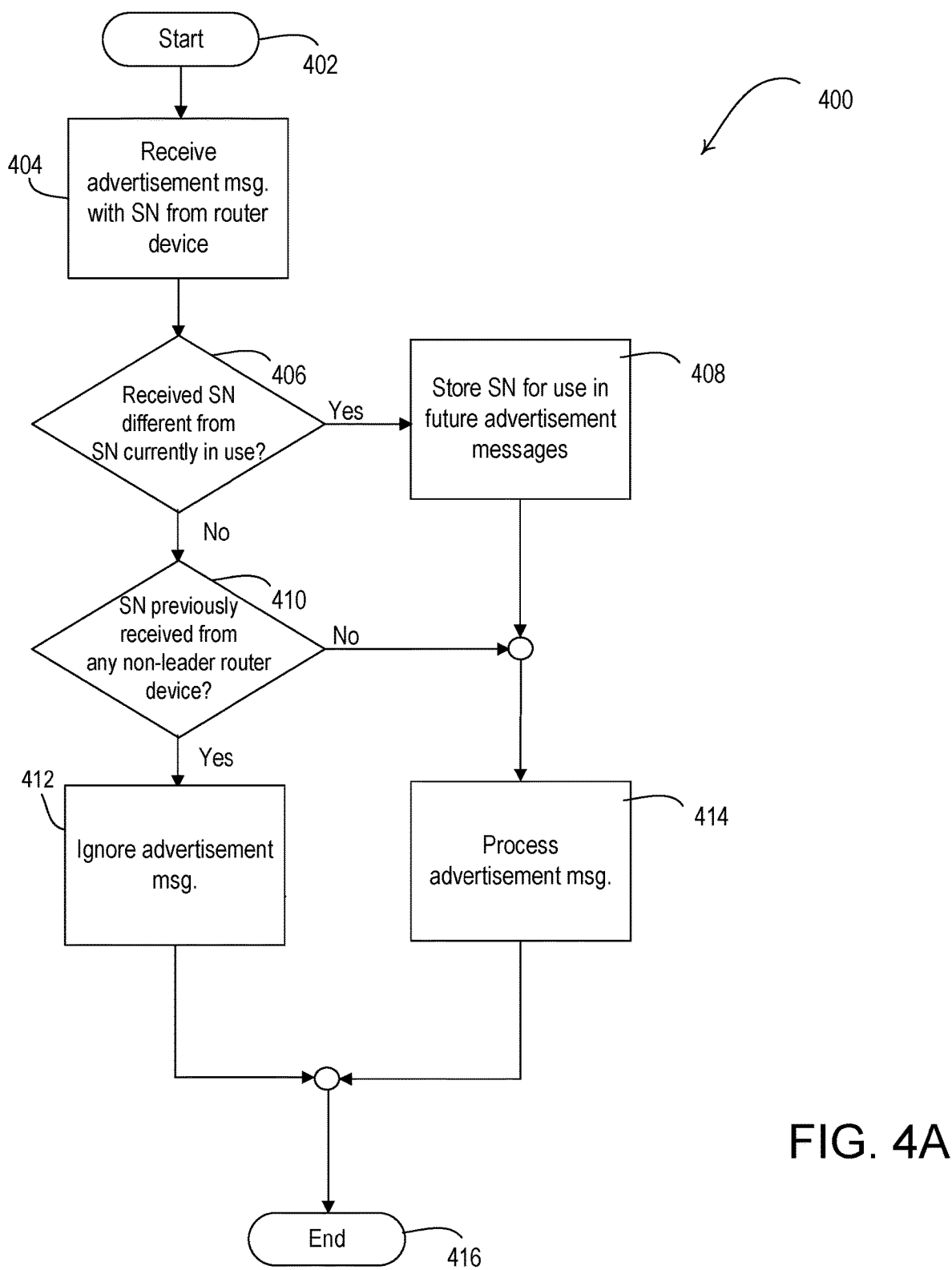
FIGS. 4A and 4B are a flowcharts of an example procedures that may be performed by a router device.

FIG. 4A is a flow diagram of an example procedure 400 for processing advertisement messages. The procedure 400 may be performed by a router device (e.g., leader device or another router device). For example, the router device may start the procedure 400 at 402 and may receive an advertisement message from another router device at 404. The advertisement message may include a sequence number. At 406, the router device may determine whether the received sequence number in the advertisement message is different from the sequence number currently being used by the router device for transmission of its own advertisement messages. If the received sequence number is different from the sequence number currently stored at the router device for being included in its own advertisement messages, the router device may store the sequence number for being used in future advertisement messages transmitted from the router device at 408.

If the sequence number is recognized as being previously received by the router device, the router device may determine at 410 whether the sequence number was previously received from a non-leader router device. If the sequence number in the advertisement message was previously received in an advertisement message from a non-leader router device, the advertisement message may be ignored and/or discarded at 412. If the sequence number was not previously received in an advertisement message from a non-leader router device (e.g., previously received by a leader device or failed to be previously received), the advertisement message may be processed at 414. The procedure 400 may end at 416.

Figure 4B:
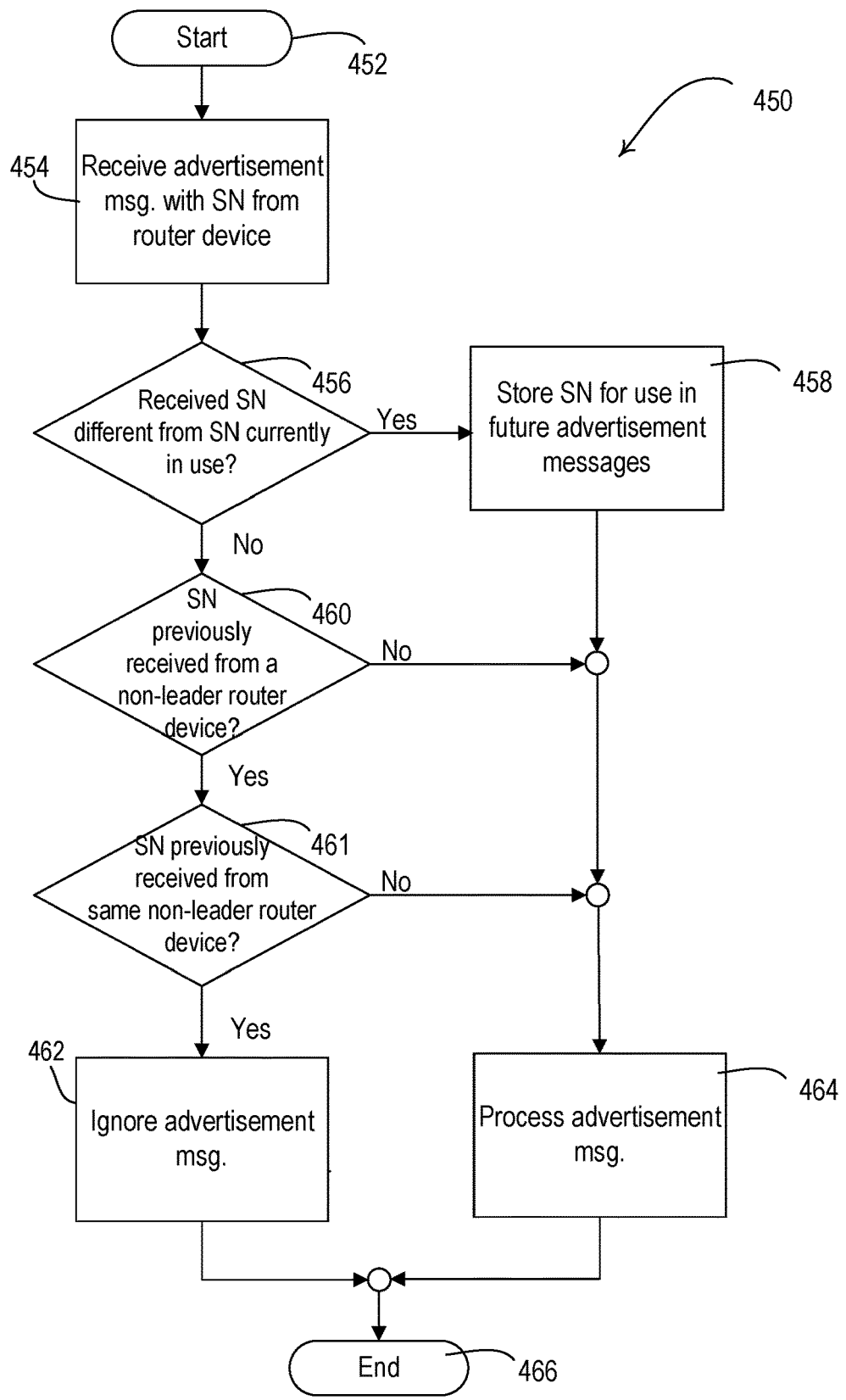

FIG. 4B is a flow diagram of another example procedure 450 for processing advertisement messages. The procedure 450 may be performed by a router device (e.g., leader device or another router device). For example, the router device may start the procedure 450 at 452 and may receive an advertisement message from another router device at 454. The advertisement message may include a sequence number and/or a router identifier (e.g., or another unique identifier of the router device). At 456, the router device may determine whether the received sequence number in the advertisement message is different from the sequence number currently being used by the router device for transmission of its own advertisement messages. If the received sequence number is different from the sequence number currently stored at the router device for being included in its own advertisement messages, the router device may store the sequence number for being used in future advertisement messages transmitted from the router device at 458.

If the sequence number is recognized as being previously received by the router device, the router device may determine at 460 whether the sequence number was previously received in an advertisement message from a non-leader router device. The sequence number may be compared to the sequence number previously received in advertisement messages from non-leader router devices. If the sequence number in the advertisement message failed to be previously received from a non-leader router device, the advertisement message may be processed at 464. If the sequence number in the advertisement message was previously received in an advertisement message from a non-leader router device, the router device may determine at 461 whether the non-leader router device was the same non-leader router device from which a prior advertisement message was received with the sequence number. For example, the router device may compare the router identifier (e.g., or another unique identifier of the router device) with the router identifier (e.g., or another unique identifier of the router device) of the router device from which advertisement messages were received having the same sequence number. The router device may compare the sequence number and router identifier received in the advertisement message to a table of sequence numbers and router identifiers received in prior advertisement messages. The table may be refreshed after each updated sequence number is identified. If the sequence number was not previously received in an advertisement message transmitted by the same non-leader router device, the advertisement message may be processed at 464. If the sequence number was previously received in an advertisement message transmitted by the same non-leader router device, the advertisement message may be ignored at 462. The procedure 400 may end at 466.

The advertisement messages may be used by the control devices receiving the advertisement message to determine the health of the network. The health of the network may be determined from the perspective of each control device (e.g., each leader device and/or router device) based on whether the control device has received an advertisement message with an updated sequence number within a predefined period of time. As described herein, the leader device may generate an updated sequence number and transmit the updated sequence number to the router devices with which the leader device shares a single-hop network link. If the router devices that share the single-hop network link with the leader device receive the updated sequence number within a predetermined period of time since the last sequence number was received, the router devices may identify that the leader device is operating appropriately and determine that the network is healthy. The router devices that share the single-hop network link with the leader device may maintain the current network link with the leader device and begin transmitting their own advertisement messages using the updated sequence number to inform "downstream" router devices of the health of the network.

If a router device in a network partition fails to receive an advertisement message with an updated sequence number within a period of time (e.g., 120 seconds, 240 seconds, or another threshold period of time), the router device may assume the leader device has left the network, or is otherwise unable to communicate properly. For example, the leader device may be powered down or otherwise unable to communicate for a period of time. As each router device in the network determines that the leader device has left the network, or is otherwise unable to communicate for a period of time (e.g., 120 seconds, 240 seconds, or another threshold period of time), the router devices may each detach from the network and attempt to attach to another network and/or network partition.

When another network and/or network partition is unavailable, the control devices may each attempt to start their own network and/or network partition. After the control devices detach from the network, the control devices may each set their role as the leader device and begin transmitting advertisement messages that include a partition identifier for the new network and/or network partition. For example, the control devices may each perform a similar process as was performed at the initial network formation to identify a leader device for the network. Each control device may transmit their respective role as the leader device in advertisement messages with a partition identifier in an effort to allow other control devices to attach to the network partition.

As described herein, a priority may be assigned based on a partition identifier and/or number of devices in a given network partition. Each leader device may include the partition identifier (e.g., a partition ID) for their network partition and the higher or lower partition identifier may be given priority over the other. A network partition may be associated with a partition identifier. The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. The partition identifier may be selected at a leader device and transmitted in advertisement messages to other devices that may attach to the leader device.

Referring to FIG. 2B, the network partitions 201, 202, 203 may each be associated with a respective partition identifier. As described in another example herein, the network partition 202 may be assigned a partition identifier of 1, the network partition 203 may be assigned a partition identifier of 2, and the network partition 201 may be assigned a partition identifier of 3. A higher or lower partition identifier may indicate a higher priority value for the network partition priority (e.g. network partition 201 may be a higher-priority network partition than the network partitions 202, 203 based on the partition identifier).

As also described herein, priority may be assigned to a respective network partition based on a number of control devices (e.g., router devices and/or end devices) in the network partition. Referring again to FIG. 2B, the network partition 201 may be given higher priority than the network partition 203, as the network partition 201 may have a greater number of control devices in the network partition. Each device in a network partition may have stored locally thereon the number of control devices in the network partition. Network partitions that have the same number of devices may be given different priorities using different partition identifiers, as described herein. For example, as shown in FIG. 2B, the network partition 201 and the network partition 202 may have the same number of devices (e.g., router devices and/or end devices). The network partition 201 may have a higher priority based on the network partition 201 having a higher or lower partition identifier.

When reforming the network after the loss of the previous leader device, the control devices that are attempting to form a network partition may transmit advertisement messages and receive advertisement messages from other control devices attempting to form another network partition. Each leader device may use the priority of each network partition to identify whether to maintain their role as a leader device on a higher-priority network partition or attach to a higher-priority network partition. For example, the leader device of a network partition may identify advertisement messages from router devices in another network partition and determine that the other network partition has a higher priority. When a leader device identifies that another network partition has a higher priority, the leader device may downgrade its role to a router device or an end device and attempt to attach to a router device in the network partition having the higher priority. The router devices and end devices that were attached to the network partition of the downgraded leader device may also begin network reformation. During this reformation process, the devices that are performing the reformation may be unable to send message to and/or receive messages from other devices in the system. As a result, messages may merely be delivered to devices that happen to be on the same partition as the transmitting device as the network continues to reform. This may degrade network functionality.

As the leader device may be a single point of failure for each network, the loss of the leader device on a larger network may cause a greater amount of delay during network reformation than the loss of the leader device on a smaller network. In smaller networks, such as a network having five to ten devices in the network (e.g., a network in a residential installation), after the loss of a leader device the other devices may perform network reformation seamlessly and in a relatively short amount of time. In larger networks, such as a network having one-hundred or two-hundred devices in the network (e.g., a network in a commercial installation), network reformation may take anywhere between fifteen minutes to two hours after the loss of the leader device.

To prevent the delay that may be caused by the network reformation, at least one router device in a network may identify itself as being a backup-leader device while the present leader device is properly communicating on the network. In an example, router devices having a single-hop network link to the leader device may be considered for being the backup-leader device. A router device may identify itself as the backup-leader device based on the link quality on the single-hop network link with the leader device. Each router device may receive advertisement messages from the leader device and, from the network information in the advertisement messages, compare the link quality of the network link between the router device and the leader device to the link quality of the network links between the other router devices (e.g., that share a single-hop network link with the leader device) and the leader device. The router device that has the highest link quality for communications with the leader device may identify itself as the backup-leader device.

Figure 5A:
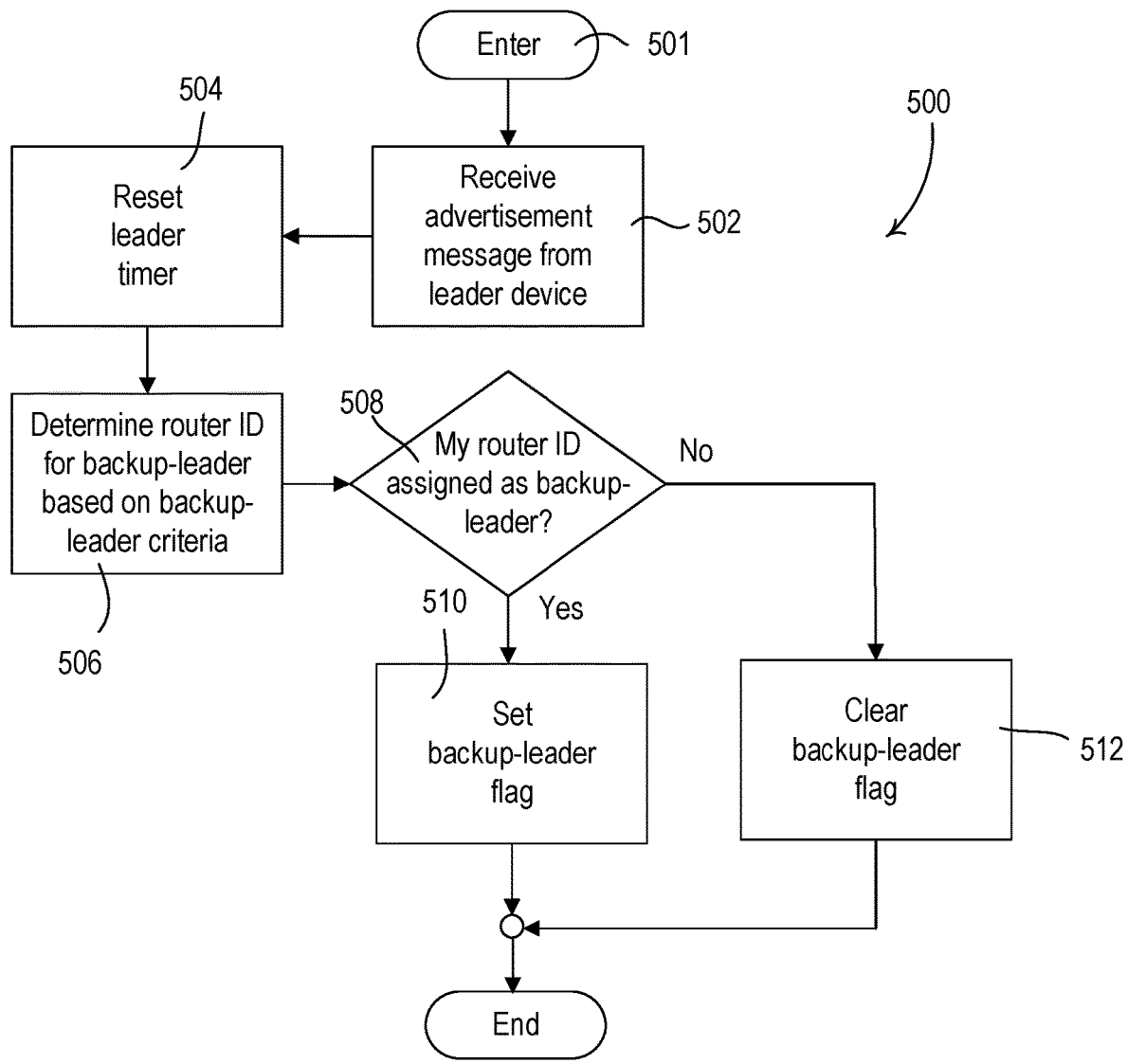
FIG. 5A is a flowchart illustrating an example procedure that may be performed by a router device to determine whether the router device is a backup-leader device.

FIG. 5A is a flow diagram illustrating an example procedure 500 that may be performed by a router device on a network to determine whether the router device is the backup-leader device in the event the present leader device is lost. The procedure 500 may be executed at 501 periodically and/or in response to a triggering event. For example, the procedure 500 may be begin at 501 in response to receipt of a message at the router device. The procedure 500 may be executed each time that the router device receives an advertisement from the leader device.

At 502, the router device may receive an advertisement message from the leader device of the network. The router device performing the procedure 500 may be a router device that shares a single-hop network link with the leader device (e.g., since the router devices that share a single-hop network link with the present leader device may be the router devices that receive the advertisement message from the leader device). The advertisement message may include information transmitted on the single-hop network link by the leader device. For example, the advertisement message may include information associated with quality of communications between the leader device and one or more other devices communicating with the leader device (e.g., router devices in communication with the leader device). As described herein, the received advertisement message may be used by the router device to determine the health of the network. For example, receiving the advertisement message from the leader device may indicate that the leader device is properly functioning and/or communicating on the network (e.g., a functioning leader device may periodically transmit advertisement messages).

In response to receiving the advertisement message from the leader device, the router device may reset a leader timer at 504. The leader timer may indicate the period of time since a last advertisement message was received from the leader device. Also, or alternatively, the leader timer may be used by the router device to determine the health of the network partition. For example, the router device may determine that the leader device is lost if the router device fails to receive an advertisement message from the leader device after a pre-defined period of time (e.g., 120 seconds).

At 506, the router device may determine a router identifier that is set as the backup leader based on a backup-leader criteria. For example, the router device may determine, at 506, a router identifier that has a highest link quality for communications with the leader device. The link quality may be an LQO or an LQI, for example, indicated in the network information in the advertisement messages transmitted from the leader device. The link quality may be a combination (e.g., an average) of the LQO and the LQI. The link quality may be based on the network information in one or more advertisement message received from the leader device. For example, the highest link quality may be based on the LQO and/or LQI in the network information in the last advertisement message and/or an average of the LQO and/or LQI in the advertisement messages received from the leader device over a period of time. The highest link quality from the leader device may indicate the router device or router devices with which the leader device has the strongest network link for advertisement messages that are transmitted out from the leader device. Though the link quality is indicated as a backup-leader criteria, other backup leader criteria may be implemented, such as a received signal strength indicator (RSSI) value of the advertisement messages or other communication quality metric, for example.

At 508, the router device may determine whether its own identifier is the same identifier that is determined to be the backup-leader device based on the backup-leader criteria. If the router device determines that its identifier is the same identifier that is determined to be the backup-leader device based on the backup-leader criteria, the router device may set a backup-leader flag at 510 and the procedure 500 may end. If the router device determines that its identifier is not the same identifier that is determined to be the backup-leader device based on the backup-leader criteria, the router device may clear a backup-leader flag at 512 and the procedure 500 may end. The router device may use the backup-leader flag to determine if the router devices is the backup-leader device. Clearing the backup-leader flag may include setting the backup-leader flag to false, deleting an indication of the backup-leader flag from memory, or otherwise indicating at the router device that the router device is not designated as a backup-leader device.

Figure 5B:
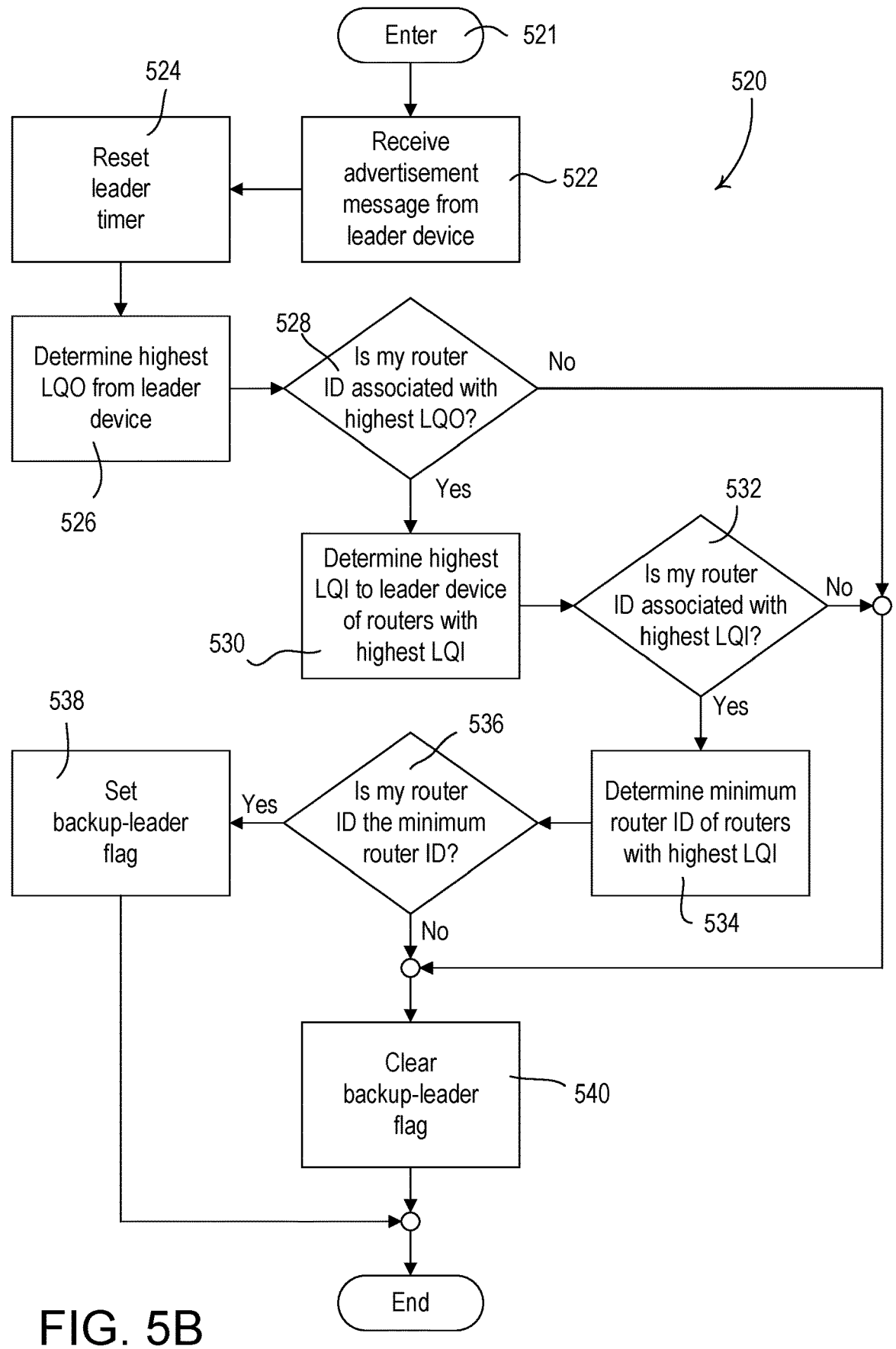
FIG. 5B is a flowchart illustrating another example procedure that may be performed by a router device to determine whether the router device is a backup-leader device.

One or more router devices may perform the procedure 500 to identify the backup-leader device. The router devices that perform the procedure 500 may be limited to router devices that share a single-hop network link with the present leader. As multiple router devices may perform the procedure 500, use of one or more backup-leader criteria may result in multiple router devices identifying themselves as the backup-leader device (e.g., where multiple router devices have the same link quality). FIG. 5B illustrates a procedure 500 that implements multiple backup-leader criteria to choose a single backup-leader device.

FIG. 5B is a flow diagram illustrating an example procedure 520 that may be performed by a router device on a network and implement multiple backup-leader criteria to determine whether the router device is the backup-leader device in the event the present leader device is lost. The procedure 520 may be executed at 521 periodically and/or in response to a triggering event. For example, the procedure 520 may be executed at 521 in response to receipt of a message at the router device. The procedure 520 may be executed each time that the router device receives an advertisement from the leader device.

At 522, the router device may receive an advertisement message from the leader device of the network. The router device performing the procedure 520 may be a router device that shares a single-hop network link with the leader device (e.g., since the router devices that share a single-hop network link with the present leader device may be the router devices that receive the advertisement message from the leader device). The advertisement message may include information transmitted on the single-hop network link by the leader device. For example, the advertisement message may include information associated with quality of communications between the leader device and one or more other devices communicating with the leader device (e.g., router devices in communication with the leader device). As described herein, the received advertisement message may be used by the router device to determine the health of the network. For example, receiving the advertisement message from the leader device may indicate that the leader device is properly functioning and/or communicating on the network (e.g., a functioning leader device may periodically transmit advertisement messages).

In response to receiving the advertisement message from the leader device, the router device may reset a leader timer at 524. The leader timer may indicate the period of time since a last advertisement message was received from the leader device. Also, or alternatively, the leader timer may be used by the router device to determine the health of the network partition. For example, the router device may determine that the leader device is lost if the router device fails to receive an advertisement message from the leader device after a pre-defined period of time (e.g., 120 seconds).

At 526, the router device may determine a first backup-leader criteria. For example, the router device may determine, at 526, a highest link quality out (LQO) for communications from the leader device. The highest LQO may be, for example, indicated in the network information in the advertisement messages transmitted from the leader device. The highest LQO may be based on the network information in one or more advertisement message received from the leader device. For example, the highest LQO may be based on the LQO in the network information in the last advertisement message and/or an average of the LQO in the advertisement messages received from the leader device over a period of time. The highest LQO from the leader device may indicate the router device or router devices with which the leader device has the strongest network link for advertisement messages that are transmitted out from the leader device.

At 528, the router device may determine whether its own identifier is the same identifier that is associated with the highest LQO in the network information received from the leader device. The advertisement messages received from the leader device may include a router identifier or another unique identifier of the router devices in communication with the leader device (e.g., a routing locator (RLOC) of each router device in communication with the leader device) and the LQO associated with the respective router devices. The router devices having identifiers associated with the highest link quality out (LQO) in the network information in the advertisement message received from the leader device may be candidates to be the backup-leader (e.g., to become the leader device when the leader device becomes lost or otherwise unable to properly communicate on the network). The router device may determine, at 528, whether its identifier is associated in the network information from the leader device with the highest LQO. If the router device determines that its identifier is not associated with the highest LQO at the leader device from the network information in the advertisement messages, the router device may clear a backup-leader flag at 540 and the procedure 520 may end. The router device may use the backup-leader flag to determine if the router devices is the backup-leader device. Clearing the backup-leader flag may include setting the backup-leader flag to false, deleting an indication of the backup-leader flag from memory, or otherwise indicating at the router device that the router device is not designated as a backup-leader device. The router device not being associated with the highest LQO for communications from the leader device may indicate that the router device fails to be considered to be the backup-leader device. If, however, the router device determines that its identifier is associated with the highest LQO in the network information received in the advertisement messages from the leader device at 528, the router device may determine that the router device may be in consideration for being the backup-leader device and may consider additional backup-leader criteria.

As the leader device may have the same LQO for messages transmitted to other router devices on other single-hop network links, additional criteria may be considered for selecting the backup-leader device. At 530, the router device may determine a second backup-leader criteria. For example, the router device may determine, at 530, a highest link quality in (LQI) of the router devices with the highest LQO associated with the leader device. The advertisement messages received from the leader device may include network information that indicates the LQI for incoming messages to the leader device from the respective router devices. The router devices with the highest LQI of the router devices also having the highest LQO may be the router devices with a highly reliable network link with the leader device. Router devices having a higher link quality to the leader device may have a similar link quality and/or path cost to other device in the network, which may be suitable for identifying a backup-leader device for the present leader device.

The router devices having an identifier that is associated with the highest LQI in the network information in the advertisement message received from the leader device may remain candidates to be the backup-leader device (e.g., to become the leader device when the leader device becomes lost or otherwise unable to properly communicate on the network). At 532, the router device may determine whether its router identifier or other unique identifier is associated with the highest LQI of the router devices having the highest LQO identified in the network information from the leader device. If the router device determines that its identifier is not associated with the highest LQI of the router devices also having the highest LQO identified in the network information from the leader device, the router device may clear the backup-leader flag at 540 and the procedure 520 may end.

If the router device determines that its identifier is associated with the highest LQI, the router device may determine a third backup-leader criteria. For example, the router device may determine a minimum identifier of the router identifiers (or other unique identifiers) of the router devices with the highest LQO and/or LQI at 534. The router identifier may be a numeric or alphanumeric identifier. Though the procedure 520 may be described as using a minimum identifier of the router identifiers as a backup-leader criteria, a maximum identifier of the router identifiers or other criteria may be used for selecting a router to be the backup-leader device. The router identifiers may be listed in the network information received in the advertisement messages from the leader device. The router device may use the router identifier for the router devices with the highest LQO and/or LQI to identify a single backup-leader device (e.g., in case of multiple router devices having a similar link quality for communications with the leader device). If, for example, the leader device is lost, the single backup-leader device may replace the lost leader device. The single backup-leader device may be identified by each of the router devices on the network, which may avoid delays in selecting a replacement leader device when the leader device is lost.

At 536, the router device may determine whether its router identifier or other unique identifier is the minimum identifier of the router identifiers of the router devices with the highest LQO and/or LQI. If the router device determines that its identifier is not the minimum identifier of the router identifiers of the router devices with the highest LQO and/or LQI, the router device may clear the backup-leader flag at 540 and the procedure 520 may end. If, however, the router device determines that its identifier is the minimum identifier of the router identifiers of the router device with the highest LQO and/or LQI, the router device may set the backup-leader flag at 538 and the procedure 520 may end. Setting the backup-leader flag may indicate that the router device performing the procedure 520 is the single backup-leader device in the network. The backup-leader device may identify when the leader device for a network partition is lost (e.g., before other devices leave the partition) and take over the responsibilities of the leader device. The taking over of the responsibilities of the leader device on the network partition may prevent other devices from reforming the network and causing a longer period of degraded functionality.

One or more router devices may perform the procedure 520 to identify the backup-leader device. The router devices that perform the procedure 520 may be limited to router devices that share a single-hop network link with the present leader. Though the procedure 520 includes multiple backup-leader criteria, a similar procedure 520 may be performed using more or less backup-leader criteria. For example, for simplicity, the backup-leader flag may be set based on the router identifier itself. Including the highest LQO for communications from the leader device as a backup-leader criteria may help ensure that the router device(s) that are being considered as backup-leader devices miss fewer advertisement messages (e.g., and the networking information therein) from the present leader device. Similarly, including the highest LQI for communications to the leader device as a backup-leader criteria may help ensure that the leader device misses fewer advertisement messages (e.g., and the networking information therein) from the backup-leader devices being considered. Additionally, the backup-leader criteria including the highest LQI for communications to the leader device may help ensure that a present leader device having troubles communicating on the network has a better chance of receiving advertisements that another router device is taking over as the replacement leader device (e.g., when the replacement leader device begins advertising as such).

As described, the procedure 520 in FIG. 5B may be used to choose a single backup-leader device. However, a similar procedure may be implemented that allows for multiple backup-leader devices to be identified. The backup-leader devices may be an order of succession. The backup-leader criteria may be used to identify the order of succession. For example, a first backup-leader flag may be set at a router device when the router device identifies its router identifier as being associated with the highest link quality (e.g., LQO/LQI) on a network link to the leader device and/or identifies its router identifier as the lowest router identifier. A second backup-leader flag may be set at another router device when the router device identifies its router identifier as being associated with the next highest link quality (e.g., LQO/LQI) on a network link to the leader device and/or identifies its router identifier as the next lowest router identifier. If there are multiple router devices with the same link quality (e.g., LQO and/or LQI) the succession of the backup leader flag may be set based on other backup-leader criteria (e.g., LQO on network link with leader device, LQI on network link with leader device, highest router identifier, lowest router identifier, or another backup-leader criteria). Additional backup-leader flags may continue to be set for the next backup-leader devices in the sequence by similarly using the backup-leader criteria. The router devices may each be able to determine their place in the sequence based on the backup-leader criteria. Their place in the sequence may be updated as the backup-leader criteria change (e.g., link quality to leader changes) or one or more of the backup-leader devices in the sequence have been lost. The router devices may replace the present leader device when the leader device and/or each of the other prior backup-leader devices in the sequence have been lost. Each of the router devices may store the sequence of backup leaders in a list and update the list as devices are lost and/or the backup-leader criteria change to indicate the relative position of each of the router devices in the sequence for replacing the current leader device.

When there is a single backup-leader device the router device that is identified as the backup-leader device may identify that other devices may detach from the network (e.g., as router device has not heard from leader device in 120 seconds) and step up as the replacement leader device to maintain the network partition before the other devices detach. The backup-leader device may have a shorter threshold for upgrading its role as the leader device than other devices have for detaching from the network partition.

Figure 6:
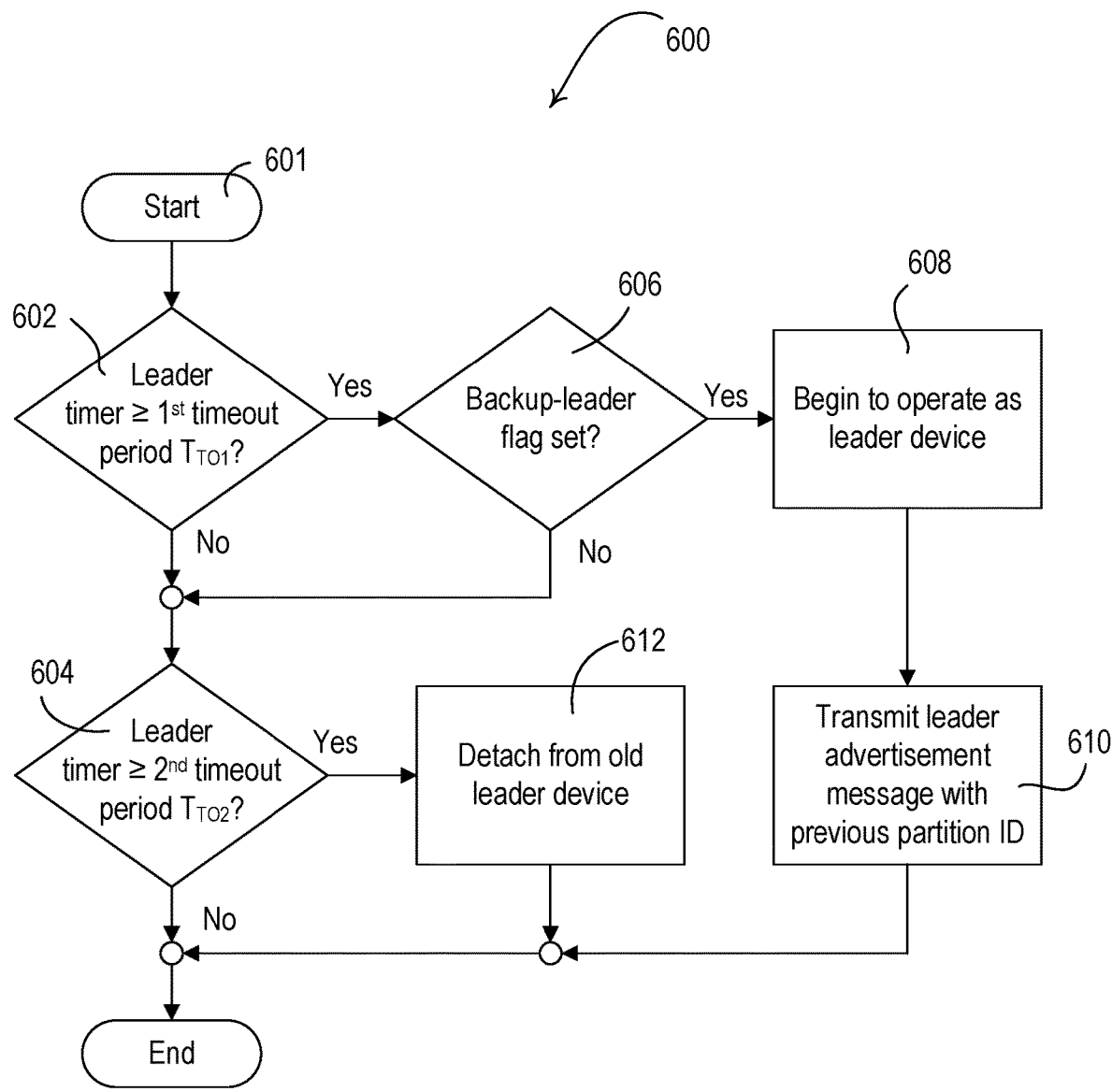
FIG. 6 is a flowchart of an example procedure that a router device may execute to determine that the router device is to become the next leader device or to detach from an old leader device.

FIG. 6 is a flow diagram of an example procedure 600 that may be executed by a router device to determine if the router device should become the next leader device or detach from an old leader device. For example, after a first timeout period $T_{TO1}$ (e.g., 120 seconds) has elapsed since an advertisement message is received from the leader device, the router device may determine to become the next leader device if the router device has previously determined to be a backup-leader device (e.g., via the procedure 520 shown in FIG. 5B). In addition, after a second timeout period $T_{TO2}$ (e.g., 240 seconds) has elapsed since an advertisement message is received from the leader device, the router device may determine to detach from the old leader device. As described herein, the leader timer may keep track of the period of time since a last advertisement message was received from the leader device. The first timeout period $T_{TO1}$ may include a period of time during which the leader device is to transmit one or more advertisement messages (e.g., 120 seconds). The first timeout period $T_{TO1}$ may be a period of time set for a backup-leader device to identify that one or more advertisement messages have failed to be received from the leader device. The second timeout period $T_{TO2}$ may include a period of time during which the leader device is to transmit one or more advertisement messages (e.g., 240 seconds). The second timeout period $T_{TO2}$ may include a longer period of time than the first timeout period $T_{TO1}$ after which the devices on the network partition are to detach from an old leader device after not receiving an advertisement message (e.g., 240 seconds). The second timeout period $T_{TO2}$ may be a multiple of the first timeout period $T_{TO1}$. The second timeout period $T_{TO2}$ may allow for additional advertisement messages to be transmitted from the leader device in the event of a loss of one or more advertisement messages from the leader device. The second timeout period $T_{TO2}$ may allow for the backup-leader device to begin to operate as the replacement leader device before control devices begin detaching from the old leader device.

At 601, the procedure 600 may start. The router device may determine if the leader timer is greater than or equal to the first timeout period $T_{TO1}$ at 602. If the leader timer is less than the second timeout period $T_{TO2}$, but greater than or equal to the first timeout period $T_{TO1}$ at 602 (e.g., the router device has not received an advertisement message from the leader device during the first timeout period $T_{TO1}$), the router device may determine whether the backup-leader flag is set at 606 or not. The backup-leader flag may be set to true or another value that indicates that the router device is a backup-leader device. The backup-leader flag being set at the router device may indicate that the router device is identified as being a backup-leader device to take over the responsibilities of the leader device in the absence of the leader device after the period of the first timeout period $T_{TO1}$. For example, the backup-leader flag may be set during invocation of the procedure 500 (e.g., at 518 of the procedure 500). If the backup-leader flag is not set at 606, the procedure 600 may proceed to determine whether the leader timer is greater than or equal to a second timeout period $T_{TO2}$ at 604. If the leader timer is not greater than or equal to the second timeout period $T_{TO2}$ at 604, the procedure 600 may end.

If the backup-leader flag is set at 606, the router device may begin to operate as the leader device of the network partition at 608. In operating as the leader device, the router device may maintain the previous partition identifier for the network that was used in the advertisement messages transmitted by the previous leader device. The use of the previous partition identifier may prevent the router device from having to generate and distribute updated partition identifiers. The use of the previous partition identifier may allow the other devices communicating on the network to identify advertisement messages from the replacement leader device as being on the same network and maintain their roles in the network. The router device may operate as the next leader device on the network by updating sequence numbers, maintaining the bitmap used to identify router devices in the network, and/or performing other functions of the leader device as described herein. For example, the router device may update the sequence number when taking over as the leader device. The router device may update the bitmap to indicate the loss of the previous leader device. When the leader device is still in the network, but is being replaced due to the loss of communication for a period of time, the router device may maintain the previous leader device as a router device in the bitmap. In addition, the router device may update the network information in the router table to reflect the link quality and/or path cost of communications with the previous leader device.

At 610, the router device operating as the next leader device may transmit a leader advertisement message. The advertisement message may include the previous partition identifier used by the previous leader device, a sequence number (e.g., updated sequence number), a bitmap (e.g., an updated bitmap), and/or network information (e.g., updated link quality and/or path cost information). The router device operating as the leader device may allow the other devices on the network to continue communications with other devices on the network without reforming the network.

If the router device determines at 602 that the leader timer is greater than or equal to the second timeout period $T_{TO2}$ at 604 (e.g., the router device has not received an advertisement message from the leader device during the second timeout period $T_{TO2}$), the router device may detach from the old leader device at 612. As described herein, the second timeout period $T_{TO2}$ may include a period of time after which the router device is to detach from an old leader device after not receiving an advertisement message (e.g., for the second timeout period $T_{TO2}$). After the router device detaches from the old leader device, the router device may identify advertisement messages from another network partition and attach to a router device in the other network partition, or change its role to a leader device and begin advertising as a leader device on its own network partition. This is in the event that the router device fails to receive an advertisement message from another backup-leader device during the procedure 600 to maintain the network.

When multiple backup-leader devices are identified in the network, each leader device may delay taking over the responsibilities of the leader device and advertising as the leader to allow the earlier backup-leader devices an opportunity to take over first. For example, when the leader device is lost, the first backup-leader device may wait 120 seconds from the last advertisement message from the present leader, the second backup-leader device may wait 150 seconds from the last advertisement message from the present leader, the third backup-leader device may wait for 180 seconds from the last advertisement message from the present leader, and so on. If the leader and the first backup-leader device are on the same circuit and both lose power at the same time, the second backup-leader device may take over as the leader device and still allow the first backup-leader device an opportunity to take over as leader and begin advertising as such. Multiple devices on the same circuit may lose power at the same time as a result of a user servicing the load control system and tripping a circuit breaker to disconnect power from a lighting fixture, for example.

When a backup-leader device becomes the next leader device of a network, the old leader device may begin operating as a router device on the network. When the old leader device has not left the network (e.g., has not lost power and is still able to communicate on the network), but the backup-leader device does not receive an advertisement message from the old leader device within the first timeout period $T_{TO1}$, the backup-leader device may become the next leader of the network and transmit an advertisement message (e.g., a leader advertisement message) as the next leader device. When the old leader device receives the leader advertisement message from the next leader device, the old leader devices may give up its role at the leader device and begin operating as a router device. In addition, when the old leader device is lost (e.g., is unpowered or otherwise unable to communicate on the network), the backup-leader device may become the next leader of the network in the absence of the old leader device. When the old leader device is once again powered, the old leader device may receive an advertisement message from the new leader device and then begin operating as a router device. When there are multiple backup-leader devices, multiple router devices may upgrade their role to be a leader device and begin transmitting advertisement messages as a leader device. For example, multiple router devices may identify themselves as being backup-leader devices on a network before the present leader device is lost. After the present leader device is lost, each of these backup-leader devices may begin transmitting leader advertisement messages. Each of the leader devices may resolve the leader conflict amongst themselves, as described herein.

Figure 7A:
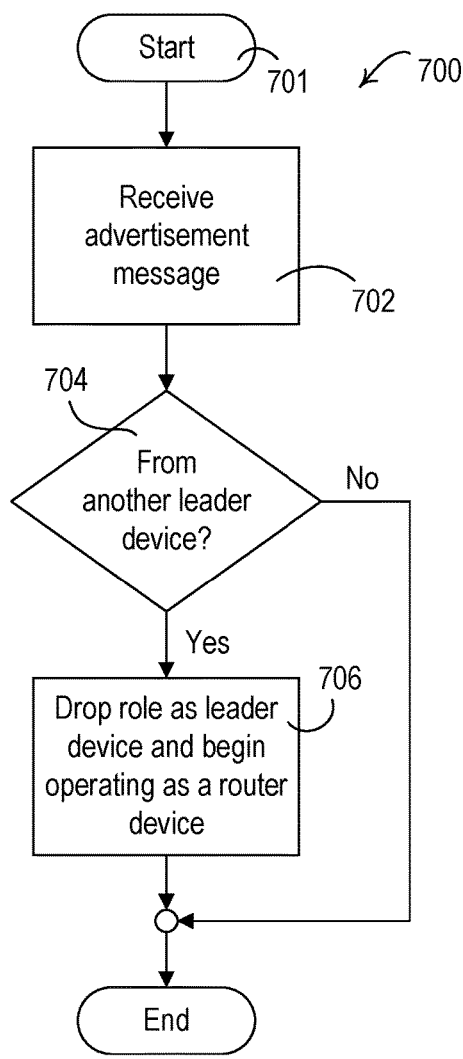
FIGS. 7A and 7B are flowcharts of example procedures that may be performed by a leader device to resolve a conflict with another leader device on the network.

FIG. 7A is a flow diagram of an example procedure 700 that may be performed by a leader device to resolve a conflict with another leader device on a network. The procedure 700 may be executed periodically and/or in response to a triggering event. For example, the procedure 700 may be performed in response to receipt of a message (e.g., an advertisement message) at the leader device. The procedure 700 may start at 701. At 702, the leader device may receive an advertisement message (e.g., from router devices and/or from another leader device on the network. At 704, the leader device may determine whether the advertisement message was received from another leader device. The leader advertisement message from the other leader device may include the same partition identifier being used on the present network to which the router device is presently attached and/or an updated sequence number. For example, another router device on the network that had identified itself as the backup-leader device (e.g., based on the backup-leader criteria as shown in FIG. 5A and FIG. 5B) may begin advertising as the leader device on the same network after failing to receive an advertisement message from the previous leader device (e.g., the leader device executing the procedure 700). When the backup-leader device begins operating as the leader device, the backup-leader device may increment the sequence number in its advertisement messages by two or more numbers to indicate another leader device has taken over and to avoid confusion at other control devices on the network (e.g., in case of a missed advertisement message). If a leader advertisement message has been received from another leader device at 704, the leader device may drop its role as the leader device and being operating as a router device on the network at 706, and the procedure 700 may end. If, however, the advertisement message has not been received from another leader device at 704, the procedure 700 may simply end.

Figure 7B:
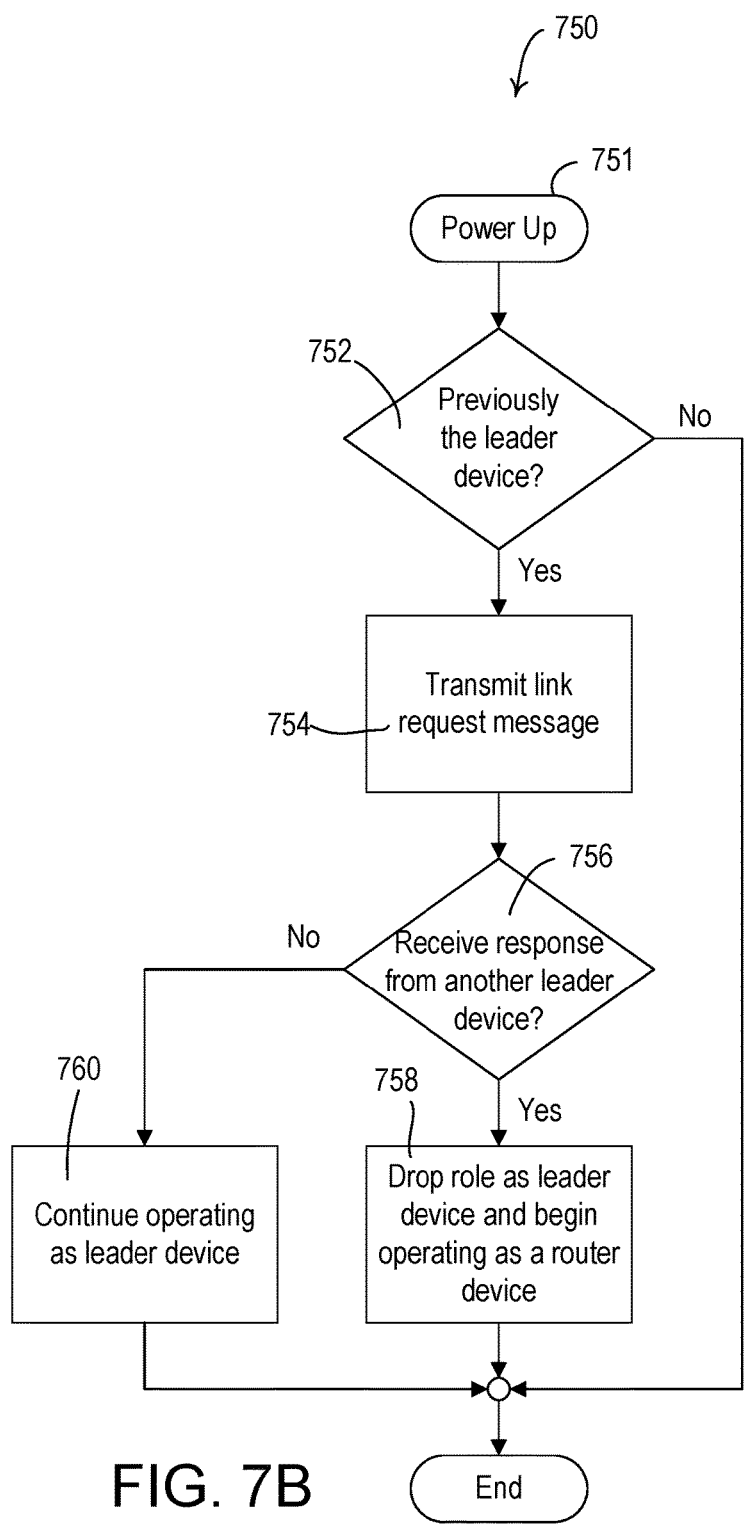

FIG. 7B is a flow diagram of an example procedure 750 that may be performed by a control device (e.g., a leader device) to resolve a conflict with another leader device on a network. For example, the procedure 750 may be executed when the control device is powered up (e.g., after a power outage and/or power has been disconnected from the electrical circuit to which the leader device is connected). The procedure 750 may start at 751 (e.g., at power up of the control device). At 752, the control device may determine if the control device was previously operating as a leader device of the network (e.g., prior to being unpowered). For example, the control device may store a leader-device flag in memory that indicates whether the control device was previously operating as the leader device of the network or not. The control device may retrieve the leader-device flag from memory at 752 to determine if the control device was previously operating as the leader device of the network. If the control device determines that the control device was not operating as the leader device on the network at 752, the procedure 750 may end. If the control device determines that the control device was previously operating as the leader device on the network at 752, the control device may transmit a link request message at 754. For example, the link request message may be sent as a multicast message. The link request messages may be used to determine whether the network has reformed with another leader device while the control device was unpowered. When there is another leader device on the network, the other leader device may transmit a response to the link request message to the control device. If the control device receives a response to the link request message at 756, the leader device may drop its role as the leader device and being operating as a router device on the network at 758, and the procedure 750 may end. If the leader device does not receive a response to the link request message at 756, the control device may continue to operate as the leader device on the network at 760, and the procedure 750 may end.

Figure 8:
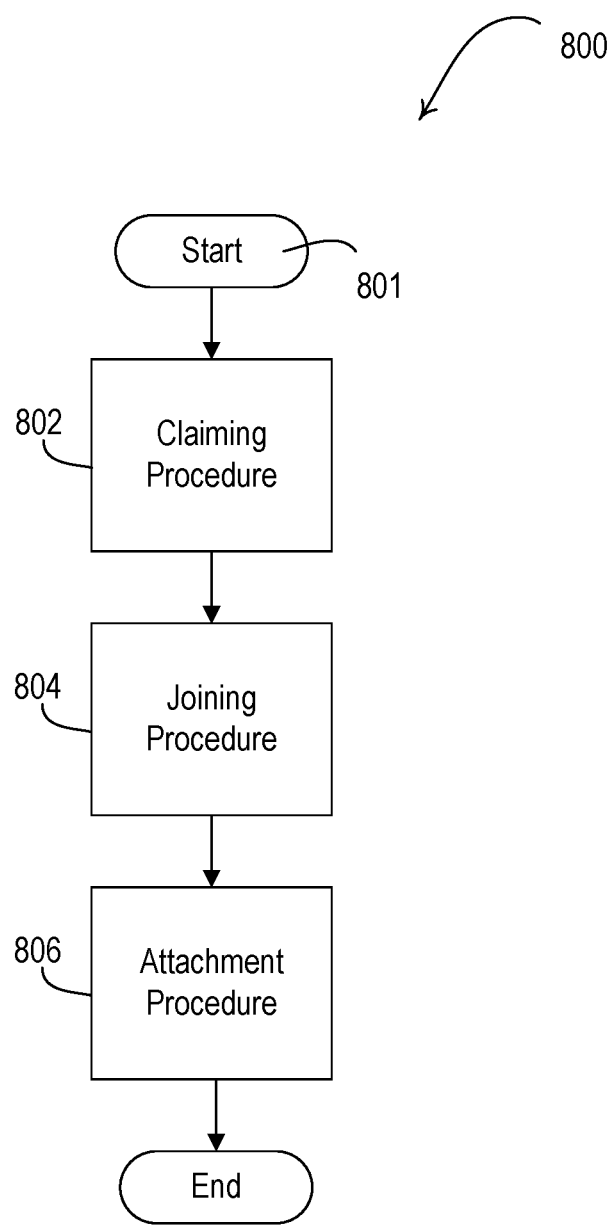
FIG. 8 is a flowchart of an example commissioning procedure that may be performed by a device.

As described herein, a network may be used to facilitate communication between the respective devices of a load control system. For a respective control device to communicate via the network, the control device may be commissioned. FIG. 8 is a flowchart of an example commissioning procedure 800. The procedure 800 may be performed by a control device (e.g., an end device, such as the end devices 230*a*, 230*b*, the router eligible end device 240, and/or the sleepy end device 250) that is attempting to join or attach to a network (e.g., the networks 200, 200*a*, 200*b*, 200*c* and/or the network partitions 201, 202, 203). For example, the control device may start the procedure 800 at 801 when the control device is first powered and attempting to attach/join the network. The commissioning procedure 800 may include an activation procedure for activating a control device in the load control system. The activation procedure may include claiming a control device and/or joining the control device to a network for enabling communications within the load control system. The activation procedure may also include discovery of the control device for being joined to the network and/or associating the control device with one or more control devices in the load control system.

At 802, the control device may perform a claiming procedure. The claiming procedure may be used to discover and claim control devices for being added to the network. For example, control devices in the load control system (e.g., load control system 100 shown in FIG. 1) may be claimed using a user's mobile device (e.g., mobile device 190). Each control device may be claimed by a user's mobile device for joining the network and/or attaching to other devices on the network. Each control device may transmit a control device beacon message via a short-range wireless communication link (e.g., using BLE technology, NFC technology, or other short-range wireless technology). The mobile device may discover (e.g., receive) control device beacon messages transmitted by the control devices in the load control system. Each control device beacon message may include a unique beacon identifier of the control device that transmitted the respective control device beacon message. The unique beacon identifier may be a BLUETOOTH® beacon identifier. The unique beacon identifier may include a unique identifier (e.g., serial number) of the control device itself.

The mobile device may identify one or more control device beacon messages transmitting the control device beacon messages at a received signal strength indicator (RSSI) that are above a predefined value. For example, the mobile device may identify one or more of the control device beacon messages transmitting the strongest RSSI(s) and the mobile device may transmit a connection message to the control device(s). The control device performing the commissioning procedure 800 may receive the connection message from the mobile device may be configured to establish a connection (e.g., a two-way communication connection) with the mobile device.

The connection message may indicate to the control device that the control device has been selected for claiming. The connection message may operate as a claiming message, or a separate claiming message may be sent after the connection is established between the mobile device and the control device. The claiming message may indicate that the control device has been claimed for being added to the network. In response to receiving the claiming message, the control device may transmit a claim confirmation message to the mobile device. The claim confirmation message may include a configuration information that may be used to join or attach the control device to the network. For example, the configuration information may include a unique identifier (e.g., serial number) of the control device and/or network credentials for joining a network or network partition. The network credentials may include a network key for the network, a network address for the control device (e.g., a Thread network address) and/or a joiner identifier for the control device. The control device may be programmed with the network credentials by receiving the credentials for the network via an RF communication (e.g., Bluetooth or other short-range communication) from a commissioning device, or the credentials may be prestored at the control device (e.g., at the time of manufacture). The unique device identifier (e.g., serial number) of the control device may be sent in the claim confirmation message when the unique beacon identifier is not the unique device identifier of the control device. The network address and/or the joiner identifier may be used during the joining procedure to allow the control device to join the network.

During the claiming procedure at 802, or otherwise during the commissioning procedure 800, the mobile device may write information to the control device that is being claimed. For example, the mobile device may write a time the control device was claimed, an identifier of the mobile device and/or application executing a claiming procedure on the mobile device, and/or channel information to assist the control device in getting onto the thread network through the joining procedure. The information may be sent in the claiming message or in a separate message on the connection established with the mobile device for being stored at the control device. When the mobile device receives the claim confirmation message from the control device to which the mobile device is connected, the mobile device may store the unique identifier of the control device, the network address for the control device (e.g., a Thread network address), and/or the joiner identifier for the control device in memory.

The user may continue to move the mobile device around the space in which the load control system is installed to perform the claiming procedure with additional control devices. When the user is done claiming control devices (e.g., the mobile device has claimed all or a portion of the control devices of the load control system), the mobile device may upload the configuration information from the claimed devices to a central computing device, such as a commissioning device, for example. The uploaded configuration information may be used to identify the devices for being joined to the network, or a network partition. The central computing device may be a system controller or other device capable of communicating with other control devices in the load control system. The central computing device may be installed at the space being commissioned, or may be a remote computing device. Though the mobile device is described as the device performing communications with the control device(s) during the claiming procedure at 802, other computing devices may perform similar communications with the control device(s) during the claiming procedure. For example, another computing device, such as the commissioning device or system controller, may perform the communications with the control device(s) to perform the claiming procedure, or portions thereof.

At 804, the control device may perform a joining procedure. During the joining procedure at 804, the control device may look for a network and/or network partition (e.g., Thread network and/or network partition) to join. The control device may periodically switch between a beaconing mode for being claimed during the claiming procedure at 802 and listening for a network and/or network partition to join during the joining procedure at 804. The control device may begin the joining procedure at 804 after being claimed.

During the joining procedure, the control device may stop transmitting (e.g., periodically transmitting) the control device beacon message continuously on a first wireless communication medium (e.g., using BLE technology) and/or a second wireless communication medium (e.g., the wireless communication network). The control device may listen on the wireless communication network to determine if a request to join the wireless communication network is being transmitted on the wireless communication network. The control device may continue to periodically transmit the control device beacon message via the first wireless communication medium (e.g., at a slower rate than in the claiming procedure) in case the mobile device attempts to reconnect to the control device while the mobile device is performing the claiming procedure.

The control device may receive a joinder request message from the central computing device or the commissioning device during the joining procedure. The control device may respond with a request to join the network. The central computing device or the commissioning device may challenge the control device with one or more portions of the configuration information obtained during the claiming procedure. For example, the joinder request message, or another message from the central computing device or the commissioning device, may include a request for one or more portions of the network credentials from the user device. In an example, the central computing device or the commissioning device may identify the network address in the network credentials in the joinder request message and request the joiner identifier from the control device. The control device may respond with the joiner identifier or the network address and the joiner identifier to join the network or network partition. The central computing device or the commissioning device may identify the control device from the unique identifier in the message as being a claimed device and confirm the accuracy of the network credentials to join the control device to the network. After the control device joins the network and has the network credentials stored thereon, the control device may be activated on the network for performing communications.

At 806, the control device may perform an attachment procedure. After the control device joins the network, the control device may attempt to attach to another device (e.g., a leader device or a router device) on the network to form the mesh network (e.g., formation of the network) at 806. In order to attach to another device on the network, the control device may send and receive a number of messages via the network.

Though FIG. 8 describes a claiming procedure, joining procedure, and attachment procedure, one or more of these procedures may be performed. For example, the claiming procedure and/or the joining procedure may be omitted, or modified, as control devices may have network credentials prestored thereon (e.g., at manufacture or written to storage thereon by another device, such as the mobile device). The network credentials may be used by a control device to directly attach to another device on the network. For example, the computing device to which the control device attempts attachment may challenge the control device for the network credentials as described herein. As described herein one or more of the claiming, joining, and/or attachment procedures may be performed after power is provided to a control device and the device is turned on. One or more of these procedures may also be performed to reform the network or reattach control devices to the network.

As described herein, a control device may join a network/ network partition and/or attach to another device on the network in order to communicate with the other control devices on the network. However, if the control device attempts to join the network or attach to another device on the network at the same or substantially the same time as other control devices, the likelihood of message collisions may increase and/or the control device may fail to join the network or attach to another device on the network. In an attempt to decrease the likelihood of message collisions, the control device may delay its respective joining or attachment procedure such that control devices join the network and/or attach to other devices on the network sequentially (e.g., rather than simultaneously, which may increase likelihood of message collisions and/or increase the likelihood that a respective control device fails to join or attach to the network). For example, the control devices that are attempting to join the network or attach to other devices on a network may delay their respective joining and/or attachment procedures based on a coordinated startup time. In addition, the coordinated startup time may be individualized for a respective control device, such that the coordinated startup times trigger the control devices to start their respective joinder and/or attachment procedures sequentially.

As part of an initial startup procedure, when a control device is initially powered on and/or attempts to initially attach to another device on a network or network partition (e.g., initial attachment after initially being powered on after being configured and/or reconfigured) the device may perform a startup procedure that is coordinated with other devices on the network or network partition. As an initial startup procedure may be performed at a control device prior to the control device joining a network and/or establishing a role on the network for performing communications, a coordinated startup of the devices on the network may be performed to decrease latency and/or potential collisions of messages on the network as devices are attempting to perform a joining and/or attachment procedure.

After activating a control device on the network, the user may want to intentionally deactivate the control device for causing the control device to leave the load control system and/or the network. For example, the user may select a control device identified on the user's mobile device that has previously been activated in the load control system. The user may wish to deactivate a control device from the load control system that has been improperly added to the network or improperly configured in the load control system. The deactivation of the control device may allow a user to restart the activation procedure (e.g., discovery, claiming, joining, and/or association procedures) for adding the control device to the load control system and joining the control device to the network (e.g., using an application or other software via the user's mobile device). For example, the user may be able to restart a commissioning procedure for activating the control device on the network or network partition; and associating the control device with a zone and/or other control devices in the load control system that communicate on the network or network partition. The deactivation of the control device may revoke its network credentials that are established during the joining procedure for joining the network.

The control device may be deactivated during a deactivation procedure. During the deactivation procedure, the control device may detach from other devices on the network and may leave the network, such that the control device may be unable to communicate on the network. As described herein, control devices having different roles in the network may perform differently and have different responsibilities in the network. As a control device may be assigned a role that gives the control device responsibilities for the communication of other devices on the network, the deactivation of the control device may affect the communication of other control devices on the network.

A control device that is assigned the role of an end device may be able to detach from the network without affecting the communication of other devices on the network. As such, a control device that is assigned the role of an end device in the network may be able to leave the network seamlessly without affecting other network communications. However, a control device that is assigned the role of a leader device and/or a router device may have other network responsibilities that may make it difficult to remove the leader device and/or the router device from the network without affecting other network communications. For example, as described elsewhere herein, if a leader device is removed from the network, the loss of the leader device may cause undue delay in network communication (e.g., particularly in larger networks, such as a commercial installation) that may be caused by other router devices and/or end devices failing to identify the loss of the leader device for a period of time and/or network reformation to replace the leader device.

Similarly, when a router device is removed from the network, the removal of the router device may cause undue delay in network communications (e.g., particularly in larger networks, such as a commercial installation) to/from the leader device and/or end devices, as the leader device and/or the end devices attached thereto may mistakenly believe that the router device is still active in the network and attempt to perform communications on the network via the router device. The leader device may not know that the router device has left the network and may maintain the router device in the router table for a period of time after the router device has already left the network. As the router device is maintained in the router table, other control devices (e.g., the leader device, other router devices, and/or end devices) that rely on the router table for performing communications on the network may continue to attempt to communicate messages via the router device after the router device has already left the network.

As the user may intentionally deactivate a previously activated control device using the user's mobile device, proactive steps may be taken in response to the indication from the user or the user's mobile device to prevent additional delay that may be caused by the loss of the leader device or a router device in the network. For example, a deactivation procedure may be performed that takes into consideration the role of the control device being deactivated on the network. The control device may deactivate differently based on the role of the control device in the network. The deactivation procedure may take into consideration the responsibilities of a given control device in the network based on the assigned role and take proactive steps to maintain network communications as the control device is deactivated from the network. In response to an indication to deactivate a control device that is assigned the role of leader device in the network, the role of the leader device may be seamlessly transferred from the control device that is being deactivated to another control device that can take over the responsibilities of the leader device. Similarly, in response to the indication to deactivate a control device that is assigned the role of a router device in the network, the router device may be removed from the router table maintained by the leader device on which the other devices in the network rely, which may allow the other devices to update communication paths to avoid communicating through the removed router device and/or more quickly attach to another control device on the network. One or more devices in the load control system (e.g., system controller and/or control devices associated with the deactivated device) may delete the unique identifier and/or associations of the deactivated control device from memory in response to an indication that the device has been deactivated. After the deactivation procedure, the deactivated control device may need to be reclaimed and/or rejoined to the network for enabling communication on the network, or claimed and joined to another network or network partition for enabling communication thereon.

Figure 9:
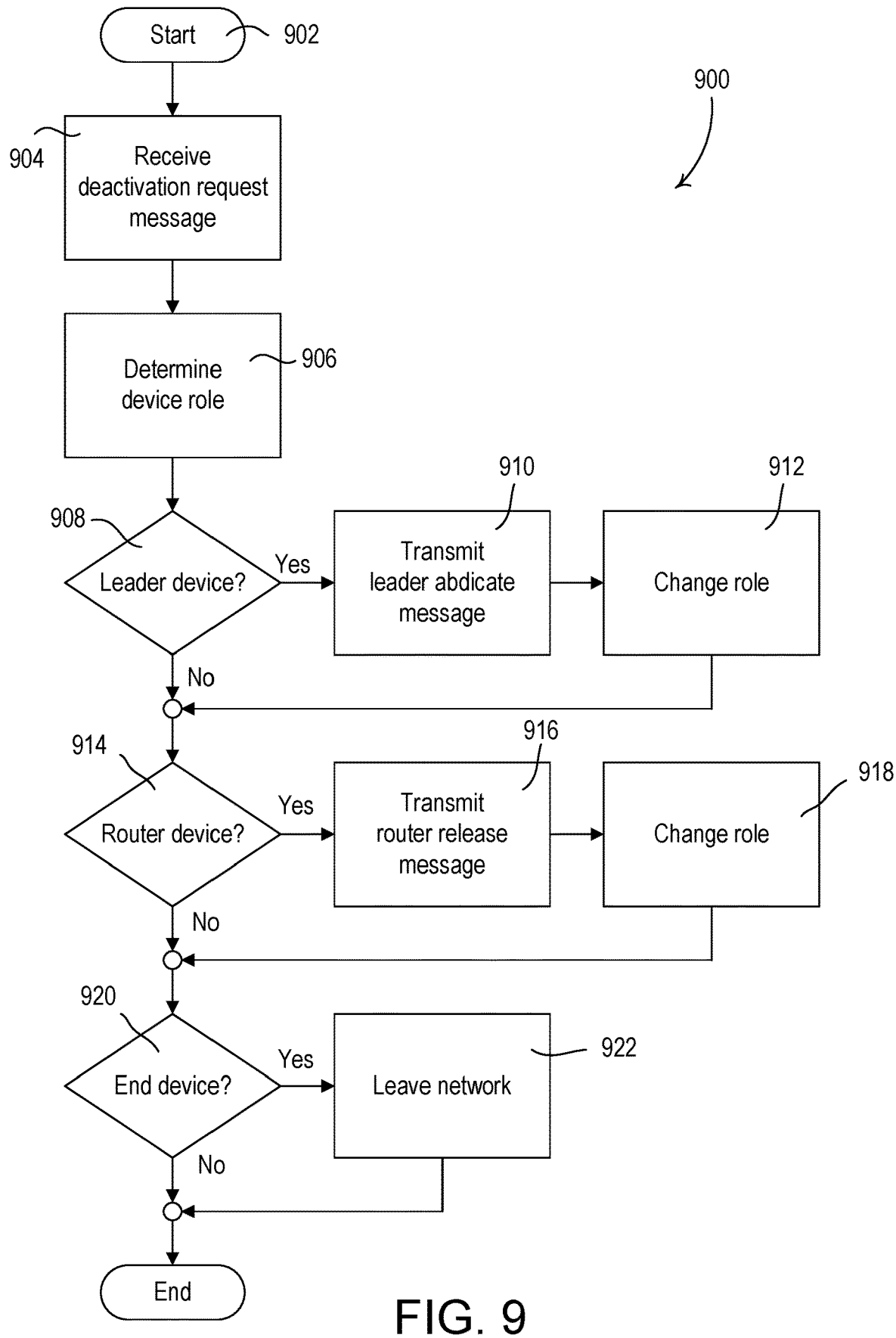
FIG. 9 is a flow diagram illustrating an example deactivation procedure that may be performed by a control device.

FIG. 9 is a flow diagram illustrating an example deactivation procedure 900 that may be performed by a control device on a network to deactivate a control device that has been claimed and/or joined to a network. The procedure 900 may be executed in response to a triggering event at the control device. For example, the procedure 900 may be performed in response to receipt of a deactivation request message at the control device. The deactivation request may be sent from a user's mobile device in response to a user selection on the mobile device to deactivate the control device, for example.

As illustrated in FIG. 9, the procedure 900 may start at 902. At 904, the control device may receive a deactivation request message (e.g., from a mobile device of a user). The deactivation request message may be received via a system controller or another control device in the network. For example, the user may select a control device for being deactivated on the user's mobile device and the mobile device may send a message to the system controller to trigger the deactivation request message to be sent from the system controller. The deactivation request message may be sent as a multicast message or a unicast message sent directly to the control device. The deactivation request message may include a unique identifier of the control device or a device type to be deactivated. The device type may indicate a type of control device to be deactivated (e.g., such as a lighting control device, a remote control device, or another control device).

In response to receiving the deactivation request message, the control device may determine its role at 906. Each control device in the network may have its device role stored in memory. The device role may be part of the device's address or unique identifier, which may be stored in memory. For example, the device role (e.g., leader device, router device, or end device) may be indicated in the identifier that is used to communicate with a given device. If the control device determines it is assigned the role of the leader device at 908, the control device may send a leader abdicate message. For example, the control device may send the leader abdicate message to a backup-leader device in the network at 910. The leader abdicate message may indicate to the backup-leader device that the leader device is renouncing its position as the leader device and the backup-leader device may take over the role as leader device, as described herein.

The router devices that share a single-hop network link with the leader device may maintain the router device that is the backup-leader device. For example, as described herein, a router device sharing a single-hop network link with the leader device may determine it is the backup-leader device and set the backup-leader flag. The router devices being able to identify and maintain the router device that is assigned as the backup-leader device (e.g., having the backup-leader flag stored thereon) may prevent the current leader device from having to maintain the backup-leader device in local storage, as the backup-leader device may change, as described herein.

As the router devices may maintain the router device that is designated as the backup-leader device, the leader abdicate message may be sent as a multicast message and may be received by the backup-leader device. The leader abdicate message may indicate to the backup-leader device to take over as the leader device on the network. The backup-leader device may receive the leader abdicate message, identify itself as the backup-leader device, and take over the responsibilities of the leader device on the network.

The leader device itself may also, or alternatively, maintain the identity of the backup-leader device in local memory and send the leader abdicate message, at 910, as a unicast message. In an example, the backup-leader device may be determined, as described herein, by a router device and the router device may provide the leader device with its unique identifier and an indication that the router device is the backup-leader device. As the devices on the network change, or the quality of the communications on the network changes, the router device that is determined to be the backup-leader device may change. When another router device determines that is the backup-leader device, it may provide its unique identifier to the leader device with an indication that it is the backup-leader device. The leader device may store the unique identifier of the backup-leader device in memory and send the leader abdicate message as a unicast message that includes the unique identifier of the backup-leader device that is stored locally in memory.

As the leader device itself maintains the network information that is used by the router devices to determine the backup-leader device, the leader device itself may similarly use the network information to identify the backup-leader device and send the leader abdicate message at 910 to the identified backup-leader device. This processing of the backup-leader device at the leader device may prevent the backup-leader device from being maintained at the router devices, but the backup-leader device may be maintained at the leader device and the router devices.

If the leader device and/or the router devices do not establish a backup-leader device (e.g., prior to executing the procedure 900), the leader device and/or the router devices may determine another leader device at 910. For example, the leader device may identify the next leader device to which the leader abdicate message is to be sent at 910 based on backup-leader criteria, which may be similar to the determination performed at 506 of FIG. 5A. The backup-leader criteria may include the link quality of a network link between the router device and the leader device and/or an identifier (e.g., router identifier or other unique identifier) of the router device. The leader device may determine the backup-leader device by identifying, in the network information stored thereon, the router device that is associated with the highest LQO (e.g., from the last message transmitted to the router device and/or an average of the LQO for messages transmitted to a router device over a period of time). The determination of the highest LQO at 910 may be similar to the determination performed at 526 of FIG. 5B, for example. As multiple router devices may have the same LQO from the leader device, the leader device may determine the backup-leader device by identifying, in the network information stored thereon, the router device that is associated with the highest LQI (e.g., from the last message received from the router device and/or an average of the LQI for the messages received from a router device over a period of time) of the router devices with the highest LQO. The determination of the highest LQI at 910 may be similar to the determination performed at 530 of FIG. 5B, for example. As multiple router devices may have the same LQI/LQO associated with communications to/from the leader device, the leader device may determine the backup-leader device based on another criteria, such as a minimum or maximum identifier of the router devices with the highest LQO and/or LQI. The determination of the minimum/maximum identifier at 910 may be similar to the determination performed at 534 of FIG. 5B, for example. As described elsewhere herein, though certain backup-leader criteria may be described, a portion of the identified criteria may be used or other criteria may be used for selecting the router device that is designated as the backup-leader device. Similarly, the order of the backup-leader criteria for filtering out router devices may be changed. The local determination of the backup-leader device may be performed at the control device periodically, in response to the deactivation request message at 904, in response to changes in the network (e.g., router devices in the network, quality of communications between router devices in the network, etc.) or in response to another triggering event.

In response to the control device sending the leader abdicate message at 910, the backup-leader device may receive the leader abdicate message and take over the responsibilities of the leader device on the network. After the backup-leader device takes over as the leader device on the network, the backup-leader device will begin transmitting advertisement messages as the leader device and perform the other leader responsibilities described herein.

The control device may change its role at 912. For example, the control device may change its role at 912 after sending the leader abdicate message and/or receiving the indication that the backup-leader device has taken over as the leader device. The control device may downgrade its role to a router device or an end device at 912.

The control device may determine, at 914, whether its role in the network is the role of a router device. In one example, the control device may initially determine, at 908, that its role is a leader device and the control device may determine that, after downgrading its role at 912, the control device has been downgraded to the role of a router device at 914. In another example, the control device may determine, at 908, that its initial role is not a leader device and may determine that its role is a router device at 914. If the control device determines that it is a router device at 914, the control device may send a router release message at 916. The router release message may be sent as a unicast message directly to the leader device or as a multicast message. The router release message may be sent to the leader device as a request to release the router from the router table. The router release message may include the unique identifier of the router device (e.g., the router identifier or other unique identifier) to be released from the router table.

The leader device may receive the router release message and release the router device from the router table. The leader device may remove the router identifier of the router device from the router table. The leader device may update the bitmap that indicates the routers in the router table to remove the indication of the router in the bitmap. The receipt of the router release message at the leader device may allow the leader device to release the router from the router table proactively before the router device leaves the network or the leader device otherwise waits to determine that the router device has left due to non-responsiveness, which will allow the leader device to update the router table and/or the bitmap sooner than having to wait a period of time to determine that the router device has been lost.

The proactive removal of the router device from the router table and/or the bitmap will allow end devices to identify the loss of the router device from the network earlier, as they will receive the updated router table and/or bitmap and attempt to attach to another router device (e.g., as a parent device or auxiliary parent device) without having to wait a period of time to determine that the router device has been lost due to non-responsiveness. Upon receiving the router release message, the leader device may transmit an advertisement message including the updated router table having the bitmap indicating that the identified router device has been removed from the network. The router devices on the network may retransmit the advertisement message until the advertisement message is transmitted to each router device and end device on the network. An end device that is a child of the parent router device that has been removed from the router table may, in response to receiving the advertisement message (e.g., from a parent router device, an auxiliary parent device, or other router device), identify that its parent router device is no longer a router device and send a parent request message to another router device on the network. The end device may send the parent request message to an auxiliary parent device in the auxiliary parent table. For example, the end device may send the parent request message to the auxiliary parent device with the strongest RSSI or link quality (e.g., LQI or LQO) on a network link associated with one or more messages.

The control device that sent the router release message at 916 may change its role at 918. The control device may downgrade its role to an end device, for example. The control device may change its role at 918 after transmitting the router release message at 916. In addition, the control device may change its role at 918 after receiving an indication that the router device has been removed from the router table. The indication that the router device has been removed from the router table may be in the form of an acknowledgement message received from the leader device in response to the router release message sent at 916. The indication that the router device has been removed from the router table may be identified when the control device receives the updated router table and/or bitmap in an advertisement message from the leader device. If the control device fails to receive an indication that it has been removed as a router device from the router table and/or bitmap after a predefined period of time, the control device may leave the network.

The control device may determine, at 920, whether its role in the network is the role of an end device. In one example, the control device may determine, at 914, that its role is a router device and the control device may determine that, after downgrading its role at 918, the control device has been downgraded to the role of an end device at 920. In another example, the control device may determine, at 914, that its initial role is not a router device and may determine that its role is an end device at 920. If the control device determines that it is an end device at 920, the control device may leave the network at 922. As an end device does not have other devices that may rely on it for performing communications on the network, the end devices may freely leave the network. When leaving the network at 922, the control device may send a message (e.g., unicast message) to its parent router device that it is leaving the network, or the control device may just leave the network. In response to the control device leaving the network, the parent router device may remove the end device from its attached devices in storage. The control device may delete its network credentials that were stored during the joining procedure when being deactivated and leaving the network.

After the control device has left the network, the deactivation procedure 900 may end. After being deactivated, the control device may be unable to communicate on the network. The control device may be reactivated to join the network again for performing communication on the network. To be reactivated on the network the control device may have to perform the activation procedure again (e.g., be claimed for being joined to another network or network partition) for performing communications.

Figure 10:
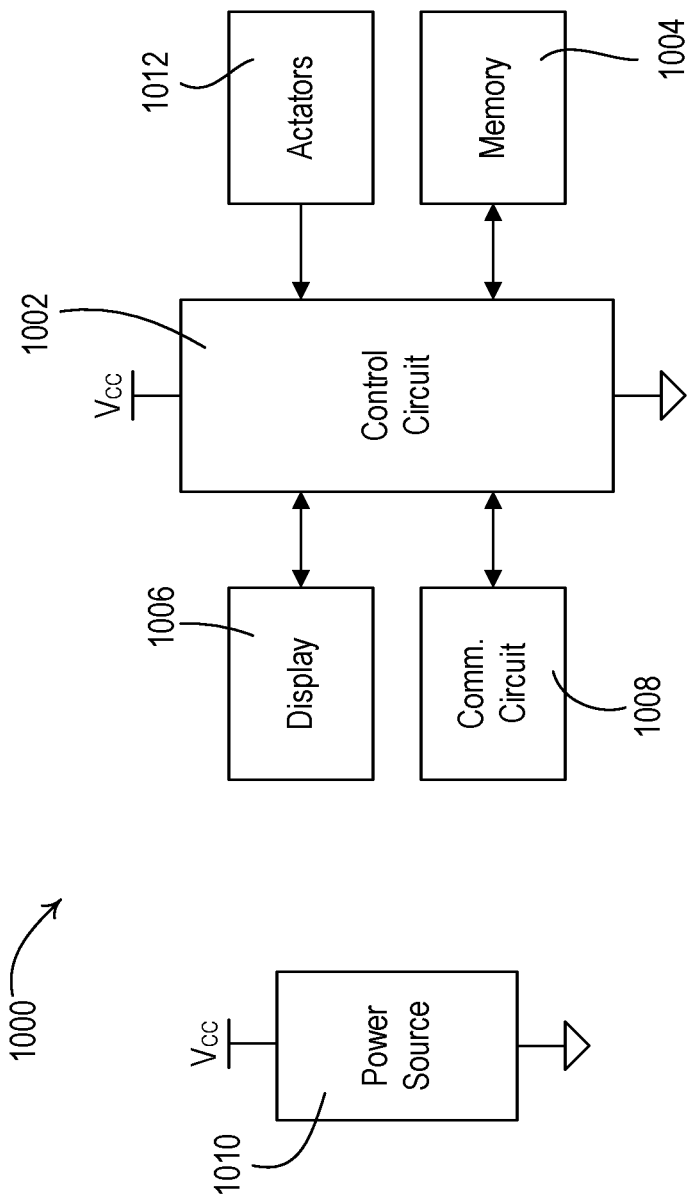
FIG. 10 is a block diagram of an example mobile device.

FIG. 10 is a block diagram illustrating an example mobile device 1000 as described herein. The mobile device 1000 may include a control circuit 1002 for controlling the functionality of the mobile device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, power control, input/output processing, or any other functionality that enables the mobile device 1000 to perform as described herein. The control circuit 1002 may store information in and/or retrieve information from the memory 1004. The memory 1004 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The mobile device 1000 may include one or more communication circuits, such as communication circuit 1008 for transmitting and/or receiving information. The communication circuit 1008 may perform wireless and/or wired communications. The communication circuit 1008 may include an RF transceiver or other circuit capable of performing wireless communications via an antenna. Communication circuit 1008 may be in communication with control circuit 1002 for transmitting and/or receiving information. The communication circuit 1008 may be configured to communicate using different wireless protocols or networks. When multiple communication circuits are implemented, they may each perform communications according to different wireless protocols on different networks.

The control circuit 1002 may also be in communication with a display 1006 for providing information to a user. The control circuit 1002 and/or the display 1006 may generate GUIs for being displayed on the mobile device 1000. The display 1006 and the control circuit 1002 may be in two-way communication, as the display 1006 may include a touch screen module capable of receiving information from a user and providing such information to the control circuit 1002. The mobile device 1000 may also include an actuator 1012 (e.g., one or more buttons) that may be actuated by a user to communicate user selections to the control circuit 1002.

Each of the modules within the mobile device 1000 may be powered by a power source 1010. The power source 1010 may include an AC power supply or DC power supply, for example. The power source 1010 may generate a supply voltage $V_{CC}$ for powering the modules within the mobile device 1000.

Figure 11:
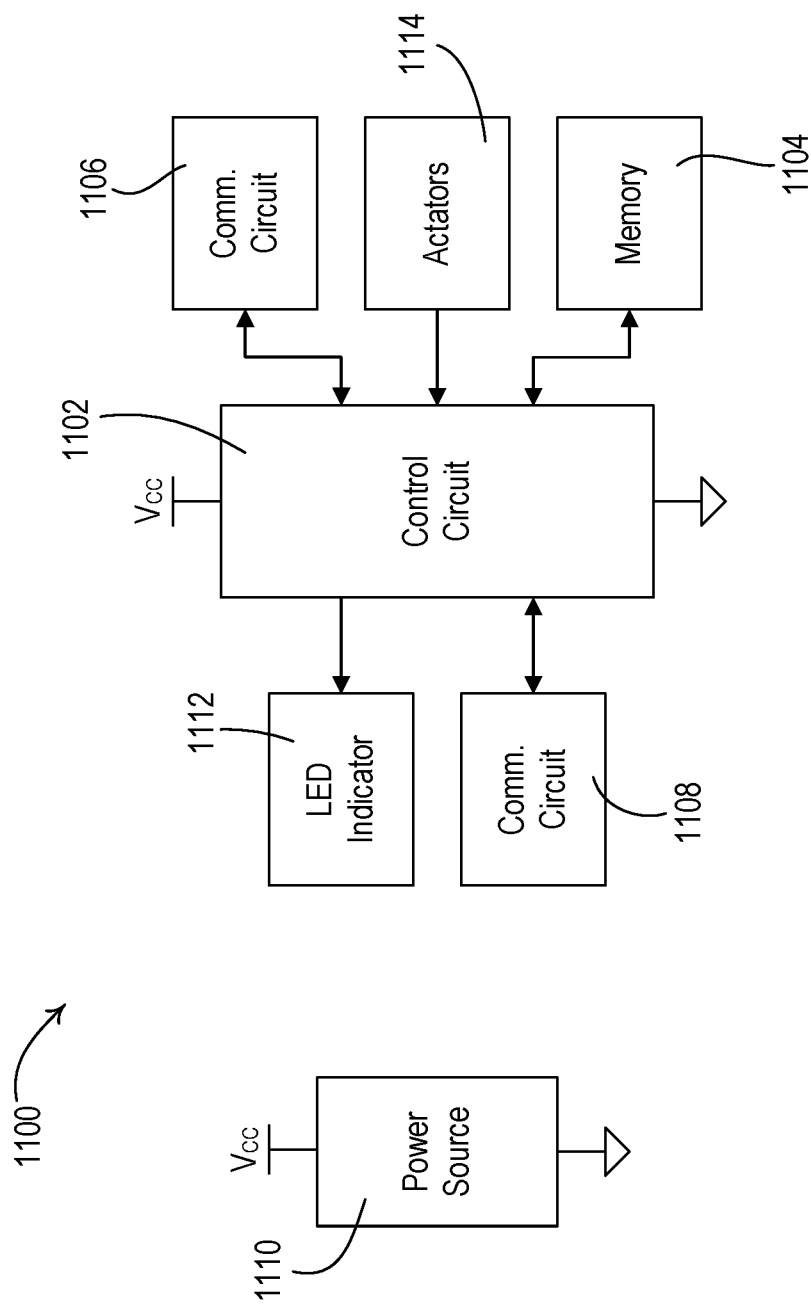
FIG. 11 is a block diagram of an example system controller.

FIG. 11 is a block diagram illustrating an example system controller 1100 as described herein. The system controller may be a gateway system controller, a target system controller, a remote system controller, and/or a combination thereof. The system controller 1100 may include a control circuit 1102 for controlling the functionality of the system controller 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, power control, input/output processing, or any other functionality that enables the system controller 1100 to perform as described herein. The control circuit 1102 may store information in and/or retrieve information from the memory 1104. The memory 1104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1100 may include a first communication circuit 1106 for transmitting and/or receiving information. The first communication circuit 1106 may perform wireless and/or wired communications on a first wireless communication link and/or network (e.g., a network wireless communication link). The system controller 1100 may also, or alternatively, include a second communication circuit 1108 for transmitting and/or receiving information. The second communication circuit 1108 may perform wireless and/or wired communications on a second wireless communication link and/or network (e.g., a second wireless communication link). The first and second communication circuits 1106 and 1108 may be in communication with control circuit 1102. The first and second communication circuits 1106 and 1108 may include RF transceivers or other communication modules capable of performing wireless communications via an antenna. The first communication circuit 1106 and the second communication circuit 1108 may be capable of performing communications via the same communication channels or different communication channels. For example, the first communication circuit 1106 may be capable of communicating (e.g., with control devices and/or other devices in the load control system) via the first wireless communication link and/or network using a first communication protocol (e.g., a wireless communication protocol, such as CLEAR CONNECT and/or THREAD protocols). And the second communication circuit 1108 may be capable of communicating via the second wireless communication channel and/or network using a second wireless communication protocol.

The control circuit 1102 may be in communication with an LED indicator 1112 for providing indications to a user. The control circuit 1102 may be in communication with an actuator 1114 (e.g., one or more buttons) that may be actuated by a user to communicate user selections to the control circuit 1102. For example, the actuator 1114 may be actuated to put the control circuit 1102 in an association mode and/or communicate association messages from the system controller 1100.

Each of the modules within the system controller 1100 may be powered by a power source 1110. The power source 1110 may include an AC power supply or DC power supply, for example. The power source 1110 may generate a supply voltage $V_{CC}$ for powering the modules within the system controller 1100.

Figure 12:
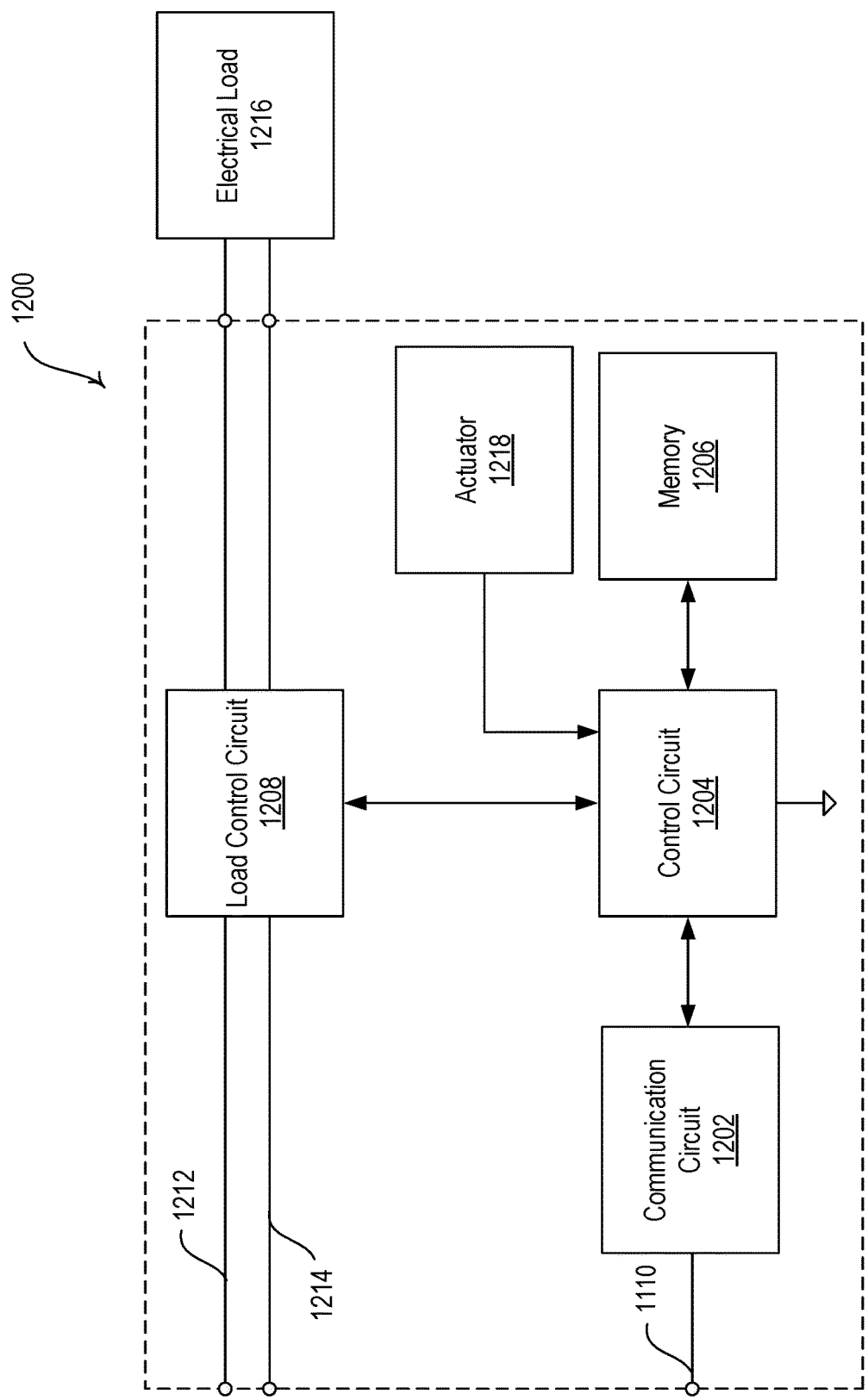
FIG. 12 is a block diagram of an example load control device.

FIG. 12 is a block diagram illustrating an example control-target device, e.g., a load control device 1200, as described herein. The load control device 1200 may be a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device. The load control device 1200 may include one or more communication circuits, such as the communication circuit 1202. The communication circuit 1202 may include a receiver, an RF transceiver, or other communications module capable of performing wired and/or wireless communications via network link 1210. The communication circuit 1202 may be configured to communicate using different wireless protocols or networks. When multiple communication circuits are implemented, they may each perform communications according to different wireless protocols on different networks.

The communication circuit 1202 may be in communication with control circuit 1204. The control circuit 1204 may include one or more general purpose processors, special purpose processors, conventional processors, digital signal processors (DSPs), microprocessors, integrated circuits, a programmable logic device (PLD), application specific integrated circuits (ASICs), or the like. The control circuit 1204 may perform signal coding, data processing, power control, input/output processing, or any other functionality that enables the load control device 1200 to perform as described herein.

The control circuit 1204 may store information in and/or retrieve information from the memory 1206. For example, the memory 1206 may maintain a registry of associated control devices and/or control configuration instructions. The memory 1206 may include a non-removable memory and/or a removable memory. The load control circuit 1208 may receive instructions from the control circuit 1204 and may control an electrical load 1216 based on the received instructions. The load control circuit 1208 may send status feedback to the control circuit 1204 regarding the status of the electrical load 1216. The load control circuit 1208 may receive power via the hot connection 1212 and the neutral connection 1214 and may provide an amount of power to the electrical load 1216. The electrical load 1216 may include any type of electrical load, such as a lighting load (e.g., LED, fluorescent lamp, etc.).

The control circuit 1204 may be in communication with an actuator 1218 (e.g., one or more buttons) that may be actuated by a user to communicate user selections to the control circuit 1204. For example, the actuator 1218 may be actuated to put the control circuit 1204 in an association mode and/or communicate association messages from the load control device 1200.

Figure 13:
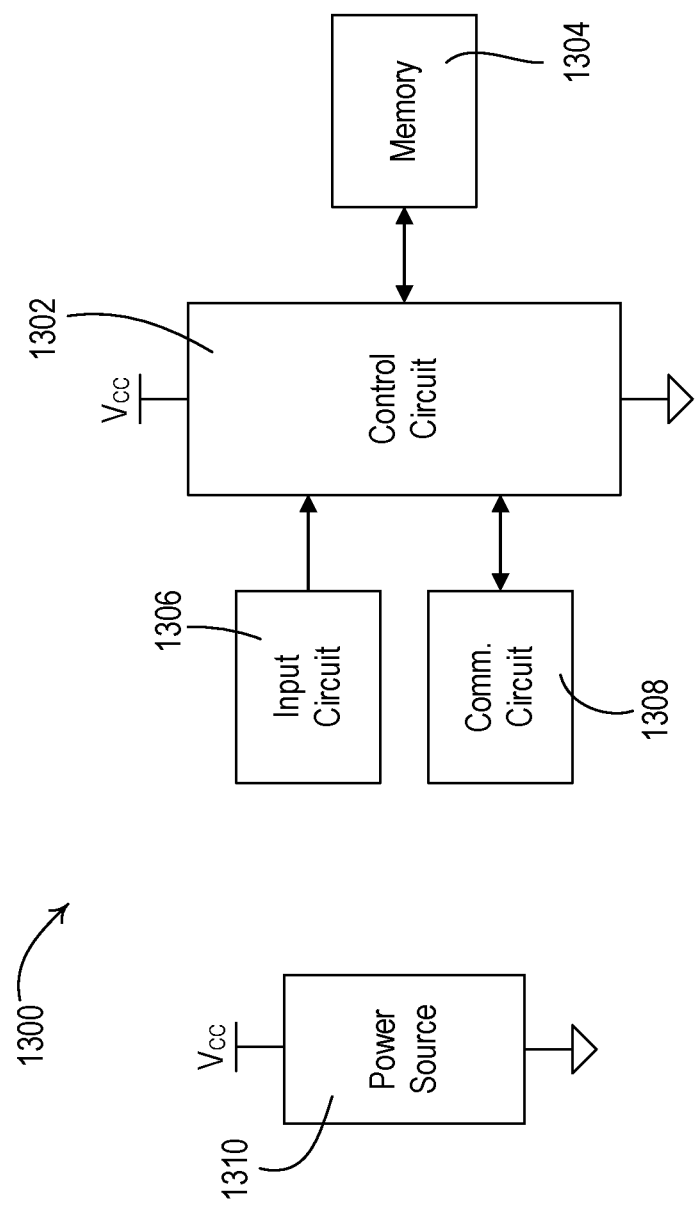
FIG. 13 is a block diagram of an example input device.

FIG. 13 is a block diagram illustrating an example input device 1300, or control-source device, as described herein. The input device 1300 may be a remote control device, an occupancy sensor, a daylight sensor, a temperature sensor, and/or the like. The input device 1300 may include a control circuit 1302 for controlling the functionality of the input device 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the input device 1300 to perform as described herein.

The control circuit 1302 may store information in and/or retrieve information from the memory 1304. The memory 1304 may include a non-removable memory and/or a removable memory, as described herein.

The input device 1300 may include one or more communication circuits, such as a communication circuit 1308 for transmitting and/or receiving information. The communication circuit 1308 may transmit and/or receive information via wired and/or wireless communications. The communication circuit 1308 may include a transmitter, an RF transceiver, or other circuit capable of performing wired and/or wireless communications. The communication circuit 1308 may be configured to communicate using different wireless protocols or networks. When multiple communication circuits are implemented, they may each perform communications according to different wireless protocols on different networks. The communication circuit 1308 may be in communication with control circuit 1302 for transmitting and/or receiving information.

The control circuit 1302 may also be in communication with an input circuit 1306. The input circuit 1306 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1306 to put the control circuit 1302 in an association mode and/or communicate association messages from the control-source device. The control circuit 1302 may receive information from the input circuit 1306 (e.g. an indication that a button has been actuated or sensed information). Each of the modules within the input device 1300 may be powered by a power source 1310.

Although features and elements are described herein in particular combinations, each feature or element can be used alone or in any combination with the other features and elements. The methods described herein may be implemented in a computer program, software, or firmware incorporated in a computer-readable medium for execution by a computing device or control circuit of the computing device. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method for identifying a router device in a network as a backup-leader device, the method comprising:
    receiving, at the router device, a leader advertisement message from a leader device in the network;
    determining, at the router device based on information in the leader advertisement message, that a communication quality metric associated with the router device meets at least one backup-leader criteria indicating that the router device has a highest link quality for communications transmitted to or from the leader device of a plurality of router devices in the network;
    setting, at the router device based on the determination, a backup-leader flag indicating that the router device is the backup-leader device;
    failing to receive a second leader advertisement message at the router device from the leader device within a first timer threshold;
    based on the backup-leader flag being set at the router device when the router device fails to receive the second leader advertisement message from the leader device, upgrading a role of the router device to operate as a second leader device on the network; and
    transmitting leader advertisement messages from the second leader device.

2. The method of claim 1, wherein the router device is associated with a router identifier, and wherein determining that the router device has the highest link quality for communications transmitted to or from the leader device comprises at least one of:
    determining, based on the information in the leader advertisement, that the router identifier is associated with a highest link quality out for communications transmitted from the leader device, or
    determining, based on the information in the leader advertisement, that the router identifier is associated with a highest link quality in for communications transmitted to the leader device.

3. The method of claim 1, further comprising:
    resetting, at the router device, a leader timer after the leader advertisement message is received from the leader device;
    wherein the first timer threshold is shorter than a second timer threshold after which other devices in the network detach from the network when the other devices also fail to receive leader advertisement messages from the leader device.

4. The method of claim 3, wherein the advertisement messages transmitted from the second leader device comprise a same identifier as the advertisement message transmitted from the leader device.

5. The method of claim 4, wherein the advertisement messages transmitted from the second leader device comprise at least one of an updated sequence number or an updated bitmap from the advertisement message transmitted from the leader device.

6. The method of claim 5, further comprising:
receiving a leader advertisement message from a third leader device at the second leader device, wherein the leader advertisement from the third leader device comprises the same identifier; and
dropping the role of leader at the second leader device.

7. The method of claim 1, wherein the router device comprises a control device in a load control system.

8. The method of claim 7, wherein the control device comprises a lighting control device.

9. The method of claim 1, wherein the router device is one backup-leader device in a sequence of backup-leader devices configured to replace the leader device.

10. The method of claim 9, further comprising:
storing a list comprising the sequence of backup-leader devices that indicates the relative position of the router device in the sequence for replacing the leader device.

11. The method of claim 1, further comprising:
clearing, at the router device, the backup-leader flag based on the at least one backup-leader criteria failing to be met.

12. The method of claim 1, further comprising:
determining that the leader device is unable to properly communicate on the network based on a failure to receive at least one advertisement message in a period of time; and
upgrading the role of the router device on the network to the second leader device based on the backup leader flag being set after the determination.

13. A control device in a load control system, the control device comprising:
a memory, wherein the memory is configured to store a role of the control device in a network, and wherein the role of the control device comprises a router device;
a control circuit configured to:
receive a leader advertisement message from a leader device in the network; determine, based on information in the leader advertisement message, that a communication quality metric associated with the router device meets at least one backup-leader criteria indicating that the router device has a highest link quality for communications transmitted to or from the leader device of a plurality of router devices in the network;
set, based on the determination, a backup-leader flag indicating that the control device is the backup-leader device;
store the backup-leader flag in the memory; detect a failure to receive a second leader advertisement message at the router device from the leader device within a first timer threshold;
based on the backup-leader flag being set at the router device when the router device fails to receive the second leader advertisement message from the leader device, upgrade a role of the router device to operate as a second leader device on the network; and
transmit leader advertisement messages from the second leader device.

14. The control device of claim 13, wherein the control device is associated with a router identifier stored in the memory, and wherein the control circuit being configured to determine that the router device has the highest link quality for communications transmitted to or from the leader device comprises the control circuit being configured to determine, based on the information in the leader advertisement, at least one of:
the router identifier is associated with a highest link quality out for communications transmitted from the leader device, or
the router identifier is associated with a highest link quality in for communications transmitted to the leader device.

15. The control device of claim 13, the control circuit is further configured to:
reset a leader timer after the leader advertisement message is received from the leader device;
wherein the first timer threshold is shorter than a second timer threshold after which other devices in the network detach from the network when the other devices also fail to receive leader advertisement messages from the leader device.

16. The control device of claim 15, wherein the advertisement messages transmitted after being upgraded to operate as the second leader device comprise a same identifier as the advertisement message transmitted from the leader device.

17. The control device of claim 16, wherein the advertisement messages transmitted after being upgraded to operate as the second leader device comprise at least one of an updated sequence number or an updated bitmap from the advertisement message transmitted from the leader device.

18. The control device of claim 16, wherein the control circuit is further configured to:
receive a leader advertisement message from a third leader device, wherein the leader advertisement from the third leader device comprises the same identifier; and
downgrade to cease operating as the second leader device on the network.

19. The control device of claim 13, wherein the control device comprises a lighting control device in a load control system.

20. The control device of claim 13, wherein the control device comprises one backup-leader device in a sequence of backup-leader devices configured to replace the leader device.

21. The control device of claim 20, wherein the control circuit is further configured to:
store a list comprising the sequence of backup-leader devices that indicates a relative position of the control device in the sequence for replacing the leader device.

22. The control device of claim 13, wherein the control circuit is further configured to:
clear the backup-leader flag based on the at least one backup-leader criteria failing to be met.

23. The control device of claim 13, wherein the control circuit is further configured to:
determine that the leader device is unable to properly communicate on the network based on a failure to receive at least one advertisement message in a period of time; and
upgrade the role of the router device on the network to the second leader device based on the backup leader flag being set after the determination.

24. A non-transitory computer-readable storage medium comprising executable instructions stored thereon that, when executed by a control circuit, cause the control circuit to:
receive a leader advertisement message from a leader device in a network; determine, based on information in the leader advertisement message, that a communication quality metric associated with a router device meets at least one backup-leader criteria indicating that the router device has a highest link quality for communications transmitted to or from the leader device of a plurality of router devices in the network;

set, based on the determination, a backup-leader flag indicating that the control device is the backup-leader device;

detect a failure to receive a second leader advertisement message at the router device from the leader device within a first timer threshold;

based on the backup-leader flag being set at the router device when the router device fails to receive the second leader advertisement message from the leader device, upgrade a role of the router device to operate as a second leader device on the network; and transmit leader advertisement messages from the second leader device.

25. The non-transitory computer-readable storage medium of claim 24, wherein the instructions are configured to store a router identifier associated with the router device, wherein the instructions being configured co cause the control circuit to determine that the router device has the highest link quality for communications transmitted to or from the leader device comprises the instructions being configured to cause the control circuit to determine, based on the information in the leader advertisement, at least one of:

the router identifier is associated with a highest link quality out for communications transmitted from the leader device, or the router identifier is a highest link quality in for communications transmitted to the leader device.

26. The non-transitory computer-readable storage medium of claim 24, wherein the instructions stored thereon are further configured to cause the control circuit to:

reset a leader timer after the leader advertisement message is received from the leader device;

wherein the first timer threshold is shorter than a second timer threshold after which other devices in the network detach from the network when the other devices also fail to receive leader advertisement messages from the leader device.

27. The non-transitory computer-readable storage medium of claim 26, wherein the advertisement messages configured to be transmitted after the control device is upgraded to operate as the second leader device comprise a same identifier as the advertisement message configured to be transmitted from the leader device.

28. The non-transitory computer-readable storage medium of claim 27, wherein the advertisement messages configured to be transmitted after the control device is upgraded to operate as the second leader device comprise at least one of an updated sequence number or an updated bitmap from the advertisement message transmitted from the leader device.

29. The non-transitory computer-readable storage medium of claim 27, wherein the instructions stored thereon are further configured to cause the control circuit to:

receive a leader advertisement message from a third leader device, wherein the leader advertisement from the third leader device comprises the same identifier; and downgrade the control device to cease operating as the second leader device on the network.

30. The non-transitory computer-readable storage medium of claim 24, wherein the control device comprises a lighting control device in a load control system.

31. The non-transitory computer-readable storage medium of claim 24, wherein the router device comprises one backup-leader device in a sequence of backup-leader devices configured to replace the leader device.

32. The non-transitory computer-readable storage medium of claim 31, wherein the instructions stored thereon are further configured to cause the control circuit to:

store a list comprising the sequence of backup-leader devices that indicates a relative position of the router device in the sequence for replacing the leader device.

33. The non-transitory computer-readable storage medium of claim 24, wherein the instructions stored thereon are further configured to cause the control circuit to:

clear the backup-leader flag based on the at least one backup-leader criteria failing to be met.

34. The non-transitory computer-readable storage medium of claim 24, wherein the instructions are configured to cause the control circuit to:

determine that the leader device is unable to properly communicate on the network based on a failure to receive at least one advertisement message in a period of time; and upgrade the role of the router device on the network to the second leader device based on the backup leader flag being set after the determination.

* * * * *